United States Patent
Hu et al.

(10) Patent No.: US 12,174,209 B2
(45) Date of Patent: Dec. 24, 2024

(54) BLOOD SAMPLE ANALYZER WITH SAMPLE AGITATING STRUCTURE AND BLOOD SAMPLE AGITATING METHOD

(71) Applicants: SHENZHEN MINDRAY BIO-MEDICAL ELECTRONICS CO., LTD., Shenzhen (CN); SHENZHEN MINDRAY SCIENTIFIC CO., LTD., Shenzhen (CN)

(72) Inventors: Lijian Hu, Shenzhen (CN); Zixian Xie, Shenzhen (CN); Yuanxing Liu, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 958 days.

(21) Appl. No.: 17/170,805

(22) Filed: Feb. 8, 2021

(65) Prior Publication Data

US 2021/0239725 A1 Aug. 5, 2021

Related U.S. Application Data

(63) Continuation of application No. PCT/CN2018/102312, filed on Aug. 24, 2018.

(51) Int. Cl.
*G01N 35/02* (2006.01)
*G01N 1/38* (2006.01)
*G01N 35/00* (2006.01)

(52) U.S. Cl.
CPC ............... *G01N 35/02* (2013.01); *G01N 1/38* (2013.01); *G01N 2035/00524* (2013.01)

(58) Field of Classification Search
CPC .......... G01N 35/04; G01N 35/02; G01N 1/38; G01N 35/0099; G01N 2035/00524;
(Continued)

(56) References Cited

U.S. PATENT DOCUMENTS 3,261,594 A * 7/1966 Michel .................. B01F 31/201
366/202
4,004,883 A * 1/1977 Meyer ...................... B01L 9/06
422/566
(Continued)

FOREIGN PATENT DOCUMENTS

CN 101603968 A * 12/2009
CN 201497691 U * 6/2010
(Continued)

OTHER PUBLICATIONS

Zhong, Z. et al., "The influences of different Mixing times of anticoagulated blood samples on the complete blood cell count results," World Latest Medicine Information, vol. 17, No. 2, 2017.
(Continued)

*Primary Examiner* — Arlen Soderquist
(74) *Attorney, Agent, or Firm* — Kory D. Christensen

(57) ABSTRACT

Disclosed in the present invention is a blood sample analyzer, including a sample conveying device, a first agitating device, a second agitating device and a controller, etc. When the first agitating device drives a sample container placed in a sample container accommodating hole to agitate a blood sample, a bottom of the sample container is kept lower than an opening of the sample container. In addition, the present invention further discloses a blood sample agitating device, a blood sample analysis method, a blood sample agitating method, and a computer storage medium.

18 Claims, 43 Drawing Sheets

(58) Field of Classification Search
CPC ......... B01F 29/80; B01F 29/34; B01F 29/31; B01F 29/20; B01F 31/201; B01F 35/422; B01F 31/10
USPC ................. 436/47; 422/63, 65, 67
See application file for complete search history.

(56) References Cited

U.S. PATENT DOCUMENTS

| | | | | |
|---|---|---|---|---|
| 4,036,387 A * | 7/1977 | Feaster | A61J 1/20 | 215/311 |
| 4,120,662 A * | 10/1978 | Fosslien | G01N 35/1079 | 422/561 |
| 4,130,395 A * | 12/1978 | Chryssanthou | G01N 35/021 | 435/7.25 |
| 4,345,843 A * | 8/1982 | Berglund | B01F 31/27 | 422/561 |
| 4,475,411 A * | 10/1984 | Wellerfors | C12M 33/04 | 73/864.24 |
| 4,518,264 A * | 5/1985 | Nohso | B01F 31/275 | 422/65 |
| 4,609,017 A * | 9/1986 | Coulter | G01N 35/1079 | 422/561 |
| 4,632,808 A * | 12/1986 | Yamamoto | G01N 35/0099 | 435/286.2 |
| 4,861,553 A * | 8/1989 | Mawhirt | G01N 35/021 | 422/65 |
| 4,895,453 A * | 1/1990 | Devlin | B01F 31/275 | 366/219 |
| 5,066,135 A * | 11/1991 | Meyer | B01F 31/22 | 366/208 |
| 5,158,895 A * | 10/1992 | Ashihara | G01N 33/54326 | 435/7.1 |
| 5,195,825 A * | 3/1993 | Ringrose | B01F 31/20 | 366/110 |
| 5,439,645 A * | 8/1995 | Saralegui | B01F 31/22 | 422/63 |
| 5,472,669 A * | 12/1995 | Miki | B67B 7/182 | 422/65 |
| 5,578,268 A * | 11/1996 | Champseix | B01F 29/321 | 422/65 |
| 5,580,524 A * | 12/1996 | Forrest | G01N 35/025 | 436/174 |
| 5,665,309 A * | 9/1997 | Champseix | G01N 35/04 | 422/65 |
| 5,813,759 A * | 9/1998 | Gebrian | B01F 25/103 | 366/208 |
| 6,077,481 A * | 6/2000 | Ichida | G01N 35/0099 | 422/65 |
| 6,299,567 B1 * | 10/2001 | Forrest | B01F 29/80 | 422/549 |
| 6,413,780 B1 * | 7/2002 | Bach | B01L 7/52 | 422/65 |
| 6,673,316 B1 * | 1/2004 | Okamoto | B01J 19/0046 | 422/65 |
| 7,560,072 B2 * | 7/2009 | Matsumoto | B01F 31/201 | 422/65 |
| 7,985,375 B2 * | 7/2011 | Edens | G01N 35/1079 | 422/50 |
| 2002/0021983 A1 * | 2/2002 | Comte | B01F 31/275 | 422/65 |
| 2002/0118594 A1 * | 8/2002 | Vellinger | B01F 33/452 | 366/127 |
| 2005/0155921 A1 * | 7/2005 | Siddiqi | B03C 1/01 | 210/695 |
| 2005/0194237 A1 * | 9/2005 | Veiner | G01N 35/04 | 198/619 |
| 2005/0194333 A1 * | 9/2005 | Veiner | G01N 35/04 | 211/74 |
| 2005/0196320 A1 * | 9/2005 | Veiner | G01N 35/04 | 422/63 |
| 2006/0081539 A1 * | 4/2006 | Safar | B01L 3/5082 | 210/695 |
| 2006/0275177 A1 * | 12/2006 | Comte | B01L 7/00 | 422/400 |
| 2007/0048185 A1 * | 3/2007 | Dupoteau | B01F 31/10 | 422/68.1 |
| 2007/0189926 A1 * | 8/2007 | Le Comte | G01N 35/04 | 422/65 |
| 2008/0318306 A1 * | 12/2008 | Le Comte | G01N 35/00603 | 435/283.1 |
| 2009/0142844 A1 * | 6/2009 | Le Comte | G01N 35/0099 | 901/6 |
| 2009/0191094 A1 * | 7/2009 | Kayahara | G01N 35/04 | 422/64 |
| 2009/0227033 A1 * | 9/2009 | Hamada | G01N 35/0092 | 422/65 |
| 2010/0064826 A1 * | 3/2010 | Champseix | G01N 35/1079 | 422/65 |
| 2010/0122586 A1 * | 5/2010 | Misu | G01N 35/04 | 422/65 |
| 2010/0126286 A1 * | 5/2010 | Self | G01N 35/04 | 73/863.81 |
| 2011/0316713 A1 * | 12/2011 | Okubo | G01N 35/026 | 340/673 |
| 2013/0019697 A1 * | 1/2013 | McKeen | G01N 35/00029 | 73/863.21 |
| 2014/0016431 A1 * | 1/2014 | Takenaka | B01F 31/24 | 366/108 |
| 2014/0064019 A1 * | 3/2014 | Hamada | B01F 35/2209 | 366/213 |
| 2014/0065018 A1 * | 3/2014 | Imazu | G01N 35/04 | 422/547 |
| 2014/0086004 A1 * | 3/2014 | Itoh | B01F 29/34 | 366/218 |
| 2014/0287523 A1 * | 9/2014 | Donohue | G01N 35/021 | 422/65 |
| 2016/0299133 A1 * | 10/2016 | Zhou | G01N 35/025 | |
| 2016/0303528 A1 * | 10/2016 | Zhou | G01N 1/38 | |
| 2017/0246600 A1 * | 8/2017 | Jakobsen | B01F 29/321 | |
| 2020/0355676 A1 * | 11/2020 | Xu | B03C 1/01 | |
| 2021/0223276 A1 * | 7/2021 | Xie | B01F 31/441 | |

FOREIGN PATENT DOCUMENTS

| | | | | |
|---|---|---|---|---|
| CN | 103364577 A | * | 10/2013 | ............ G01N 35/04 |
| CN | 103675309 A | | 3/2014 | |
| CN | 204202970 U | | 3/2015 | |
| CN | 104502178 A | * | 4/2015 | ........... B01F 11/0008 |
| CN | 205786044 U | | 12/2016 | |
| CN | 206463872 U | | 9/2017 | |
| CN | 207457252 U | | 6/2018 | |
| JP | 59119267 A | * | 12/1982 | |
| WO | 2015039423 A1 | | 3/2015 | |
| WO | 2017121344 A1 | | 7/2017 | |
| WO | WO-2019206097 A1 | * | 10/2019 | ............ G01N 35/02 |
| WO | WO-2020037670 A1 | * | 2/2020 | ............ B01F 13/00 |
| WO | WO-2020037671 A1 | * | 2/2020 | ........... B01F 11/0008 |

OTHER PUBLICATIONS

Yuan, Z. et al., "The influences of different Mixing times of anticoagulated blood samples on the complete blood cell count results," Guide of China Medicine, vol. 9, No. 36, Dec. 2011.

* cited by examiner

|  | 1st | 2nd | 3rd | 4th | 5th | 6th |
|---|---|---|---|---|---|---|
| HGB(hemoglobin concentration)g/L | 145 | 145 | 145 | 145 | 145 | 144 |
| RBC (red blood cell count) | 6.70 | 6.69 | 6.75 | 6.76 | 6.71 | 6.62 |
| WBC (white blood cell count) | 7.70 | 7.50 | 7.79 | 7.39 | 7.42 | 8.17 |
| PLT (platelet count) | 257 | 283 | 268 | 278 | 266 | 256 |
| MCV (mean corpuscular volume) | 67.4 | 67.5 | 67.4 | 67.9 | 67.2 | 68.3 |
| HCT (hematocrit) | 45.2 | 45.2 | 45.5 | 45.9 | 45.1 | 45.2 |

|  | Sample 1 | | Sample 2 | | Sample 3 | | Sample 4 | |
|---|---|---|---|---|---|---|---|---|
|  | Inverted agitating | Eccentric rotation agitating | Inverted agitating | Eccentric rotation agitating | Inverted agitating | Eccentric rotation agitating | Inverted agitating | Eccentric rotation agitating |
| HGB(hemoglobin concentration)g/L | 136 | 137 | 144 | 145 | 100 | 101 | 111 | 113 |
| RBC(red blood cell count) | 4.88 | 4.93 | 4.63 | 4.58 | 3.36 | 3.38 | 4.10 | 4.18 |
| WBC(white blood cell count) | 4.66 | 4.69 | 4.71 | 4.69 | 10.23 | 10.48 | 6.10 | 6.22 |
| PLT(platelet count) | 164 | 167 | 145 | 147 | 208 | 207 | 155 | 152 |
| MCV(mean corpuscular volume) | 90.1 | 90.4 | 97.0 | 97.3 | 94.0 | 94.5 | 85.5 | 85.7 |
| HCT(hematocrit) | 44.0 | 44.5 | 44.9 | 44.6 | 31.6 | 31.9 | 35.1 | 35.8 |

FIG.57

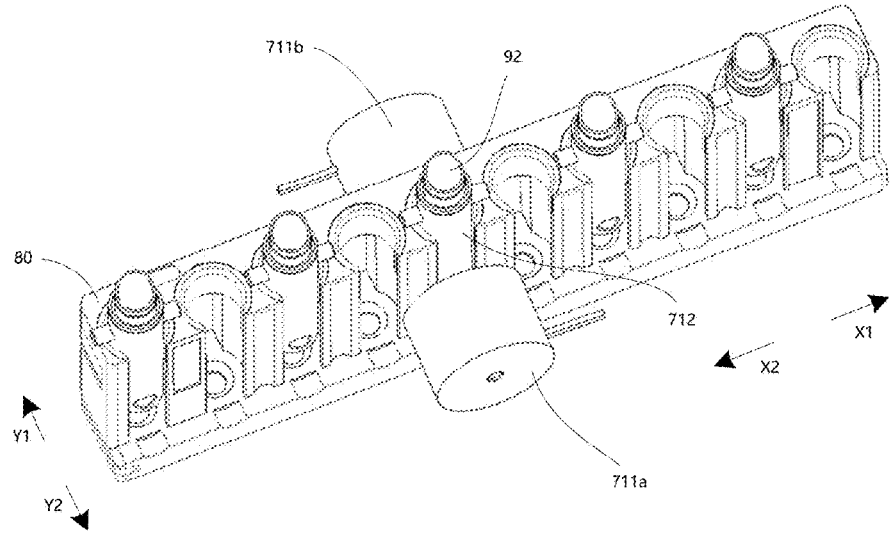

FIG.58

| Blood volume | HGB(Unit:g/L) | | | | | | |
|---|---|---|---|---|---|---|---|
| | 1st | 2nd | 3rd | 4th | 5th | 6th | Mean value |
| 30μL | 134 | 136 | 133 | 136 | 135 | 133 | 134.5 |
| 50μL | 147 | 148 | 145 | 148 | 147 | 145 | 146.7 |
| 100μL | 143 | 143 | 143 | 142 | 142 | 142 | 142.5 |
| 150μL | 126 | 126 | 127 | 127 | 125 | 127 | 126.3 |
| 200μL | 119 | 119 | 120 | 119 | 119 | 120 | 119.3 |
| 250μL | 135 | 135 | 135 | 135 | 135 | 136 | 135.2 |

FIG.65

BLOOD SAMPLE ANALYZER WITH SAMPLE AGITATING STRUCTURE AND BLOOD SAMPLE AGITATING METHOD

CROSS-REFERENCE TO RELATED APPLICATIONS

This application is a continuation of PCT Application No. PCT/CN2018/102312, filed Aug. 24, 2018, and titled BLOOD SAMPLE ANALYZER AND BLOOD SAMPLE HOMOGENIZATION METHOD, which is incorporated herein by reference.

TECHNICAL FIELD

The present invention relates to the field of sample analysis, and particularly to a blood sample analyzer for agitating and analyzing a collected small-volume sample and a blood sample agitating method.

BACKGROUND ART

In the process of clinical diagnosis, an analysis device is often used to measure a blood, urine, or body fluid (ascites, myelencephalon, hydrothorax, etc.) sample collected from a patient. The analysis device usually prescribes the required sample volume in advance. Taking a blood sample as an example, there are two blood collection methods at present: venous blood collection and peripheral blood collection. The venous blood collection method collects a large amount of blood (≥1 mL), and is usually suitable for adult patients. For infants, children or critically ill patients, it is sometimes difficult to collect blood through the venous blood collection method. In this case, peripheral blood is often collected. The collection of peripheral blood faces the situation that only a small amount of blood (≤100 μL in most cases) can be collected.

When collecting a blood, in order to prevent blood coagulation, a blood collection tube containing an anticoagulant is usually used. Blood is composed of blood cells and plasma. Due to different specific gravities of the blood cells and the blood plasma, the anti-coagulated blood will be stratified after standing for a period of time. Therefore, a blood sample is required to be agitated thoroughly before measurement, otherwise the measurement result will have large deviation.

CN1334453A discloses a device for treating samples of blood products, and the device has an agitation means for stirring a blood sample in a test tube. The agitation means clamps the test tube with a clamping assembly, and rotates the clamping assembly to continuously rotate the test tube through 360°, thereby continuously inverting the test tube up and down, and thus stirring the blood sample in the test tube.

For a common-volume blood sample (venous blood sample), due to the large amount of blood collection and the good fluidity of blood, when the blood collection tube is inverted, the venous blood inevitably flows along the tube wall under the action of gravity, so the method of multiple inversions disclosed in CN1334453A can be used, causing the blood to flow back and forth along the tube wall to achieve agitating.

In CN1334453A, the same stirring operation is used for common-volume and small-volume blood samples. However, the inverted agitating method disclosed in CN1334453A will cause part of the blood to remain on the cap and wall of the blood collection tube, thereby resulting in the loss of blood sample. For a common-volume sample such as a venous blood sample, the lost blood sample accounts for a small proportion of the total amount of collected blood, and does not affect measurement. However, for a small-volume sample such as a peripheral blood sample, since the amount of the collected peripheral blood sample is small and the fluidity is poor, the peripheral blood often adheres to the cap, bottom or wall of the blood collection tube and does not flow when the blood collection tube is inverted. The above-mentioned inverted agitating technology disclosed in the prior art causes the loss of blood sample and adversely affects measurement, and there are still difficulties in effectively solving the problem of agitating peripheral blood. Therefore, even if the inverted agitating method disclosed in CN1334453A can agitate common-volume blood samples thoroughly, it may agitate small-volume blood samples poorly.

Regarding the technical problem of poor agitating in the above-mentioned CN1334453A, CN103675309A discloses a sample treatment device comprising a stirring motor component and a hand component, and the hand component is driven to rotate by the stirring motor component, so that a sample container rotates between an inverted state and an upright state. In CN103675309A, in order to distinguish different requirements of agitating between a common-volume blood sample and a small-volume blood sample, the time for stirring the small-volume blood sample is longer than the time for agitating the common-volume blood sample, so that the small-volume blood sample can be agitated thoroughly.

Although in CN103675309A, the time for stirring the small-volume blood sample is longer than the time for stirring the common-volume blood sample, so that the small-volume blood sample can be agitated thoroughly. However, there are still situations where the small-volume blood sample always adheres to the cap or the upper wall part of the blood collection tube.

Therefore, using the above-mentioned inverted agitating technology disclosed in the prior art to agitate the peripheral blood faces two problems: (1) at present, most peripheral blood collection tubes in domestic are provided with plastic caps, which do not support puncture (if the plastic caps are directly punctured, the plastic caps would damage puncture needles, and plastic debris would fall into blood collection tubes and blood samples would be contaminated), so the caps of the blood collection tubes are required to open first before measurement, but the blood sample flows out if the blood collection tubes are inverted; and (2) even if blood collection tubes with rubber caps provided by some manufacturers abroad can be punctured, the imported blood collection tubes are relatively high-cost and cannot be popularized, and the more serious problem is that inverting blood collection tube will cause part of blood sample to remain on rubber cap resulting in loss, and because the amount of peripheral blood collected is small, the lost blood sample accounts for a large proportion of the total amount of blood collected, and analyzers are very possible to aspirate insufficient sample, thereby affecting measurement results.

CN102171575A discloses a sample stirring device having a driving roller and a follower roller. When a sample is to be stirred, a blood collection tube rack loaded with blood collection tubes is transported between the driving roller and the follower roller. The driving roller, a motor for driving the driving roller, and a support move toward the follower roller to clamp the blood collection tube, and the blood collection tube is rotated by driving the driving roller, so as to stir the sample uniformly. In CN102171575A, the blood collection tube is clamped between the driving roller and the follower roller, and the blood collection tube is driven to rotate by means of friction between the driving roller and the blood collection tube, which would easily damage a bar code label on the blood collection tub. In order to hold the follower roller, a bracket for the follower roller is further required, and both the driving roller and the follower roller have certain area, and are arranged separately in the horizontal direction, which increases the size of the device and is not conducive to the miniaturization of the device. In addition, because the outer circumference of the driving roller is made of synthetic rubber, the blood collection tube may not be rotated normally due to rubber aging and other reasons, which will affect the stirring effect. Moreover, in CN102171575A, the blood collection tube is clamped between the driving roller and the follower roller, and the blood collection tube is driven to rotate by means of friction between the driving roller and the blood collection tube, which makes the bar code label easily fall off, or the bar code label on the blood collection tube falls off due to unfirm adhesion, and as a result, the blood collection tube cannot be rotated.

Based on the above-mentioned technical problems of the sample agitating technologies disclosed in the prior art and the urgent market demand for fully automated measurement of peripheral blood, the present invention proposes a sample analyzer and a sample agitating method, which can effectively stir a small-volume whole blood sample such as a peripheral blood sample uniformly, and are applicable to closed sample containers and open sample containers.

SUMMARY OF THE INVENTION

According to a first aspect of the present application, provided is a blood sample analyzer, including: a sample conveying device for conveying a sample rack loaded with a first sample container and/or a second sample container; a first agitating device with a sample container accommodating hole for placing the first sample container, the first agitating device being capable of driving the first sample container containing a small-volume blood sample and placed in the sample container accommodating hole to agitate the small-volume blood sample; a second agitating device capable of picking the sample rack conveyed by the sample conveying device to a predetermined position or the second sample container on the sample rack, and driving the second sample container containing a common-volume blood sample to agitate the common-volume blood sample; and a controller configured to communicate with the sample conveying device, the first agitating device and the second agitating device, to control the sample conveying device, the first agitating device and the second agitating device, wherein when the first agitating device drives the first sample container placed in the sample container accommodating hole to agitate the small-volume blood sample, a bottom of the first sample container is kept lower than an opening of the first sample container.

A second aspect of the present application further provides a blood sample analyzer, including: a sample conveying device for conveying a sample rack loaded with a first sample container and/or a second sample container; a first agitating device with a sample container accommodating hole for placing the first sample container, the first agitating device being capable of driving the first sample container placed in the sample container accommodating hole to agitate a blood sample; a second agitating device capable of picking the sample rack conveyed by the sample conveying device to a predetermined position or the second sample container on the sample rack, and driving the second sample container containing a common-volume blood sample to agitate the common-volume blood sample; and a controller configured to communicate with the sample conveying device, the first agitating device and the second agitating device, to control the sample conveying device, the first agitating device, the second agitating device, wherein when the first agitating device drives the first sample container placed in the sample container accommodating hole to agitate the blood sample, a sampling needle for sampling the blood sample does not touch the blood sample in the first sample container.

A third aspect of the present application further provides a blood sample analyzer, including: a sample conveying device for conveying a sample rack loaded with sample containers; a agitating device with a sample container accommodating hole for placing a sample container, the agitating device being capable of driving the sample container placed in the sample container accommodating hole to agitate a blood sample; and a controller configured to communicate with the sample conveying device and the agitating device, to control the sample conveying device and the agitating device, wherein when the agitating device drives the sample container placed in the sample container accommodating hole to agitate the blood sample, a bottom of the sample container is kept lower than an opening of the sample container.

A fourth aspect of the present application further provides a blood sample analyzer, including: a sample receiving assembly with a agitating device; and a controller configured to communicate with the sample receiving assembly to control the sample receiving assembly; wherein the agitating device is provided with a sample container receiving hole for placing a sample container, and the agitating device drives the sample container placed in the sample container receiving hole to agitate a blood sample; and when the agitating device drives the sample container placed in the sample container receiving hole to agitate the blood sample, a bottom of the sample container is kept lower than an opening of the sample container.

A fifth aspect of the present application further provides a blood sample analyzer, including: a first agitating device capable of agitating a blood sample in a first sample container; a second agitating device capable of agitating a blood sample in a second sample container in a way different from that of the first agitating device; and a controller configured to communicate with the first agitating device and the second agitating device, and capable of executing the following operations: (1) determining whether a first measurement mode or a second measurement mode is set; (2) when the first measurement mode is determined to be set, controlling the first agitating device to agitate the blood sample in the first sample container; and (3) when the second measurement mode is determined to be set, controlling the second agitating device to agitate the blood sample in the second sample container.

A sixth aspect of the present application further provides a blood sample analysis method for a blood routine, including: conveying a sample container containing a blood sample to a agitating position; agitating the blood sample in the sample container by a first agitating device, wherein when the first agitating device drives the sample container placed in a sample container accommodating hole of the first agitating device to agitate the blood sample, a bottom of the sample container is kept lower than an opening of the sample container; aspirating a predetermined sampling amount of the blood sample from the sample container to prepare a test sample for blood routine test items; and testing the test sample to obtain relevant indicators of the blood routine test items.

A seventh aspect of the present application further provides a blood sample analysis method, including: a measurement mode determination step: determining whether the current measurement mode is a first measurement mode or a second measurement mode; a first test sample preparation step: when the current measurement mode is determined to be the first measurement mode, agitating a blood sample in a sample container by a first agitating device, and aspirating a first sampling amount of the agitated blood sample to prepare a first test sample; a second test sample preparation step: when the current measurement mode is determined to be the second measurement mode, agitating the blood sample in the sample container by a second agitating device, and aspirating a second sampling amount of the agitated blood sample to prepare a second test sample; and a test step: testing the first test sample or the second test sample, wherein in the agitating operation, a sampling needle does not touch the blood sample in the sample container.

A eighth aspect of the present application further provides a blood sample agitating method, including: presetting a rotation speed of a sample container accommodating seat; presetting a number of rotation times of the sample container accommodating seat; and presetting a number of agitating operation times on a blood sample, wherein a first agitating device drives a sample container placed in a sample container accommodating hole of the first agitating device according to the preset rotation speed, the number of rotation times and the number of agitating operation times, to agitate a blood sample.

A ninth aspect of the present application further provides a blood sample agitating method, including: setting at least two parameters of number of swing times, swing time duration, and swing frequency Fx of a sample container, and agitating a blood sample according to the parameters.

A tenth aspect of the present application further provides a controller for a blood sample analyzer, including: at least one processor; and a memory storing instructions executable by the at least one processor, the instructions, when executed by the at least one processor, causing the blood sample analyzer to execute any of the methods described above.

An eleventh aspect of the present application further provides a computer storage medium storing computer executable instructions that, when executed by at least one processor of a blood sample analyzer, cause the blood sample analyzer to execute any of the methods described above.

Further, the blood sample analyzer described in the present application includes: a carrying device capable of carrying the first sample container on the sample rack, which is conveyed by the sample conveying device to a predetermined position, to the sample container accommodating hole of the first agitating device.

Further, the first agitating device of the blood sample analyzer described in the present application includes: a sample container accommodating seat, a top part of which is provided with the sample container accommodating hole; and a driving device for driving the sample container accommodating seat to rotate, thereby driving the first sample container in the sample container accommodating hole to rotate, so as to agitate the blood sample.

Further, the sample container accommodating hole of the blood sample analyzer described in the present application is arranged eccentrically, so that the first sample container in the sample container accommodating hole is capable of being rotated eccentrically.

Further, the driving device of the blood sample analyzer described in the present application is a first motor.

Further, the sample container accommodating seat of the blood sample analyzer described in the present application is configured as a part of a rotating shaft of the first motor.

Further, the driving device of the blood sample analyzer described in the present application is a first magnetic driving device.

Further, a lower part of the sample container accommodating seat of the blood sample analyzer described in the present application is provided with a plurality of first magnets, and the first magnetic driving device includes a plurality of second electromagnets; wherein the interaction between the plurality of second magnets and the plurality of first magnets causes the sample container accommodating seat to rotate.

Further, the first agitating device of the blood sample analyzer described in the present application includes: a sample container accommodating seat provided with the sample container accommodating hole for placing the first sample container; and a vibration driving device for driving the sample container accommodating seat to vibrate within a predetermined range, thereby driving the first sample container in the sample container accommodating hole to vibrate under the condition that the bottom of the first sample container is kept lower than the opening of the first sample container, to agitate the blood sample.

Further, the vibration driving device of the blood sample analyzer described in the present application is a second magnetic driving device.

Further, a lower part of the sample container accommodating seat of the blood sample analyzer described in the present application is provided with a first magnet; and the second magnetic driving device includes a second magnet, wherein the interaction between the second magnet and the first magnet causes the sample container accommodating seat to vibrate within the predetermined range.

Further, the lower part of the sample container accommodating seat of the blood sample analyzer described in the present application is provided with a first permanent magnet and a second permanent magnet, and preferably, magnetic poles of the first permanent magnet and the second permanent magnet are provided in the same magnetization direction; and the magnetic driving device includes a first electromagnet and a second electromagnet, wherein the lower part of the sample container accommodating seat is located between the first electromagnet and the second electromagnet.

Further, the first agitating device of the blood sample analyzer described in the present application includes: a driving device for driving the sample container accommodating seat to vibrate within a predetermined range, thereby driving the first sample container in the sample container accommodating hole to vibrate under the condition that the bottom of the first sample container is kept lower than the opening of the first sample container, to agitate the blood sample, wherein the lower part of the sample container accommodating seat is provided with a gap for partially exposing the first sample container, and the driving device drives the first sample container to vibrate through the gap.

Further, the driving device of the blood sample analyzer described in the present application includes a second motor and a knock device, wherein the second motor drives the knock device to knock the portion of the first sample container in the gap, so as to drive the first sample container to vibrate.

Further, the sample container accommodating seat of the blood sample analyzer described in the present application is further provided with a blocking portion for blocking a container cover of the first sample container from turning towards a body portion of the first sample container.

Further, the sample container accommodating seat of the blood sample analyzer described in the present application is arranged on the sample rack, and the driving device is arranged corresponding to an agitating position.

Further, the sample container accommodating seat of the blood sample analyzer described in the present application is a clamping jaw of the second agitating device, and the clamping jaw forms the accommodating hole; the blood sample analyzer further includes a driving device, and the driving device is arranged corresponding to the clamping jaw for driving the sample container accommodating seat to vibrate within a predetermined range, thereby driving the first sample container in the sample container accommodating hole to vibrate under the condition that the bottom of the first sample container is kept lower than the opening of the first sample container, to agitate the blood sample; and preferably, the driving device is arranged on the second agitating device.

Further, the blood sample analyzer described in the present application further includes: a sample receiving assembly, including a sample receiving cover and a sample container receiving hole, and configured for individually feeding a small-volume blood sample or a common-volume blood sample placed in the sample container receiving hole.

Further, the controller of the blood sample analyzer described in the present application is further configured to determine whether the current feeding mode is a first feeding mode or a second feeding mode; when the current feeding mode is determined to be the first feeding mode, the controller controls the sample conveying device to convey the sample rack loaded with the first and/or second sample container; and when the current feeding mode is determined to be the second feeding mode, the controller controls the sample receiving assembly to convey the first or second sample container individually.

Further, the blood sample analyzer described in the present application further includes: a measurement mode setting device for setting a first measurement mode and a second measurement mode; wherein the controller executes the following operations according to the setting of the measurement mode setting device: (1) determining whether the first measurement mode or the second measurement mode is set; (2) when the first measurement mode is determined to be set, controlling the first agitating device to agitate the blood sample in the first sample container; and (3) when the second measurement mode is determined to be set, controlling the second agitating device to pick the second sample container on the sample rack for agitating.

Further, the measurement mode setting device of the blood sample analyzer described in the present application is further configured to set a third measurement mode; and when the third measurement mode is determined to be set, the controller controls the first agitating device to perform agitating operation on the first sample container containing a pre-diluted blood sample.

Further, the carrying device of the blood sample analyzer described in the present application is a part of the second agitating device; and the second agitating device is capable of carrying the first sample container on the sample rack, which is conveyed by the sample conveying device to a agitating position, to the sample container accommodating hole of the first agitating device through the carrying device integrated with the second agitating device.

Further, the controller of the blood sample analyzer described in the present application is capable of controlling agitating parameters of the first agitating device based on the shape and size of the first sample container, volume information of the blood sample, and source information of the sample.

Further, the controller of the blood sample analyzer described in the present application is further configured to determine whether the current feeding mode is a first feeding mode or a second feeding mode; when the current feeding mode is determined to be the first feeding mode, the controller controls the sample conveying device to convey the sample rack loaded with the sample container; and when the current feeding mode is determined to be the second feeding mode, the controller controls the sample receiving assembly to convey a single sample container.

Further, the blood sample analyzer described in the present application further includes: a sample aspirator for aspirating the agitated blood sample from the sample container; and a sample preparing device for preparing a test sample from the blood sample aspirated by the sample aspirator.

Further, in the present application, the first sampling amount is less than the second sampling amount; and preferably, the first sampling amount is 5-50 μL, more preferably 15-35 μL.

Further, the agitating device of the blood sample analyzer described in the present application is configured to only agitate a small-volume whole blood sample or a pre-diluted blood sample.

Further, in the agitating process of the first agitating device, the sampling needle for sampling a blood sample does not touch the blood sample in the first sample container.

Further, the controller of the blood sample analyzer described in the present application is further capable of executing the following operations: (1) determining whether a third measurement mode is set; and (2) when the third measurement mode is determined to be set, controlling the first agitating device to agitate the pre-diluted blood sample in the first sample container.

Further, the controller of the blood sample analyzer described in the present application is further capable of executing the following operations: (1) determining whether a first feeding mode or a second feeding mode is set; (2) when the first feeding mode is determined to be set, controlling the sample conveying device to convey the sample rack loaded with the sample container; and (3) when the second feeding mode is determined to be set, controlling the sample receiving assembly to convey a single sample container.

Further, the blood sample analysis method described in the present application further includes: picking, by the second agitating device, the second sample container from the predetermined position for inverted agitating.

Further, in the blood sample analysis method described in the present application, the volume V of the blood sample in the first sample container is less than or equal to 250 μL, preferably more than or equal to 30 μL, and less than or equal to 250 μL, more preferably more than or equal to 50 μL and less than or equal to 200 μL, and further more preferably more than or equal to 50 μL, and less than or equal to 100 μL.

Further, in the blood sample analysis method described in the present application, in the measurement mode determination step, whether the current measurement mode is a third measurement mode is further determined; a third test sample preparation step: when the current measurement mode is determined to be the third measurement mode, agitating the pre-diluted blood sample in the sample container by the first agitating device, and aspirating a third sampling amount of the agitated pre-diluted blood sample to prepare a third test sample; and in the test step, the third test sample is tested.

Further, the blood sample analysis method described in the present application further includes: a feeding mode determination step: determining whether the current feeding mode is a first feeding mode or a second feeding mode; and/or a sample rack conveying step: when the current feeding mode is determined to be the first feeding mode, controlling the sample conveying device to convey the sample rack loaded with the sample container to a predetermined position, and to convey the sample container after agitating to a first sampling position; and/or a sample receiving assembly closing step: when the current feeding mode is determined to be the second feeding mode, closing the sample receiving assembly, to convey the sample container to a second sampling position.

Further, in the blood sample analysis method described in the present application, in the first test sample preparation step, the second agitating device conveys the sample container on the sample rack to a sample container accommodating hole of the first agitating device for agitating; and in the second test sample preparation step, the second agitating device picks the sample container on the sample rack for inverted agitating.

Further, the blood sample in the sample container that is agitated by the first agitating device is a whole blood sample, and the volume of the blood sample is preferably 30-250 μL, more preferably 50-200 μL, and further more preferably 50-100 μL.

Further, in the blood sample agitating method described in the present application, the rotation speed, the number of rotation times and the number of agitating operation times are configured according to shape and size of the sample container, source information of the sample, and volume of the sample read from label code information on a sample rack or the sample container.

Further, the blood sample agitating method described in the present application further includes: a calculation step: calculating an actual rotation speed and actual number of rotation times of the sample container accommodating seat; a rotation speed comparison step: comparing the calculated actual rotation speed with the preset rotation speed to determine whether the actual rotation speed of the sample container accommodating seat meets an expectation; a rotation number comparison step: if the actual rotation speed meets the expectation, comparing the calculated actual number of rotation times with the preset number of rotation times to determine whether the actual number of rotation times of the sample container accommodating seat meets an expectation; and a agitating operation number determination step: determining whether the number of agitating operation times of the agitating device has reached the preset number of agitating operation times, repeating the above steps if the preset number of agitating operation times is not reached yet, or else completing the agitating of the blood sample if the preset number of agitating operation times is reached.

Further, in the blood sample agitating method described in the present application, when next agitating operation is performed after one agitating operation is completed, driving the sample container accommodating seat to rotate reversely, and preferably, delaying for a predetermined time before the sample container accommodating seat is rotated reversely.

Further, in the blood sample agitating method described in the present application, after one agitating operation is completed, delaying for a predetermined time before next agitating operation is performed.

Further, in the blood sample agitating method described in the present application, the agitating device performs an initialization operation after or before the blood sample is agitated, so that the sample container accommodating seat returns to an initial position.

Further, the blood sample agitating method described in the present application further includes: determining whether the number of swing times or the swing time duration reaches a predetermined value, and completing the agitating of the blood sample if the number of swing times or the swing time duration reaches the predetermined value.

Further, the blood sample agitating method described in the present application further includes: comparing numbering information of a sample rack with pre-stored setting information; and setting the swing frequency Fx based on the comparison result; wherein when the numbering information of the sample rack is consistent with the pre-stored setting information, the swing frequency Fx is set to be a first swing frequency Fn; and when the numbering information of the sample rack is not consistent with the pre-stored setting information, the swing frequency Fx is set to be a second swing frequency F0.

Further, the blood sample agitating method described in the present application further includes: acquiring the numbering information of the sample rack by scanning a label on the sample rack.

Further, according to the blood sample agitating method described in the present application, the number of swing times is calculated by the following steps: calculating a swing cycle Tx of the sample container through the swing frequency Fx; pushing the sample container to one side for a first time duration; pushing the sample container to the other side for a second time duration; and increasing the number of swing times by 1 till the number of swing times reaches the predetermined value; preferably, the first time duration and/or the second time duration are ½ of the swing cycle Tx; more preferably, the number of swing times is calculated by the following steps: rotating a motor by Nb rotations at the same rotation speed as the swing frequency Fx; and increasing the number of swing times by 1 when the Nb rotations are completed, till the number of swing times reaches the predetermined value; and further more preferably, when the Nb rotations are completed, delaying for a predetermined time, and then increasing the number of swing times by 1.

Further, in the blood sample agitating method described in the present application, the sample container is swung back and forth along with the sample container accommodating seat under the drive of a driving device.

Further, in the blood sample agitating method described in the present application, the sample container is swung back and forth along with the sample container accommodating seat about a support point of the sample container accommodating seat, wherein, when being swung, a bottom of the sample container is kept lower than an opening of the sample container.

The devices and methods disclosed based on the above technical solutions can effectively achieve uniform stirring of a small-volume sample such as a peripheral blood sample, and can simultaneously solve the technical problem of affecting measurement results due to insufficient sample aspirating of the analyzer caused by loss of a small-volume sample such as peripheral blood remaining on rubber cap, and can also miniaturize the analyzer while solving the existing technical problems. In addition, the problem of fall-off of the bar code label can also be solved.

BRIEF DESCRIPTION OF THE DRAWINGS

FIG. 57 is a data analysis diagram of four venous blood samples according to the present application;

FIGS. 58-60 are schematic diagrams of a combination of a first agitating device 71 and a sample rack according to the present application;

FIG. 65 is a data diagram of HGB tested in a first measurement mode after 6 small-volume whole blood samples of different volumes are uniformly agitated with a first agitating device 11 according to a first embodiment of the present application.

DETAILED DESCRIPTION OF EMBODIMENTS

The embodiments of the present application will be described in detail below. The embodiments are exemplarily shown in the accompanying drawings. The same or similar reference signs denote the same or similar elements or elements having the same or similar functions. The embodiments described below with reference to the accompanying drawings are exemplary, and are merely used for interpreting the present application, but should not be interpreted as limiting the present application.

Those skilled in the art can appreciate that, unless otherwise specifically stated, the singular forms "a", "an", "the" and "said" used herein may also include plural forms. It should be further appreciated that the term "include" used in the description of the present application indicates the existence of stated features, integers, steps, operations, elements and/or components, but do not exclude the existence or addition of one or more other features, integers, steps, operations, elements, components and/or combinations thereof. It should be appreciated that when one element is "connected" to another element, it may be connected to the another element directly or by an intermediate element. In addition, the "connected" used herein may include wireless connection. The term "and/or" used herein includes all or any unit and all combinations of one or more associated items listed.

It can be appreciated by those skilled in the art that, unless otherwise defined, all the terms (including technical terms and scientific terms) used herein have the same meanings as those understood by the person of ordinary skill in the art of the present application. It should also be appreciated that the terms such as those defined in a general dictionary should be interpreted as having meanings consistent with the meanings in the context of the prior art, unless specifically defined as here, otherwise they will not be interpreted by idealized or too formal meanings.

Considering that the amount of a peripheral blood sample collected is small and the fluidity thereof is poor, the peripheral blood often adheres to the bottom or wall of a blood collection tube and does not flow when the blood collection tube is inverted, and the inverted agitating easily causes spilling of the blood sample or loss of the blood sample, the traditional inverted agitating technology has difficulties in solving the problem of agitating the peripheral blood. Based on this, the present application proposes a method and device for automatically agitating a small-volume sample, and an analyzer with a function of automatically agitating a small-volume sample, which agitate the small-volume sample by driving a sample container to move, wherein a bottom of the sample container is kept under an opening of the sample container during agitating, and the method can uniformly agitate the small-volume sample without sample spilling and sample adhering to a tube cap.

Embodiment 1

Figure 1:
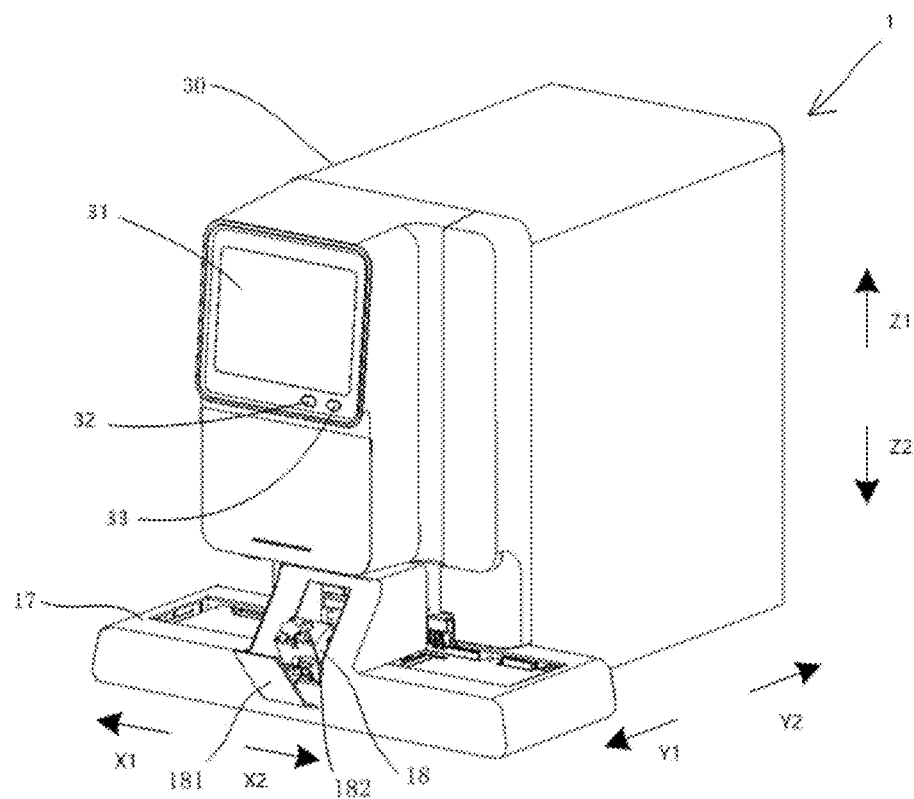
FIG. 1 is an appearance perspective view of a blood sample analyzer according to an embodiment of the present application.
Figure 2:
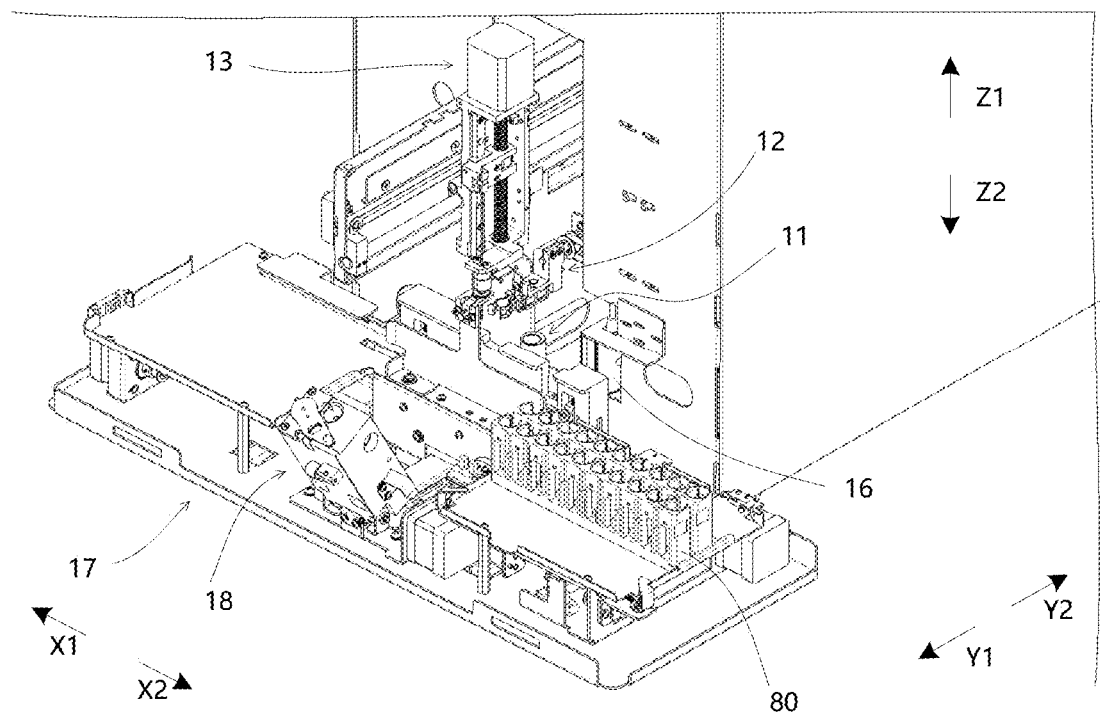
FIGS. 2 and 3 are partial perspective views of a blood sample analyzer according to an embodiment of the present application, with some component hidden.
Figure 3:
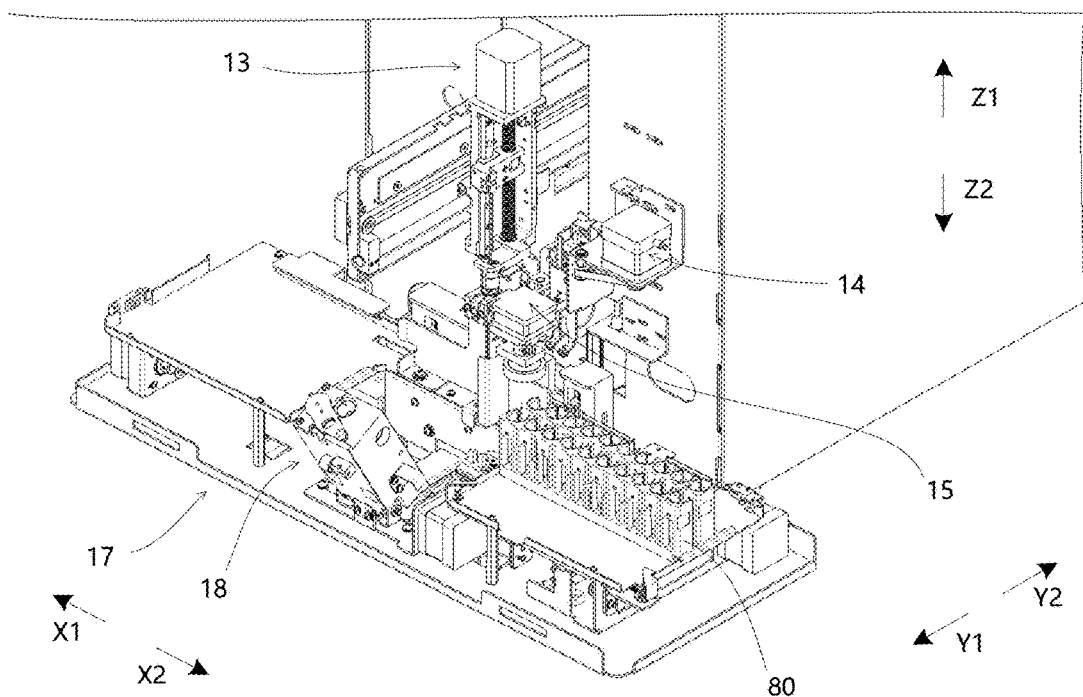

FIG. 1 is appearance perspective view of a blood sample analyzer according to this embodiment; and FIGS. 2 and 3 are partial perspective views of the blood sample analyzer with some components hidden. As shown in FIG. 1, the blood sample analyzer 1 includes a main body, a housing 30, a sample conveying device 17 arranged in front of the main body, etc. The housing 30 is provided with a display component 31, an operation button 32, an operation button 33, etc. The display component 31 may be a touch screen for touch operation, and input equipment 23 (such as a soft keyboard) can be displayed by touching the display component 31 (see FIG. 24). In this embodiment, the input equipment 23 may also be independently provided as hardware.

The main body may almost be accommodated in the housing 30, and includes a first agitating device 11 and a second agitating device 12 for agitating a blood sample in a sample container (blood collection tube) 91 (92, 93, 94) (see FIGS. 15-18), a sample aspirator 13 for aspirating the blood sample agitated by the first agitating device 11 or the second agitating device 12 from the sample container 91 (92, 93, 94), a container rotating code-scanning device (including a container pressing assembly 14, a container rotating assembly 15, and a code scanner 16) for acquiring sample code information of a label of a sample rack 80 conveyed by the sample conveying device 17 to a scanning position (not shown) and a label of the sample container 91 (92, 93, 94), a sample preparing device (not shown) for preparing a test sample from the blood sample aspirated by the sample aspirator 13, a tester (not shown) for testing blood cells in the blood from the test sample prepared by the sample preparing device, a controller 21 electrically connected to the display component 31, the operation button 32, the operation button 33 and corresponding components of the main body, etc.

Figure 22:
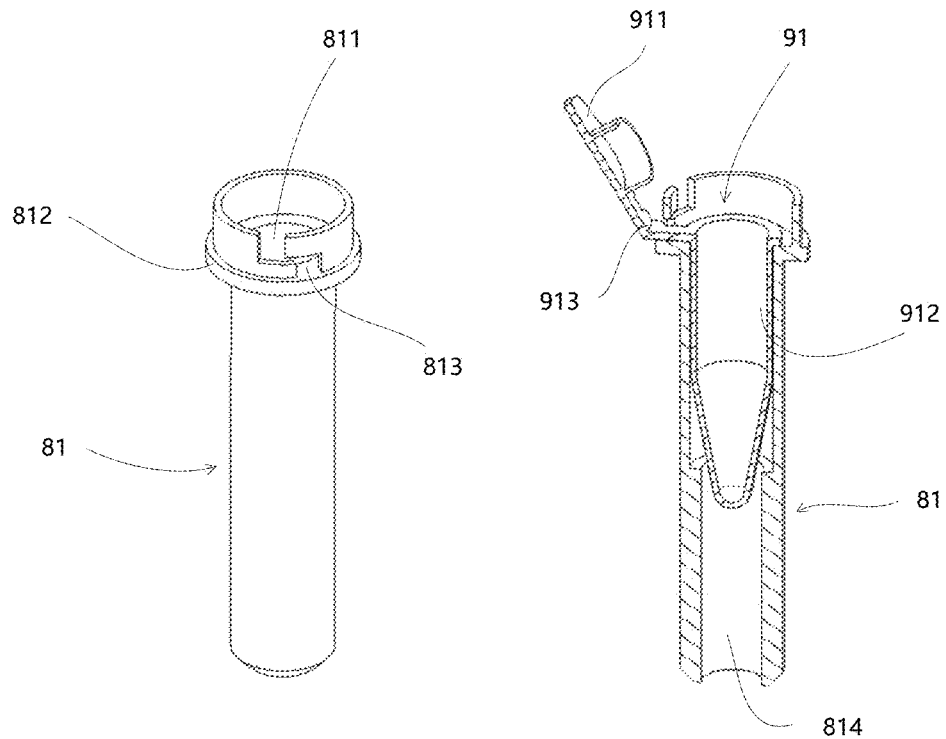
FIG. 22 is a schematic structural diagram of an adapter according to an embodiment of the present application.
Figure 23:
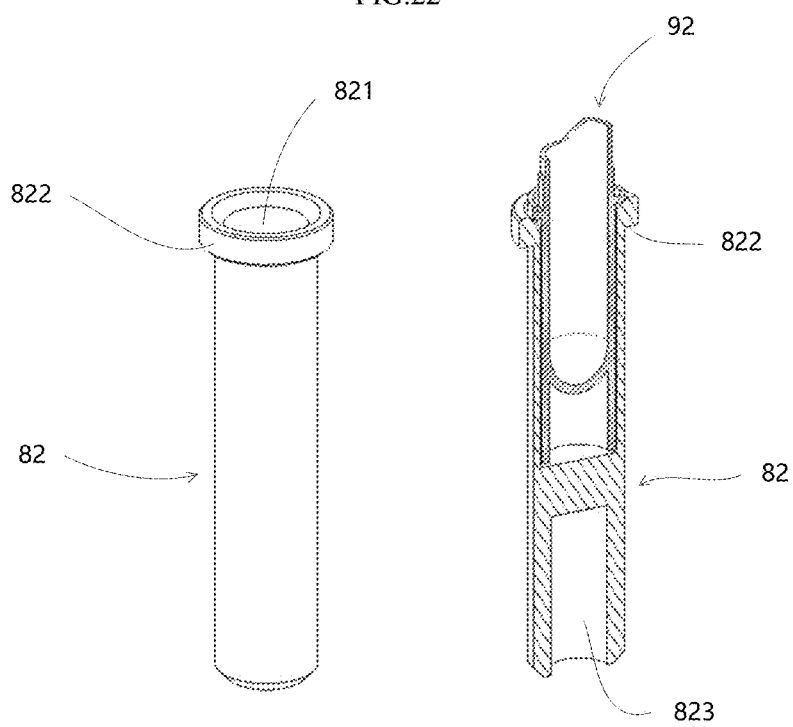
FIG. 23 is a schematic structural diagram of another adapter according to an embodiment of the present application.

In this embodiment, the blood sample analyzer 1 may further include a sample receiving assembly 18, which is used for individually feeding a single small-volume blood sample or a single common-volume blood sample, and is usually used for the measurement of emergency samples. The sample receiving assembly 18 is provided with a sample receiving cover 181 and a sample container receiving hole 182. When an emergency sample is required to be measured, the sample receiving cover 181 can be opened, so that the sample container containing the emergency sample can be placed into the sample container receiving hole 182 for fixing the sample container, or the sample container can be taken out from the sample container receiving hole 182. The diameter of the sample container receiving hole 182 is slightly larger than the outer diameter of the sample container or an adapter 81 (82) (see FIGS. 22 and 23) to be placed.

Figure 4:
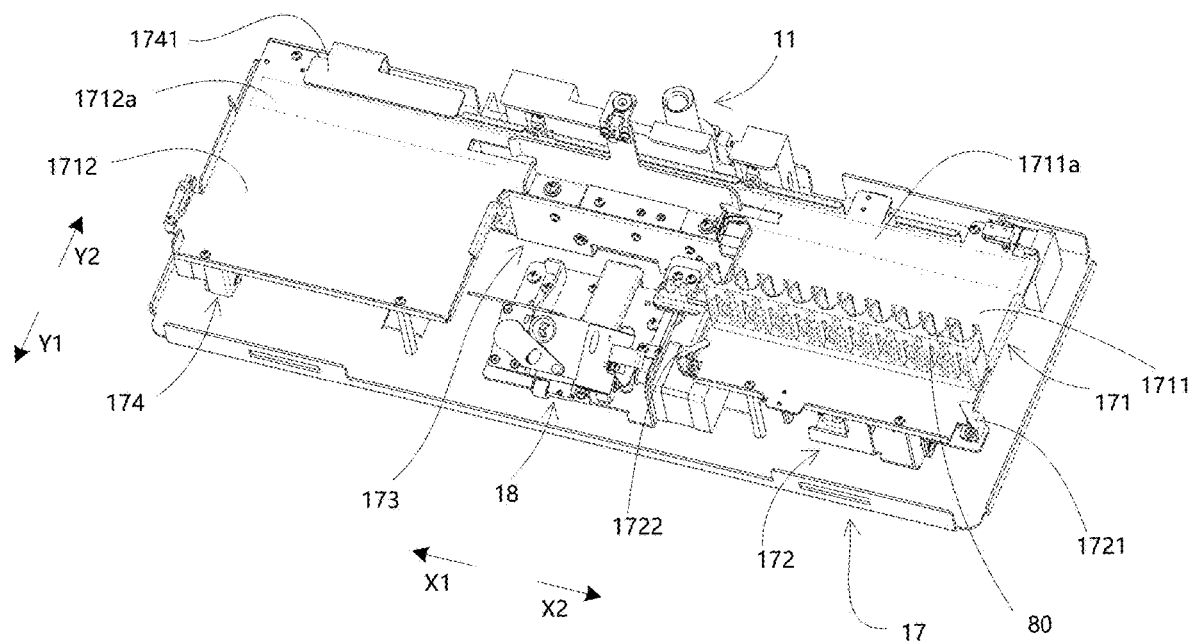
FIG. 4 is a schematic structural diagram of a sample conveying device according to an embodiment of the present application.

FIG. 4 is a schematic structural diagram of the sample conveying device according to this embodiment. As shown in FIG. 4, the sample conveying device 17 includes: a sample rack supporting component 171, a sample rack loading device 172, a sample rack bi-directional feeding device 173, and a sample rack unloading device 174.

The sample rack supporting component 171 includes: a pre-analysis sample rack storage section 1711 capable of storing a plurality of sample racks 80 holding sample containers containing pre-analysis samples, a post-analysis sample rack storage section 1712 capable of storing a plurality of sample racks 80 holding sample containers containing post-analysis samples, and a sample analysis section (not shown) between the pre-analysis sample rack storage section 1711 and the post-analysis sample rack storage section 1712. A sample rack loading turning section 1711a is on one side of the pre-analysis sample rack storage section 1711, and a sample rack unloading turning section 1712a is in the post-analysis sample rack storage section 1712.

The sample rack loading device 172 is provided with sample rack loading components 1721 and 1722. The sample rack loading components 1721 and 1722 can push the sample racks 80 stored in the pre-analysis sample rack storage section 1711 to the sample rack loading turning section 1711a one by one by moving in Y2 direction. The sample rack loading components 1721 and 1722 are driven by a stepper motor not shown. The sample rack 80 entering the sample rack loading turning section 1711a are further conveyed along X1 direction by the sample rack bi-directional feeding device 173. The sample containers 91 (92, 93, 94) containing samples that enter the analysis section are sequentially conveyed to a scanning position and scanned by the container rotating code-scanning device 14-16, then the sample container 91 (92, 93, 94) conveyed to a predetermined position is conveyed to the first agitating device 11 or the second agitating device 12 for agitating, and the sample container 91 (92, 93, 94) after agitating is returned to the predetermined position and then conveyed to a sampling position, so that the sample aspirator 13 aspirates the blood sample agitated by the first agitating device 11 or the second agitating device 12 from the sample container 91 (92, 93, 94), and the sample preparing device prepares a test sample from the blood sample aspirated by the sample aspirator 13, and the tester tests blood cells in the test sample prepared by the sample preparing device.

After the sample rack 80 holding sample containers containing samples is conveyed by the sample rack bi-directional feeding device 173 to the sample rack unloading turning section 1712a, a sample rack unloading component 1741 of the sample rack unloading device 174 is moved horizontally along Y1 direction to push the sample rack 80 to the post-analysis sample rack storage section 1712. The sample rack unloading component 1741 is driven by a stepper motor not shown.

Figure 5:
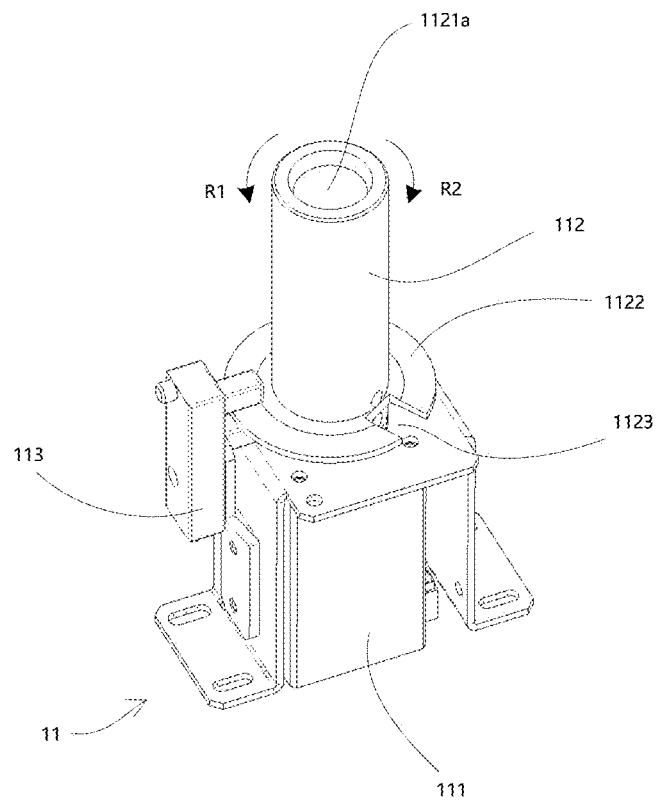
FIG. 5 is a schematic structural diagram of a first agitating device with a concentric rotation accommodating hole according to an embodiment of the present application.
Figure 6:
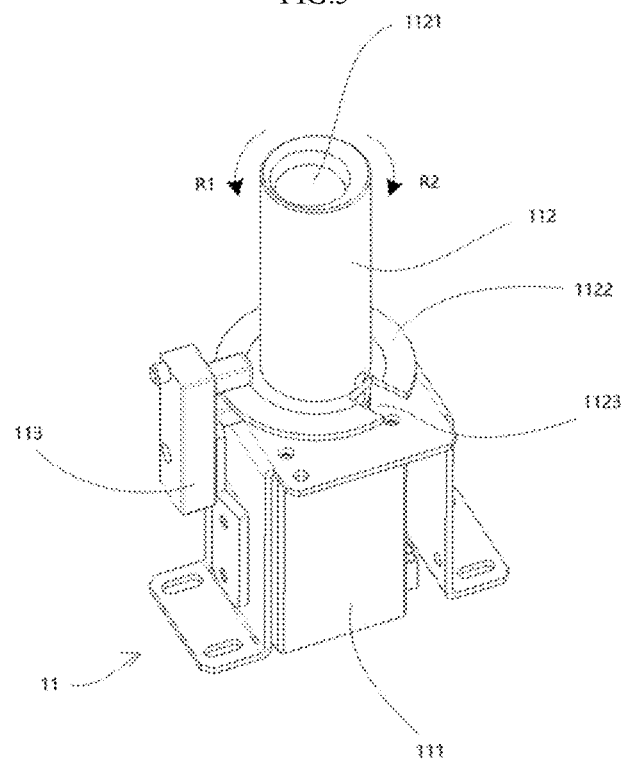
FIG. 6 is a schematic structural diagram of a first agitating device with an eccentric rotation accommodating hole according to an embodiment of the present application.

FIG. 5 is a schematic structural diagram of the first agitating device with a concentric rotation accommodating hole according to this embodiment; and FIG. 6 is a schematic structural diagram of the first agitating device with an eccentric rotation accommodating hole according to this embodiment. As shown in FIG. 5 or FIG. 6, the first agitating device 11 includes a motor 111, a sample container accommodating seat 112, and a sensor 113. The motor 111 may be a stepper motor, a servo motor or a DC motor. In this embodiment, the motor 111 is preferably a stepper motor.

The sample container accommodating seat 112 is fixed on a rotating shaft of the motor 111 by screws or other suitable ways, the motor 111 provides rotation driving force for the sample container accommodating seat 112, and the sample container accommodating seat 112 can be rotated synchronously with the rotating shaft of the motor 111. Preferably, the sample container accommodating seat 112 may be set as a part of the rotating shaft of the motor 111, that is, the rotating shaft of the motor 111 and the sample container accommodating seat 112 are integrally formed without an additional connection, which can avoid loosening of the sample container accommodating seat 112 during use, and can miniaturize the device since no screws for installation are required.

The sensor 113 is used to detect whether the sample container accommodating seat 112 is rotated at a set rotation speed and number of rotation times. A lower part of the sample container accommodating seat 112 is provided with a sensor blocking portion 1122 and a notch 1123. Every time the sample container accommodating seat 112 rotates a turn, the notch 1123 passes a sensing region of the sensor 113 once, and the state of the sensor 113 changes from blocking to not blocking and again to blocking. The controller 21 can calculate the rotation speed of the sample container accommodating seat 112 by monitoring the cycle of signal outputting by the sensor 113, and can obtain the number of rotation times of the sample container accommodating seat 112 by monitoring the number of j umps of the output signals of the sensor 113. Those skilled in the art can appreciate that the lower part of the sample container accommodating seat 112 may also be provided with a sensor tab, so that the state of the sensor 113 changes from blocking to not blocking and again to blocking for calculating the rotation speed.

A top part of the sample container accommodating seat 112 is further provided with a sample container accommodating hole 1121 (1121a), and the diameter of the accommodating hole 1121 (1121a) is slightly larger than the outer diameter of the sample container or adapter 81 (82) (see FIGS. 22 and 23) to be placed. The center of the accommodating hole 1121 may be set to coincide with the axis of the rotating shaft of the motor 111 (refer to FIG. 5), and such setting causes the sample container 91 (92, 93, 94) in the accommodating hole 1121 to rotate concentrically. The center of the accommodating hole 1121a may also be set to not coincide with the axis of the rotating shaft of the motor 111 (refer to FIG. 6), and such setting causes the sample container 91 (92, 93, 94) in the accommodating hole 1121a to rotate eccentrically. In this embodiment, the accommodating hole is preferably set in an eccentric rotation way.

Before agitating, the sample container 91 (92, 93, 94) is placed into the sample container accommodating hole 1121 (1121a), and then the controller 21 controls the motor 111 to drive the sample container accommodating seat 112 together with the sample container 91 (92, 93), 94) to rotate, so that the sample in the sample container 91 (92, 93, 94) forms a vortex to achieve the purpose of agitating the blood sample. In addition, different blood samples have different properties, and since the sources of the blood samples are different, the properties of blood cells in the samples are also different. For example, red blood cells in the blood samples of infants are fragile and are easily broken during agitating, so the agitating parameters of these blood samples are set differently from that of normal blood samples. Therefore, in this embodiment, different rotation speeds of the motor 111 can be set on the operation interface according to the differences in the shape and size of the sample container, the source information of the sample, and the volume of the sample. The controller 21 can control the motor 111 to rotate at different speeds based on the set different rotation speeds and the shape and size of the sample container, the source information of the sample, and the volume information of the sample acquired from the code information on the label of the sample rack 80 or sample container 91 (92, 93, 94), to ensure that the samples of different volumes or sources or in the sample containers of different shapes, volumes or sources can be agitated uniformly, and the blood samples will not spill out of the sample containers or not adhere to the caps of the sample containers, thereby reducing the damage to blood components in the blood samples.

In this embodiment, the sample container accommodating seat 112 may rotate counterclockwise (R1 direction in FIG. 5) or clockwise (R2 direction in FIG. 5), or rotate counterclockwise and clockwise alternately. Preferably, the sample container accommodating seat 112 can rotate counterclockwise and clockwise alternately.

In this embodiment, the first agitating device 11 is used to agitate the sample in the sample container placed in the sample container accommodating hole 1121 (1121a) in a non-inverting agitating way.

Preferably, the sample container may be one or more of small-volume blood collection tubes 91 to 93, or other type of small-volume blood collection tube; the sample container contains a small-volume blood sample, usually 250 μL; the sample in the sample container may be a whole blood sample or a pre-diluted sample; the sample in the sample container may be a small-volume peripheral blood or a small-volume venous blood, any sample with a volume of less than or equal to 250 μL is suitable for being agitated using the first agitating device 11, and the volume of the whole blood sample in the sample container is preferably 30-250 μL, more preferably 50-200 μL, and further more preferably 50-100 μL. Herein, the whole blood sample refers to a blood sample that is not diluted but directly collected from a human or animal.

In this embodiment, the first agitating device 11 agitates the sample in the blood collection tube by driving the first sample container to move. In the agitating process, the bottom of the first sample container is kept under the opening of the container, and a sampling needle of the analyzer 1 does not touch the blood sample in the first sample container. The first agitating device 11 can uniformly agitate a small-volume sample without blood sample spilling and blood sample adhering to a tube cap.

Figure 7:
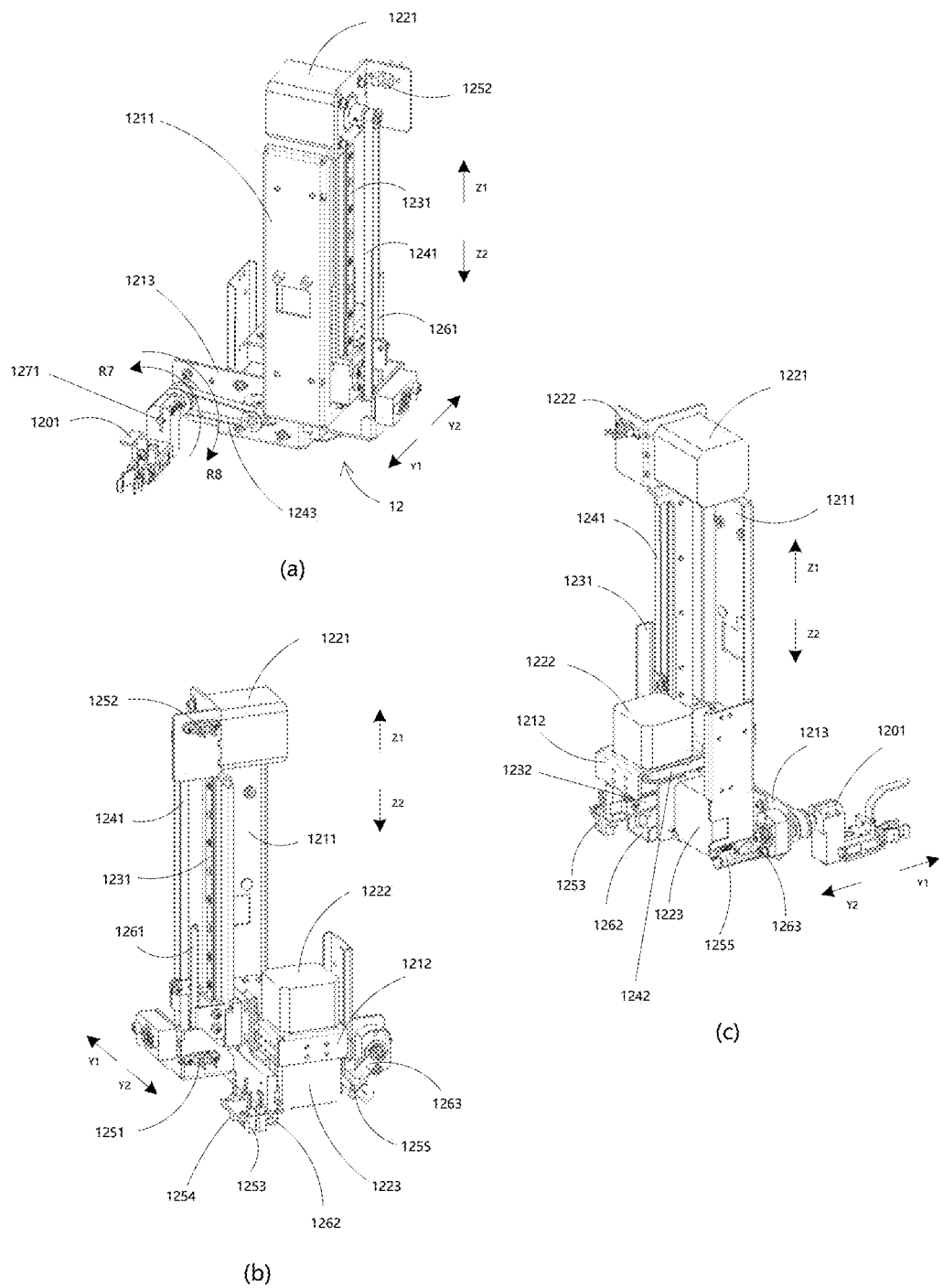
FIG. 7 is a schematic structural diagram of a second agitating device according to an embodiment of the present application.

FIG. 7 is a schematic structural diagram of the second agitating device according to this embodiment. The second agitating device 12 is used to agitate a sample in a common-volume blood sample container placed on the sample rack 80 and conveyed by the sample conveying device 17 to a predetermined position of the analyzer 1 in an inverted agitating way. The common-volume blood sample container may be a venous blood collection tube 94 (see FIG. 18) or other type of venous blood collection tube; the common-volume blood sample container contains a second sample amount of sample (common-volume blood sample) that is significantly larger than the first sample amount (small-volume blood sample), and the second sample amount is usually more than or equal to 1 mL; and the sample in the common-volume blood sample container is a venous whole blood sample.

As shown in FIG. 7, the second agitating device 12 includes: a clamping jaw 1201, a first support frame 1211, a second support frame 1212, a third support frame 1213, stepper motors 1221-1223, linear slide rails 1231 and 1232, ring-shaped synchronous toothed belts 1241-1243 wound around synchronous wheels, position sensors 1251-1255, sensor chips 1261-1263, and a rotating shaft 1271.

The first support frame 1211 is a main support of the second agitating device 12 and is used to fix the stepper motor 1221, the linear slide rail 1231 and the position sensors 1251-1252, and the first support frame 1211 is fixed to a front plate of the analyzer 1 by screws; the linear slide rail 1231 is placed along Z1 and Z2 directions, and the second support frame 1212 and the sensor chip 1261 are connected to a slider of the linear slide rail 1231 and can slide in Z1 or Z2 direction; the second support frame is used to fix the stepper motor 1222, the linear slide rail 1232, and the position sensors 1253-1254; the linear slide rail 1232 is placed along Y1 and Y2 directions, and the third support frame 1213 and the sensor chip 1262 are connected to a slider of the linear slide rail 1232 and can slide in Y1 or Y2 direction; the third support frame 1213 is used to fix the stepper motor 1223 and the position sensor 1255, the rotating shaft 1271 is rotatably fixed on the third support frame 1213, and the rotating shaft 1271 is rotatable in R7 or R8 direction; and the clamping jaw 1201 and the sensor chip 1263 are fixedly connected to the rotating shaft 1271, and can follow the rotating shaft 1271 to rotate in R7 or R8 direction.

The ring-shaped synchronous toothed belt 1241 is driven by the rotation of the stepper motor 1221 and rotates under the guidance of two synchronous wheels. The second support frame 1212 is connected to the ring-shaped synchronous toothed belt 1241, and the second support frame 1212 can drive the clamping jaw 1201 and the sensor chip 1261 to move in Z1 or Z2 direction under the drive of the stepper motor 1221; the position sensors 1251 and 1252 cooperate with the sensor chip 1261 to position the clamping jaw 1201 in Z1 or Z2 direction. When the second support frame 1212 drives the clamping jaw 1201 to move in Z1 direction, the clamping jaw 1201 is positioned using the position sensor 1252, and when the second support frame 1212 drives the clamping jaw 1201 to move in Z2 direction, the clamping jaw 1201 is positioned using the position sensor 1251.

The ring-shaped synchronous toothed belt 1242 is driven by the rotation of the stepper motor 1222 and rotates under the guidance of two synchronous wheels. The third support frame 1213 is connected to the ring-shaped synchronous toothed belt 1242, and the third support frame 1213 can drive the clamping jaw 1201 and the sensor chip 1262 to move in Y1 or Y2 direction under the drive of the stepper motor 1222; the position sensors 1253 and 1254 cooperate with the sensor chip 1262 to position the clamping jaw 1201 in Y1 or Y2 direction. When the third support frame 1213 drives the clamping jaw 1201 to move in Y1 direction, the clamping jaw 1201 is positioned using the position sensor 1254, and when the third support frame 1213 drives the clamping jaw 1201 to move in Y2 direction, the clamping jaw 1201 is positioned using the position sensor 1253.

The ring-shaped synchronous toothed belt 1243 is driven by the rotation of the stepper motor 1223 and rotates under the guidance of two synchronous wheels. The rotating shaft 1271 drives the clamping jaw 1201 to rotate in the R7 or R8 direction under the drive of the stepper motor 1223; and the position sensor 1255 cooperates with the sensor chip 1263 to position the clamping jaw during movement in the R8 direction.

Except for agitating the sample in the venous blood collection tube, the second agitating device 12 is further capable of picking a sample container through the clamping jaw 1201, and carrying the sample container between the sample rack 80 and the accommodating hole 1121 of the sample container accommodating seat 112 of the first agitating device 11. The specific operation process will be described in detail later.

Figure 8:
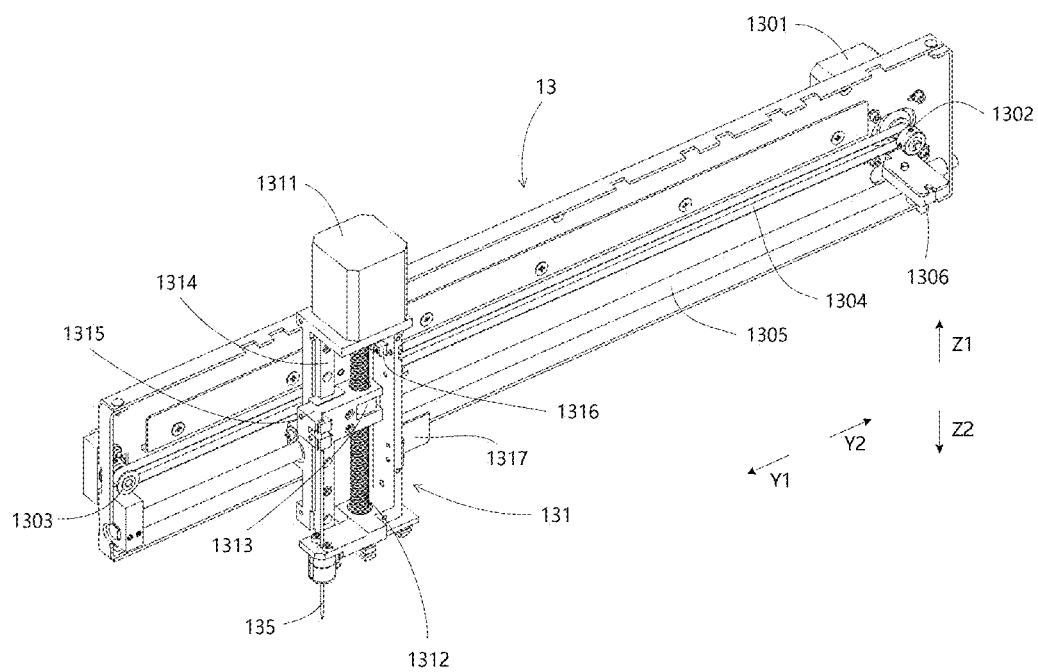
FIG. 8 is a schematic structural diagram of a sample aspirator according to an embodiment of the present application.

FIG. 8 is a schematic structural diagram of the sample aspirator according this embodiment. As shown in FIG. 8, the sample aspirator 13 is used to aspirate the blood sample from the sample container 91 (92, 93, 94) conveyed by the sample conveying device 17 to the sampling position of the analyzer 1 for sample preparation.

As shown in FIG. 8, the sample aspirator 13 includes: a sample aspirating needle 135, a sample aspirating needle moving assembly 131, a stepper motor 1301, synchronous wheels 1302 and 1303, a ring-shaped synchronous toothed belt 1304 wound around the synchronous wheels 1302 and 1303, a linear guide rod 1305 placed along Y1 and Y2 directions, a position sensor 1306, etc.

The sample aspirating needle moving assembly 131 is connected to the ring-shaped synchronous toothed belt 1304 by a connector. The ring-shaped synchronous toothed belt 1304 is driven by the rotation of the stepper motor 1301 and rotates under the guidance of the two synchronous wheels 1302 and 1303. The sample aspirating needle moving assembly 131 can drive the sample aspirating needle 135 to move in Y1 or Y2 direction under the drive of the stepper motor 1301. The initial position of the sample aspirating needle moving assembly 131 in Y1 or Y2 direction is positioned by the position sensor 1306 and a sensor chip 1318 fixed on the sample aspirating needle moving assembly 131.

The sample aspirating needle moving assembly 131 includes: a stepper motor 1311, a screw rod 1312, a nut 1313, a linear slide rail 1314, a sample aspirating needle fixture 1315, a position sensor 1316, a sensor chip 1317, etc.

The sample aspirating needle 135 is fixed on the sample aspirating needle fixture 1315, the sample aspirating needle fixture 1315 is fixed on the linear slide rail 1314 placed in Z1 or Z2 direction by screws, the nut 1313 is stuck in a slot of the sample aspirating needle fixture 1315, and the nut 1313 and the sample aspirating needle fixture 1315 do not rotate relative to each other. The screw rod 1312 is connected to a rotating shaft of the stepper motor 1311 by screws. The stepper motor 1311 can drive the screw rod 1312 to rotate, and drive the sample aspirating needle fixture 1315 to make the sample aspirating needle 135 move in Z1 or Z2 direction. The initial position of the sample aspirating needle 135 in Z1 or Z2 direction is positioned by the position sensor 1317 and an optical coupling sensor chip (not shown) arranged on the sample aspirating needle fixture 1315.

Under the drive of the stepper motor 1301 and the stepper motor 1311, the sample aspirating needle 135 can move in two dimensions in Y1 or Y2 direction and Z1 or Z2 direction. The functions of aspirating the blood sample from the sample container and dispensing the blood sample to the sample preparing device can be realized.

Figure 11:
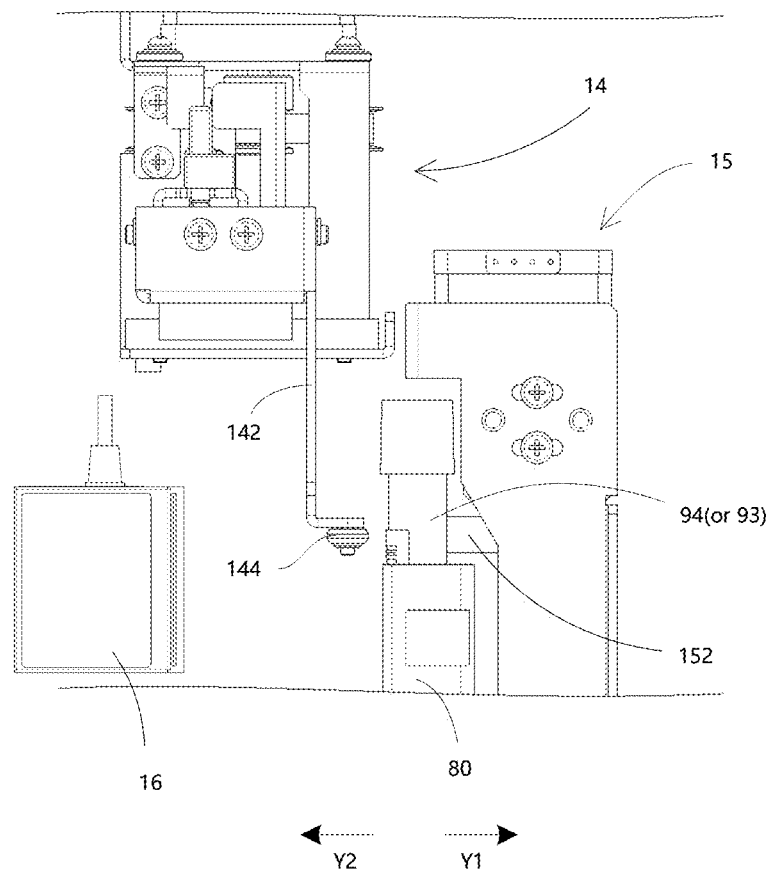
Figure 12:
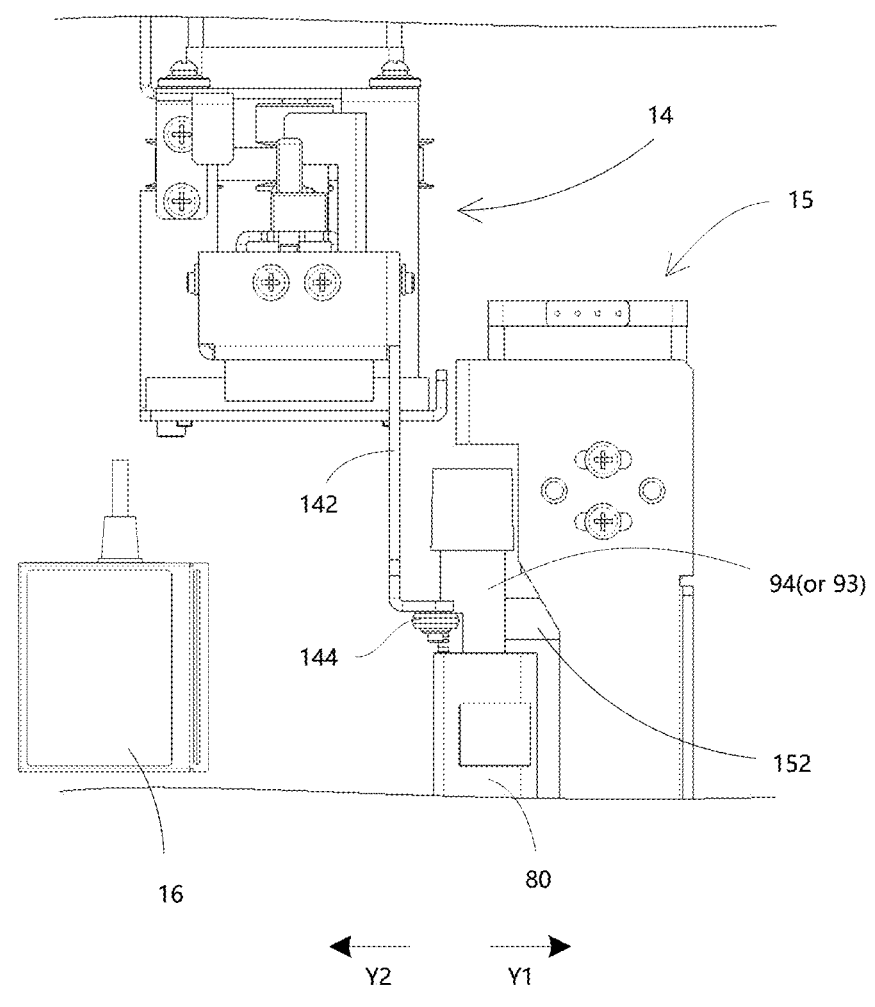
Figure 13:
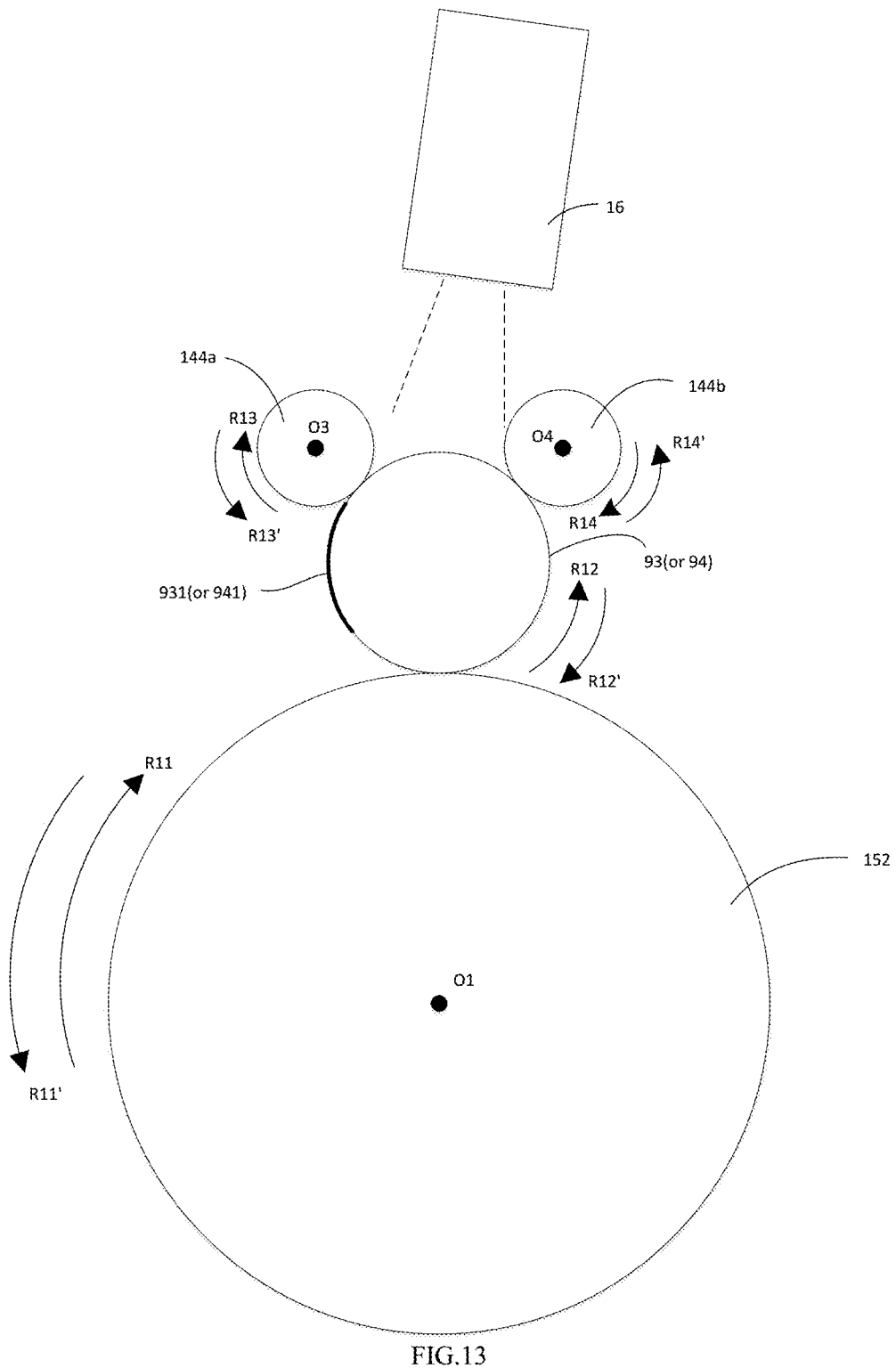
FIGS. 13 and 14 are working principle diagrams of a container rotating code-scanning device according to an embodiment of the present application.
Figure 14:
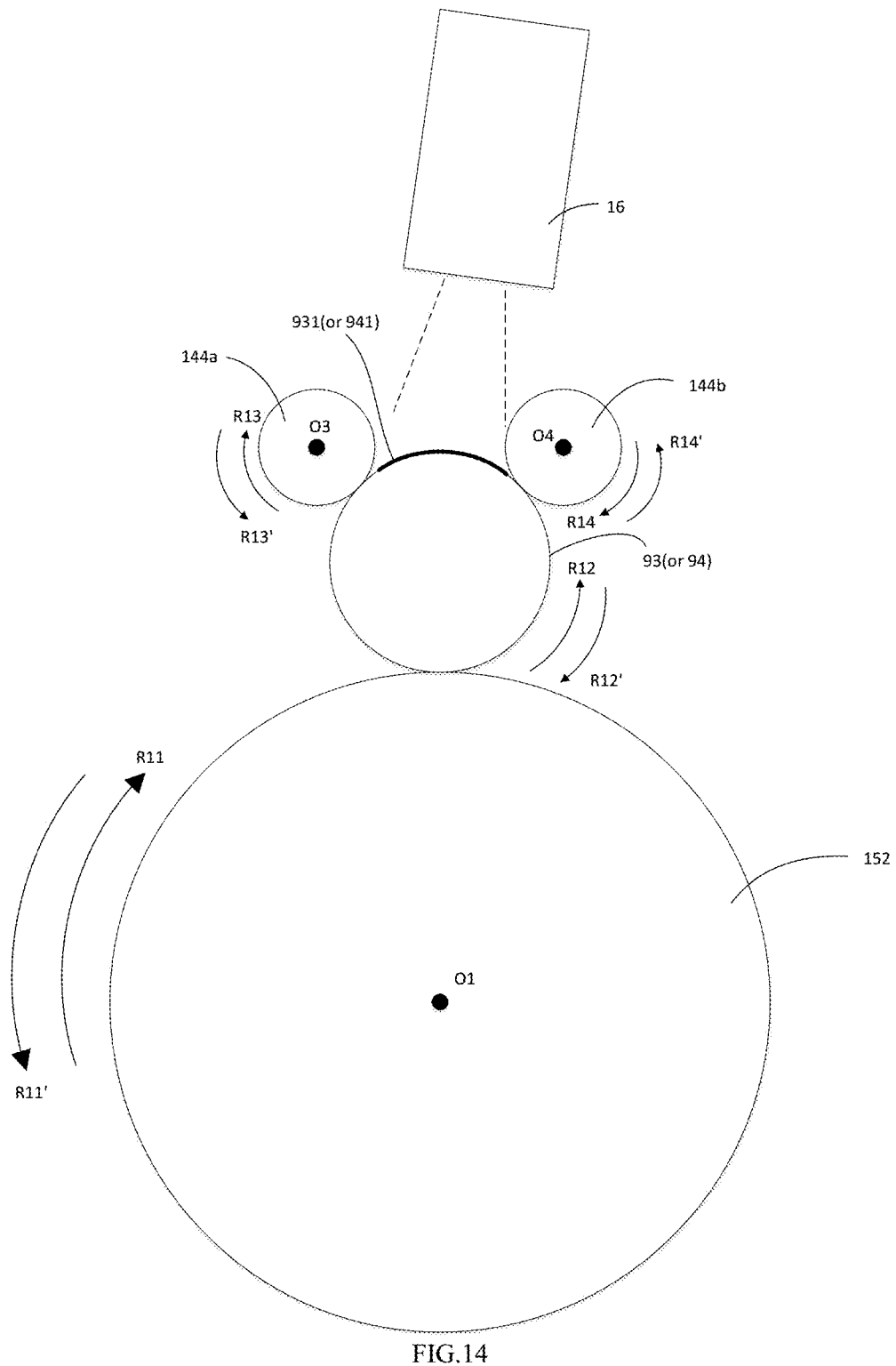

FIGS. 9-12 are schematic structural diagrams of the container rotating code-scanning device according to this embodiment; and FIGS. 13 and 14 are schematic diagrams for illustrating the working principle of the container rotating code-scanning device according to this embodiment.

The container rotating code-scanning device 14-16 (wherein 14 is the container pressing assembly, 15 is the container rotating assembly, 16 is the code scanner) is used to read code information of the sample from the label of the sample container conveyed by the sample conveying device 17 to the scanning position of the analyzer 1, and is used for sample information management of the analyzer.

Figure 9:
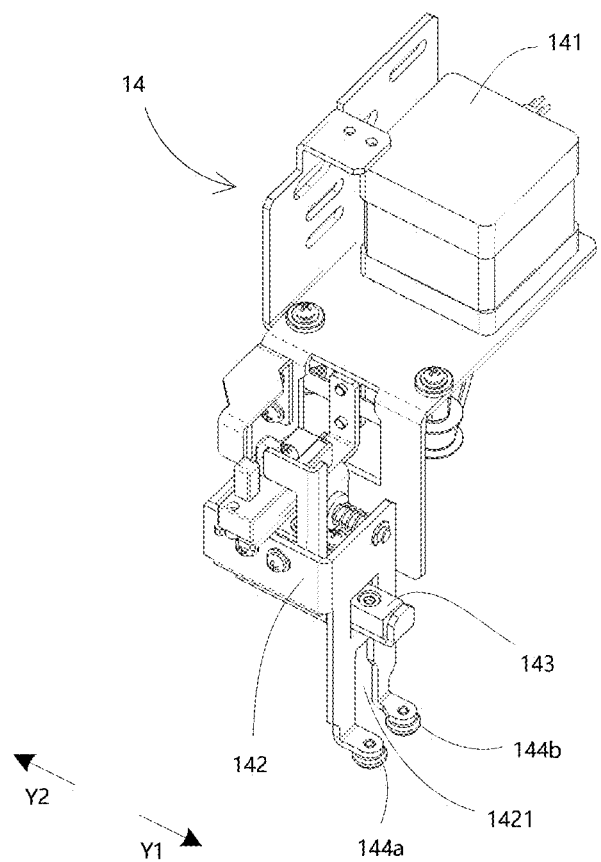
FIGS. 9-12 are schematic structural diagrams of a container rotating code-scanning device according to an embodiment of the present application.

As shown in FIG. 9, the container pressing assembly 14 includes: a stepper motor 141, a follower wheel support 142, a linear slide rail 143, and two follower wheels 144a and 144b. The follower wheels 144a and 144b are rotatably fixed on the follower wheel support 142, and the follower wheel support 142 is fixed on a slider of the linear slide rail 143. The linear slide rail 143 is arranged along Y1 or Y2 direction. Under the drive of the stepper motor 141, the follower wheel support 142 can drive the follower wheels 144a and 144b to move in Y1 or Y2 direction. In addition, the follower wheel support 142 is provided with a notch 1421 for avoiding blocking a scan window of the code scanner 16.

Figure 10:
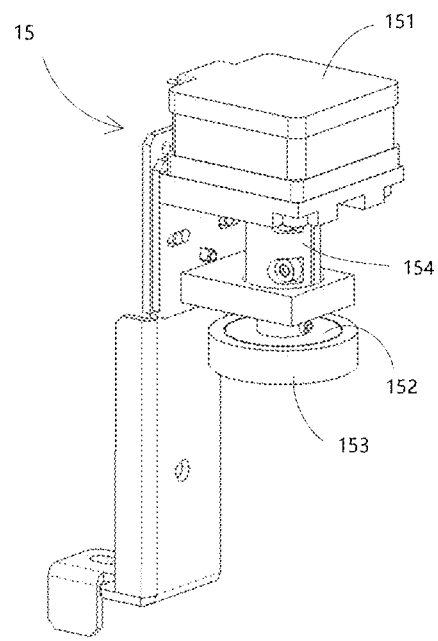

As shown in FIG. 10, the container rotating assembly 15 includes: a stepper motor 151, a rotating wheel 152, a rubber pad 153, and a coupling 154. The rotating wheel 152 is connected to a rotating shaft of the stepper motor 151 through the coupling 154. Under the drive of the stepper motor 151, the rotating wheel 152 can rotate counterclockwise or clockwise. The rubber pad 153 sleeved on an outer ring of the rotating wheel 152 is provided for increasing the friction between the rotating wheel 152 and the container.

As shown in FIG. 11, at the initial position of the container pressing assembly 14, under the drive of the stepper motor 141, the follower wheel support 142 can drive the follower wheels 144a and 144b to move in Y1 direction, to push the sample container 93 or 94 toward the rotating wheel 152 of the container rotating assembly 15 (see FIG. 12). At this time, if the rotating wheel 152 of the container rotating assembly 15 rotates about its central point O1 in R11 direction under the drive of the stepper motor 151, the sample container 93 (or 94) and the follower wheels 144a and 144b rotate about respective central axes O2, O3 and O4 in R12, R13 and R14 directions under the action of friction; or if the stepper motor 151 drives the rotating wheel 152 to rotate about its central point O1 in R11' direction, the sample container 93 (or 94) and the follower wheels 144a and 144b rotate about respective central axes O2, O3 and O4 in R12', R13' and R14' directions (see FIG. 13). During the rotation of the sample container 93 (or 94), the bar code label 931 (or 941) pasted on the sample container will face the code scanner 16 in a certain phase, and the code scanner 16 can read numbering information of the bar code label 931 (or 941) on the sample container 93 (or 94) (see FIG. 14).

In this embodiment, the container rotating code-scanning device can support code scanning of sample containers such as sample containers 93 and 94. However, the container rotating code-scanning device is not limited to code scanning of elongated sample containers such as sample containers 93 and 94, but can also support code scanning of sample containers that have appropriate heights and inner diameters, can be placed in a sample rack and can be pasted with bar codes on tube walls.

Figure 15:
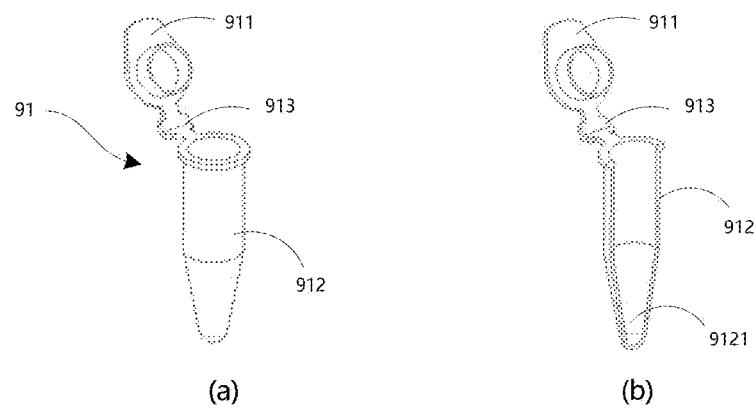
FIG. 15 is a schematic structural diagram of a sample container for a small-volume blood sample according to an embodiment of the present application.

FIG. 15 is a schematic structural diagram of a sample container for a small-volume blood sample according to this embodiment. In this embodiment, the sample container for a small-volume blood sample may be a small-volume blood collection tube. FIG. 15 (a) illustrates a structural perspective view of the small-volume blood collection tube, and FIG. 15 (b) illustrates a schematic cross-sectional view of a body of the small-volume blood collection tube. As shown in FIG. 15, a cap 911 of the small-volume blood collection tube 91 is connected to a body 912 by a connecting portion 913, and the cap 911 and the body 912 are inseparable. An inner cavity bottom 9121 of the body 912 is an inverted cone cavity. Compared with a hemispherical cavity, a higher liquid level can be obtained by the inverted cone cavity when accommodating a small-volume sample, which facilitates the sample aspirating needle to aspirate the sample. The blood collection method for the small-volume blood collection tube 91 is generally as follows: peripheral blood is first aspirated into a capillary tube (not shown, which is an elongated glass tube or plastic tube with a very small inner diameter), and then the blood sample is injected into the small-volume blood collection tube 91. The cap 911 of the small-volume blood collection tube 91 is generally made of the same material as the body 912 (hard material such as plastic). This kind of blood collection tube cannot be punctured (which will damage the sample aspirating needle, and plastic debris may fall into the blood collection tube, thereby contaminating the blood sample), so the cap should be removed before measurement.

Figure 16:
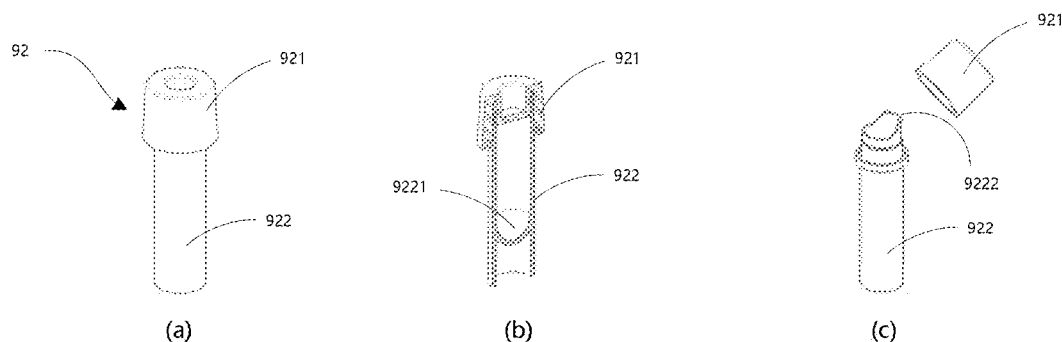
FIG. 16 is a schematic structural diagram of another sample container for a small-volume blood sample according to an embodiment of the present application.

FIG. 16 is a schematic structural diagram of another sample container for a small-volume blood sample in this embodiment. FIG. 16 (a) illustrates a structural perspective view of the small-volume blood collection tube, FIG. 16 (b) illustrates a schematic cross-sectional view of a body of the small-volume blood collection tube, and FIG. 16 (c) illustrates a structural perspective view of the small-volume blood collection tube with its cap opened. As shown in FIG. 16, the cap 921 and the body 922 of the small-volume blood collection tube 92 are separable. According to the material of the cap 921, the small-volume blood collection tube 92 can be classified as a puncturable type or a non-puncturable type. If the cap 921 is made of a hard material such as plastic, it is a non-puncturable type and the cap should be removed before measurement; and if the cap 921 is made of a soft material such as rubber, it is a puncturable type type, and the cap 921 does not need to be removed before measurement. An inner cavity bottom 9221 of the small-volume blood collection tube 92 is at the lower part or middle lower part of the body 922. The inner cavity bottom 9221 has a paraboloid of revolution, an ellipsoid or a sphere, and the diameter of the inner cavity is smaller than the diameter of the inner cavity of the venous blood collection tube 94, so as to obtain a relatively high liquid level when the sample volume is relatively small, which facilitates the sample aspirating needle to aspirate the sample. The top part of the body 922 of the small-volume blood collection tube 92 is provided with a scraping end 9222, and when collecting peripheral blood, the blood is scraped into the blood collection tube through the scraping end 9222.

Figure 17:
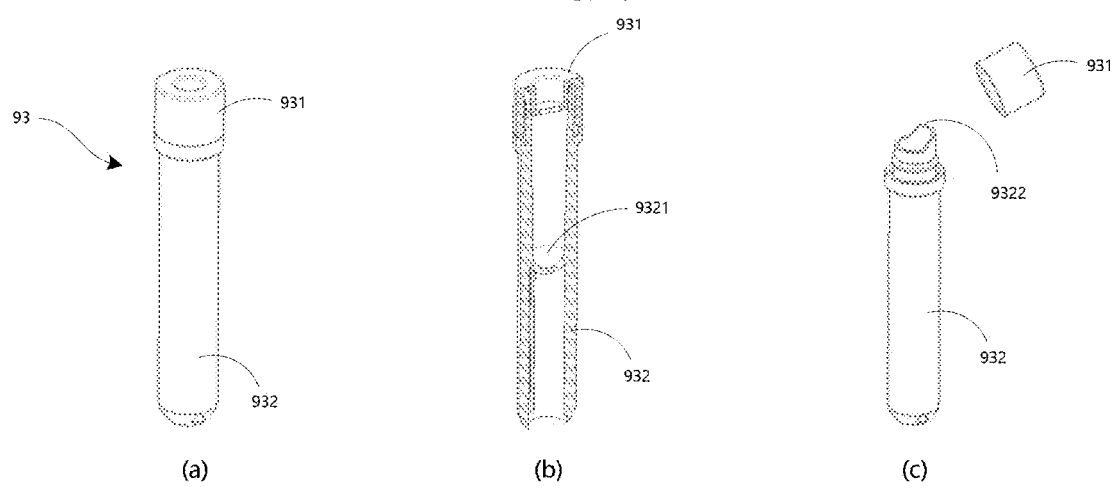
FIG. 17 is a schematic structural diagram of yet another sample container for a small-volume blood sample according to an embodiment of the present application.

FIG. 17 is a schematic structural diagram of another sample container for a small-volume blood sample according to this embodiment. FIG. 17 (a) illustrates a structural perspective view of the small-volume blood collection tube, FIG. 17 (b) illustrates a schematic cross-sectional view of a body of the small-volume blood collection tube, and FIG. 17 (c) illustrates a schematic structural diagram of the small-volume blood collection tube with its cap opened. As shown in FIG. 17, the cap 931 and the body 932 of the small-volume blood collection tube 93 are also separable, but the small-volume blood collection tube 93 is longer than the small-volume blood collection tube 92 (but as long as the venous blood collection tube 94, see FIG. 18). This blood collection tube is more suitable for being pasted with a bar code or two-dimensional code label on the outer wall of its body 932 (because labels in most hospitals are relatively long, and are too long for being pasted on the small-volume blood collection tube 91 or 92, which will result in wrinkling of the labels and thus is not conducive to code scanning), which is more conducive for the analyzer to automatically read bar code or two-dimensional code information, and facilitates information management in hospitals. An inner cavity bottom 9321 of the small-volume blood collection tube 93 is at the middle part or middle upper part of the body 932. The inner cavity bottom 9321 also has paraboloid of revolution, an ellipsoid or a sphere. According to the material of the cap 931, the small-volume blood collection tube 93 can also be classified as a puncturable type or a non-puncturable type. The blood collection method of the small-volume blood collection tube 93 is the same as that of the small-volume blood collection tube 92, namely using a scraping end 9322 for blood collection.

When the sample in the non-puncturable small-volume blood collection tube is being agitated, the bottom of the blood collection tube should not be higher than the opening of the tube, otherwise the sample may be spilled out of the tube; when the sample in the puncturable small-volume blood collection tube is being agitated, the bottom of the blood collection tube should also not be higher than the opening of the tube as much as possible, otherwise the blood sample will partially remain on the cap and cause the loss of the blood sample (the blood sample adhering to the inner wall of the tube body slowly flows back to the bottom of the blood collection tube under gravity, but the blood sample remaining on the cap cannot fall back to the bottom of the blood collection tube due to the adhesive force of the blood sample itself), which easily causes insufficient sample suction of the analyzer when the blood collected is relatively small in volume. For the above-mentioned small-volume blood collection tubes, no matter whether the peripheral blood is collected by capillary or by scraping, only a small amount of blood sample can be collected (100 μL in most cases, and 200-250 μL in a few cases).

In this embodiment, the sample container may be one or more of the small-volume blood collection tubes 91-93, or other type of small-volume tube; the volume of the small-volume sample is usually 250 μL; the small-volume sample may be a whole blood sample or a pre-diluted sample; and the small-volume sample may be a small-volume peripheral blood or a small-volume venous blood.

Figure 18:
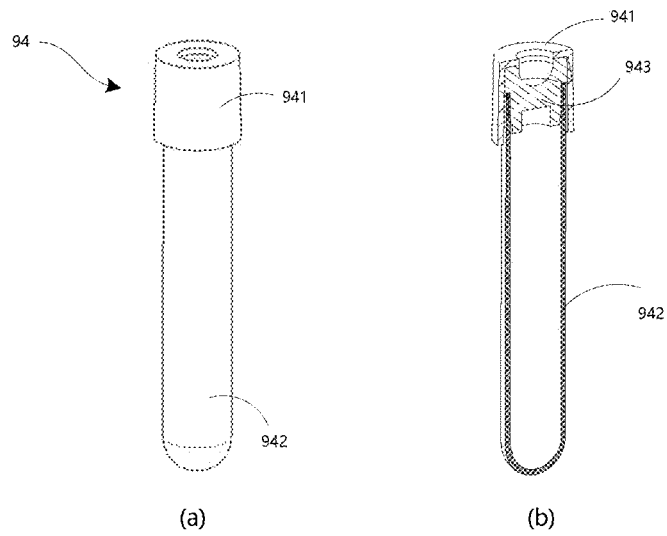
FIG. 18 is a schematic structural diagram of a sample container for a venous blood sample according to an embodiment of the present application.

FIG. 18 is a schematic structural diagram of a sample container for a venous blood sample according to this embodiment. In this embodiment, the sample container for a venous blood sample may be a venous blood collection tube. FIG. 18 (a) illustrates a structural perspective view of the venous blood collection tube, and (b) illustrates a schematic cross-sectional view of a body of the venous blood collection tube. As shown in FIG. 15, the venous blood collection tube 94 includes a plastic cap 941, a tube body 942 and a rubber plug 943. Some venous blood collection tubes 94 are not provided with the plastic cap 941, and are only composed of the tube body 942 and the rubber plug 943. A round hole is formed in the middle of the plastic cap 941, and the sample aspirating needle can penetrate through the round hole, puncture the rubber plug 943 and enter the inner cavity of the venous blood collection tube 94 to aspirate a blood sample. The pressure in the inner cavity of an unused or unopened venous blood collection tube 94 is usually negative pressure (the air pressure in the inner cavity is close to vacuum, so the venous blood collection tube is often called a vacuum blood collection tube). The rubber plug 943 of the venous blood collection tube 94 does not need to be removed during blood collection, but blood can be directly aspirated into the blood collection tube from human venous blood vessel by negative pressure in the inner cavity. This blood collection method can collect more blood (usually 2 mL). Compared with the small-volume blood collection tubes 91-93, the inner cavity of the venous blood collection tube 94 has a larger diameter. The venous blood collection tube 94 is of the puncturable type, the cap does not need to be removed during measurement, and more blood can be collected. Such a blood sample is agitated by inverting the venous blood collection tube, and the blood sample remaining in the cap during agitating does not affect the aspirating of the sample aspirating needle.

Figure 19:
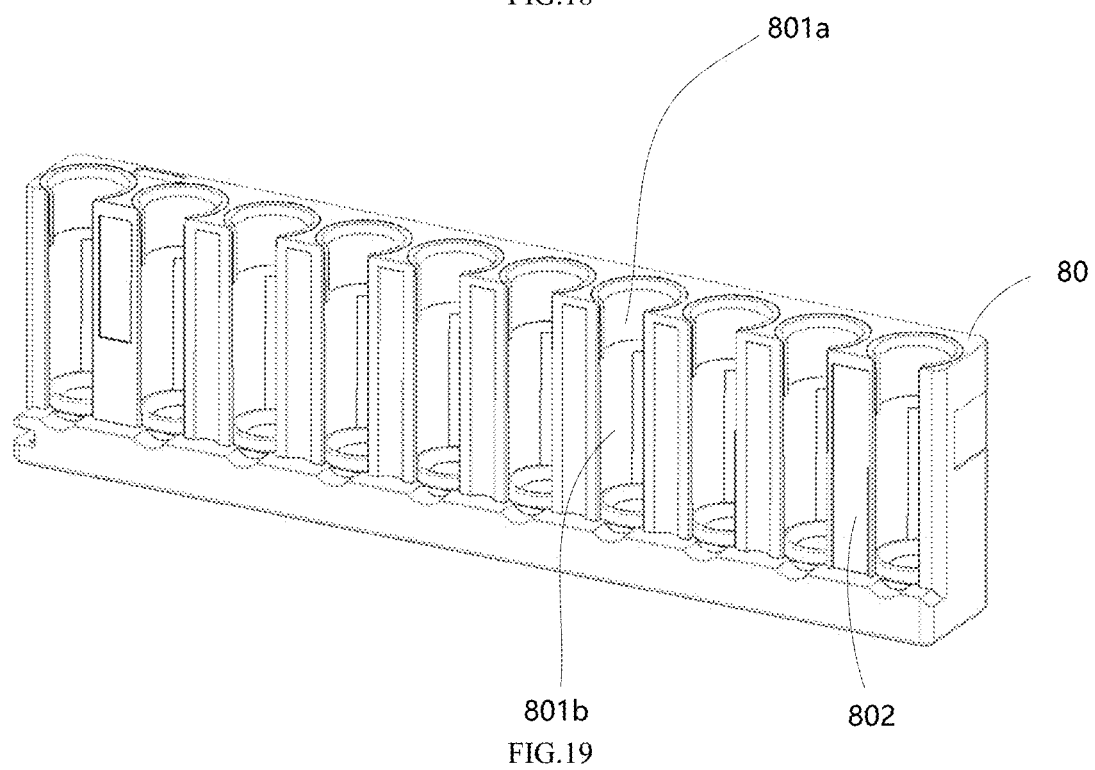
FIG. 19 is a schematic structural diagram of a sample rack according to an embodiment of the present application.

FIG. 19 is a schematic structural diagram of the sample rack according to this embodiment. As shown in FIG. 19, the sample rack 80 is provided with receiving holes 801a for fixing sample containers, each receiving hole 801a is correspondingly provided with an opening 801b, and the opening 801b is used as a scan window for the bar code label of the sample container. In addition, the sample rack 80 is provided with a special sample rack label pasting area 802, and a label such as a bar code label, two-dimensional code label, or RFID label can be pasted on the sample rack label pasting area 802. Preferably, the code information of the label on the sample rack 80 includes measurement mode information.

Figure 20:
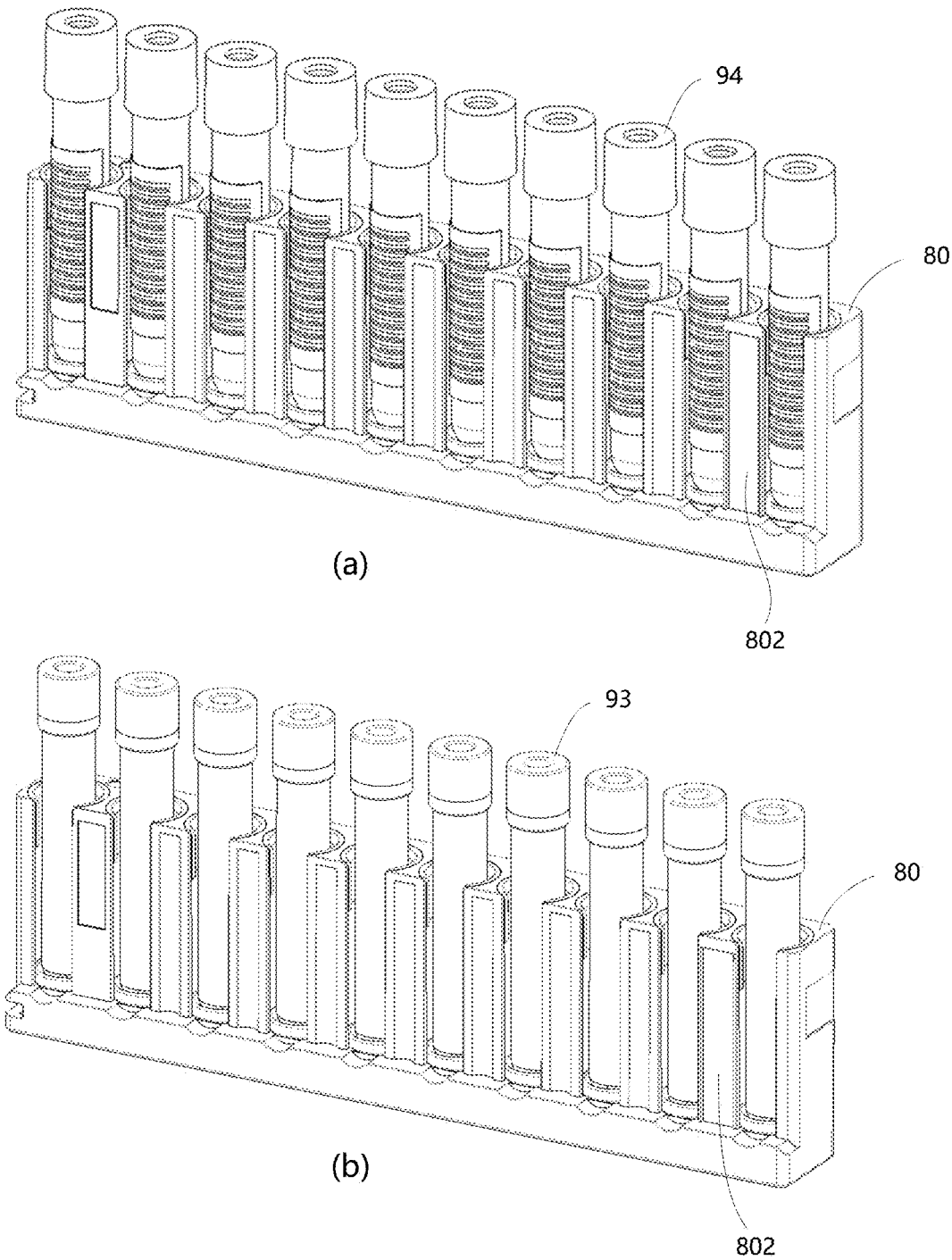
FIG. 20 is a schematic diagram of a sample rack loaded with sample containers according to an embodiment of the present application.
Figure 21:
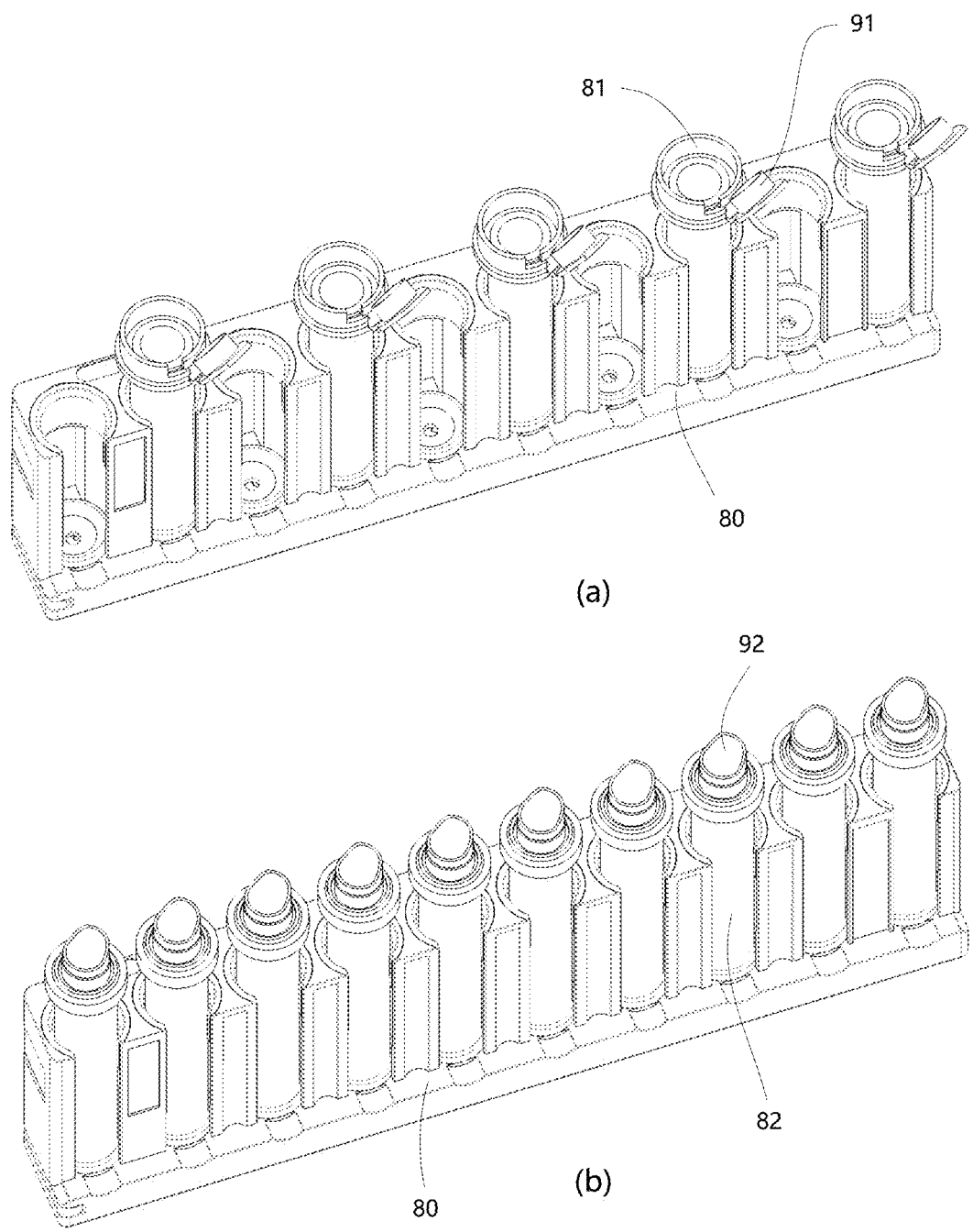
FIG. 21 is a schematic diagram of a sample rack loaded with small-volume blood collection tubes according to an embodiment of the present application.

The sample rack 80 can directly hold a plurality of venous blood collection tubes 94 or small-volume blood collection tubes 93 (as shown in FIGS. 20 (a) and (b), respectively), or can hold small-volume blood collection tubes 91 through respectively an adapter 81 or hold small-volume blood collection tubes 92 through respectively an adapters 82 (as shown in FIGS. 21 (a) and (b), respectively).

The adapter 81 (see FIG. 22) is provided with a receiving hole 811 for fixing a small-volume blood collection tube 91, and a step portion 812 for preventing the adapter 81 from falling during the ascending of the clamping jaw 1201, and a cavity 814 is formed at the bottom in order to reduce the weight of the adapter. Compare to the adapter 82, the adapter 81 is provided with one more limiting portion 813 that can block the cap 911 of the small-volume blood collection tube 91. When the small-volume blood collection tube 91 is placed into the receiving hole 811 of the adapter 81, the connecting portion 913 of the small-volume blood collection tube 91 should be stuck into the limiting portion 813 of the adapter 81. Since the cap 911 and body 912 of the small-volume blood collection tube 91 are inseparable, in order to prevent the cap 911 from turning toward the body 912 under the restoring force of the connecting portion 913, the cap 911 is limited by the limiting portion 813 of the adapter 81 to prevent the sample aspirating needle from puncturing the cap 911 when entering the small-volume blood collection tube 91 to aspirate the sample. Preferably, in order to prevent the connecting portion 913 of the small-volume blood collection tube 91 from escaping from the limiting portion 813 of the adapter 81 during the rotation of the adapter 81, the limiting portion 813 is Z-shaped. The diameter of the outer wall of the adapter 81 is smaller than the diameter of the receiving hole 801a of the sample rack 80, and the inner diameter of the receiving hole 811 of the adapter 81 is slightly larger than the outer diameter of the body 912 of the fixed small-volume blood collection tube 91. The diameter of the outer wall of the adapter 81 can be equal to the diameter of the outer wall of the adapter 82.

The adapter 82 (see FIG. 23) is provided with a receiving hole 821 for fixing a small-volume blood collection tube 92, and a step portion 822 (having the same function as the step portion 812 of the adapter 81). In addition, the adapter 82 is provided with a cavity 823 at its bottom to reduce weight. The diameter of the outer wall of the adapter 82 is smaller than the diameter of the receiving hole 801a of the sample rack 80, and the inner diameter of the receiving hole 821 of the adapter 82 is slightly larger than the outer diameter of the body 922 of the fixed small-volume blood collection tube 92.

Figure 24:
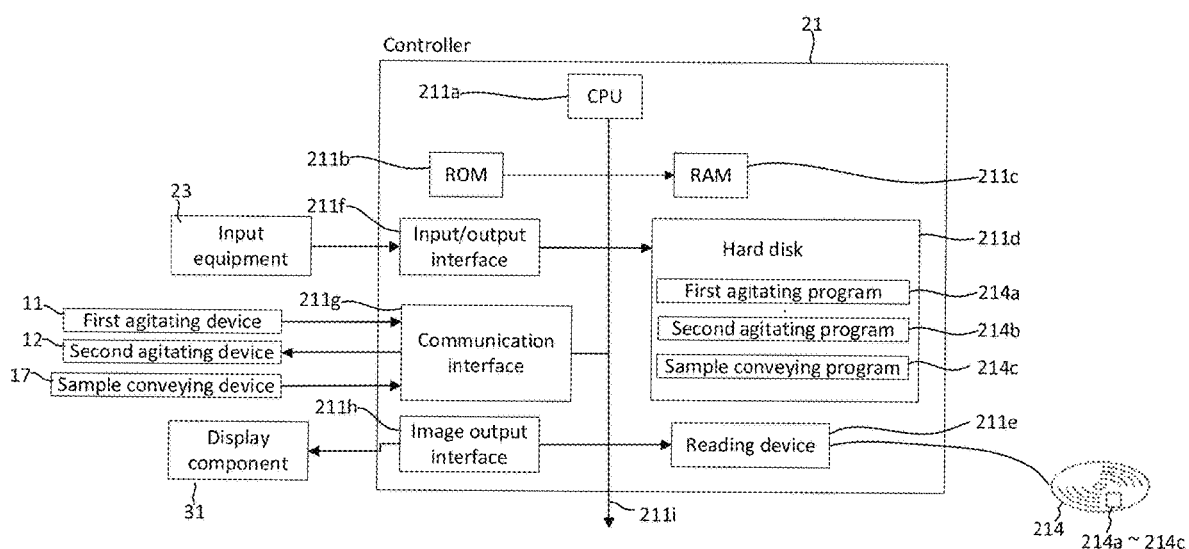
FIG. 24 is a structural block diagram of a controller according to the present application.

FIG. 24 is a structural block diagram of the controller 21. As shown in FIG. 24, the controller 21 is mainly composed of a CPU 211a, a ROM 211b, a RAM 211c, a hard disk 211d, a reading device 211e, an input/output interface 211f, a communication interface 211g, and an image output interface 211h. The CPU 211a, the ROM 211b, the RAM 211c, the hard disk 211d, the reading device 211e, the input/output interface 211f, the communication interface 211g, and the image output interface 211h are connected by a bus 211i.

The CPU 211a can execute computer programs stored in the ROM 211b and download the computer programs to the RAM 211c. The CPU 211a executes application programs 214a, 214b and 214c described later, thereby realizing the function of the controller 21.

The ROM 211b is composed of a mask ROM, PROM, EPROM, or EEPROM, and stores the computer programs executed by the CPU 211a and required data.

The RAM 211c is composed of a SRAM or DRAM. The RAM 211c is used to read the computer programs stored in the ROM 211b and the hard disk 211d. The RAM 211c may also be used as a work space when the CPU 211a executes these computer programs.

The hard disk 211d is installed with various computer programs to be executed by the CPU 211a, such as an operating system and application programs, and data used when the computer programs are executed. A first agitating program 214a for the first agitating device 11, a second agitating program 214b for the second agitating device 12, and a sample conveying program 214c for the sample conveying device 17 are also installed in the hard disk 211d. The CPU 211a executes these application programs 214a to 214c, thus controlling the first agitating device 11, the second agitating device 12, and the sample conveying device 17.

The reading device 211e is composed of a floppy disk drive, a CD-ROM drive or a DVD-ROM drive or the like, and can read computer programs or data stored in a portable storage medium 214. The portable storage medium 214 stores the application programs 214a to 214c, and the controller 21 can read the application programs 214a to 214c from the portable storage medium 214, and can install these application programs 214a to 214c into the hard disk 211d.

The above-mentioned application programs 214a to 214c can be provided not only by the portable storage medium 214, but also from an external machine communicated with the controller 21 via an electronic communication line (whether wired or wireless).

An operating system that can provide a graphical user interface is installed in the hard disk 211d. In the following description, the application programs 214a to 214c are all run on the operating system.

The input/output interface 211f includes a serial interface, a parallel interface, and an analog interface including a D/A converter or an A/D converter. The input equipment 23 is connected to the input/output interface 211f, and a user can use the input equipment 23 to input data to the controller 21.

The communication interface 211g is a wired or wireless communication interface. The controller 21 can transmit data with the first agitating device 11, the second agitating device 12 and the sample conveying device 17 through the communication interface 211g by using a certain communication protocol.

The image output interface 211h is connected to the display component 31 composed of an LCD or CRT, and outputs image signals corresponding to image data received from the CPU 211a to the display component 31. The display component 31 displays an image (interface) according to the input image signals.

The controller 21 is configured to control the actions of the first agitating device 11, the second agitating device 12, and the sample conveying device 17 through the above structure.

Figure 25:
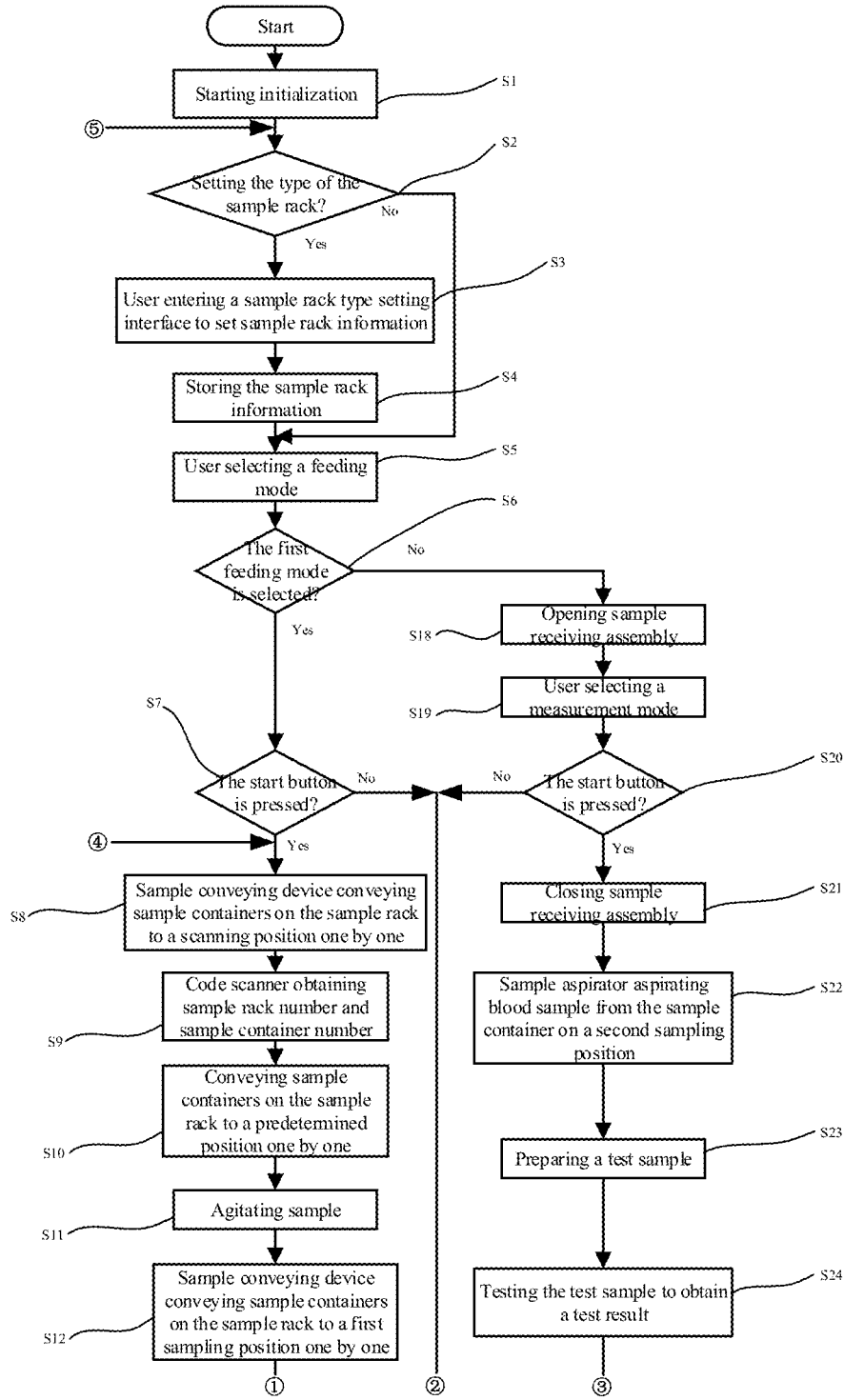
FIGS. 25 and 26 are main flowcharts of an example of analyzing and treating a blood sample by a blood sample analyzer according to the present application.
Figures 26, 27:
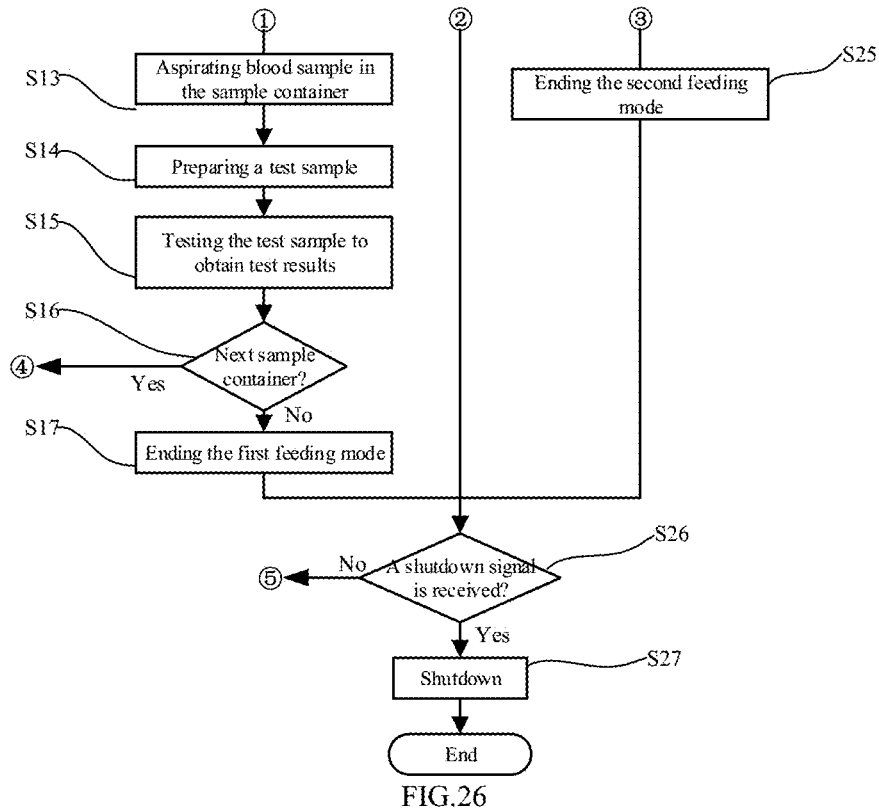
FIG. 27 is a schematic diagram of a setting interface of a blood analyzer according to the present application.

FIGS. 25 and 26 are main flowcharts of an example of analyzing a blood sample by the blood sample analyzer 1. As shown in FIGS. 25 and 26, the power of the blood sample analyzer 1 is first turned on, and the controller 21 starts initialization (step S1). In this initialization step, initialization of programs, initialization of fluid path components of the blood sample analyzer 1, cleaning of pipes, and resetting of driving components, etc. are performed.

Next, in step S2, the controller 21 determines whether a sample rack type setting is required. If the sample rack type setting is required (step S2: Yes), step S3 is performed. If the sample rack type setting is not required (step S2: No), step S5 is performed.

Next, in step S3, the display component 31 displays a sample rack type setting interface (see FIG. 27), and the user can set sample rack information through the sample rack type setting interface. Numbering of a sample rack 80 can be set in the first column of the interface, the sample rack 80 with the corresponding number can be set as a small-volume whole blood sample rack or a pre-diluted blood sample rack in the second column, and only one of the two can be selected at most. If the small-volume whole blood sample rack and pre-diluted blood sample rack are not checked, or the sample rack 80 is not numbered in the interface, the sample rack is treated as a common-volume blood sample rack by the blood analyzer 1. That is, when the small-volume whole blood sample rack or pre-diluted blood sample rack is checked, the sample containers on the sample rack 80 with the corresponding number are treated by the blood analyzer 1 as first sample containers 91 (92, 93); and when the small-volume whole blood sample rack and pre-diluted blood sample rack are not checked, or the sample containers on the sample rack 80 numbered are not set in the interface, such sample containers are treated by the blood analyzer 1 as second sample containers 94.

When small-volume whole blood is checked in the second column (first measurement mode), the sample aspirating needle 135 of the blood analyzer 1 aspirates the sample from the first sample container 91 (92, 93) on the sample rack 80 with the corresponding number, and it aspirates a first sampling amount of blood sample, for example, preferably 5-50 µL, more preferably 15-35 µL, and most commonly 30 µL; when pre-diluted is checked in the second column (third measurement mode), the sample aspirating needle of the blood analyzer 1 aspirates the sample from the first sample container 91 (92, 93) on the sample rack 80 with the corresponding number, and it aspirates a third sampling amount of blood sample, for example, 80 µL; when neither small-volume whole blood sample rack nor pre-diluted blood sample rack is checked (second measurement mode), the sample aspirating needle of the blood analyzer 1 aspirates the sample from the second sample container 94 on the sample rack 80 with the corresponding number, and it aspirates a second sampling amount of blood sample, for example, 50-300 µL, and most commonly 70 µL. Preferably, the first sampling amount is smaller than the second sampling amount.

FIG. 27 shows a setting interface of the blood analyzer 1. As shown in FIG. 27, the user can call the setting interface through the display component 31, and set sample racks of some numbers as special sample racks for small-volume blood collection tubes. For any sample rack with a number input in the interface shown in FIG. 27, it will be treated by the blood analyzer 1 as a special sample rack for small-volume blood collection tubes, and the sample container 91 (92, 93) held on the special sample rack for small-volume blood collection tubes is conveyed by the conveying device to the first agitating device 11 for agitating (details will be described later). For any sample rack without a number input in the interface shown in FIG. 27, it will be treated by the blood analyzer 1 as a common sample rack for venous blood collection tubes, and the second agitating device 12 picks the sample container 94 on the sample rack for agitating.

In the setting interface of the analyzer as shown in FIG. 27, the user can further set the type of small-volume blood collection tubes fixed on the special sample rack for the small-volume blood collection tubes (refer to the third column of FIG. 27, a plurality of common types of small-volume tubes are preset in software for selection), and volumes of samples contained in the small-volume blood collection tubes (refer to the fourth column of FIG. 27), and the controller 21 of the blood analyzer 1 automatically selects the rotation speed of the motor 111 of the first agitating device 11 according to the user's setting, wherein the correlation between the type and size of the small-volume blood collection tube, the sample source information and sample volume and the rotation speed of the motor is preset in a software program.

In the setting interface of the blood analyzer shown in FIG. 27, if the user sets sample racks with some numbers as special sample racks for small-volume blood collection tubes, but does not set corresponding types of small-volume blood collection tubes or sample volumes, the controller 21 of the blood analyzer 1 sets the rotation speed of the motor 111 of the first agitating device 11 as a default rotation speed for agitating the sample containers on the sample racks with such numbers.

As shown in FIG. 27, for the sample racks numbered 1-5, the blood analyzer 1 will use the first agitating device 11 for agitating the samples in the sample containers on the sample racks; and for the sample racks not numbered 1-5, the analyzer 1 will use the second agitating device 12 for agitating the samples in the sample containers on the sample racks.

In one embodiment, the sample racks numbered 1-5 can be further distinguished; sample containers containing blood samples having different volumes, or sample containers of different shapes or sizes are placed on the sample racks numbered 1-3, 4 and 5, respectively. For the sample containers on the sample racks numbered 1-3, the motor 111 of the first agitating device 11 adopts a rotation speed of M1 rotations/turns for agitating; for the sample containers on the sample racks numbered 4, the motor 111 of the first agitating device 11 adopts a default rotation speed of M0 rotations/turns for agitating; and for the sample containers on the sample racks numbered 5, the motor 111 of the first agitating device 11 adopts a rotation speed of M2 rotations/turns for agitating.

The blood analyzer 1 treats all sample containers on the sample racks 80 numbered 1-5 as first sample containers 91 (92, 93), and treats all sample containers on the sample racks not numbered 1-5 as second sample containers 94. When the sample aspirating needle of the blood analyzer 1 aspirates samples from the sample containers 91 (92, 93) on the sample racks numbered 1-4, it aspirates a first sampling amount of blood sample (small-volume whole blood sample); when the sample aspirating needle of the blood analyzer 1 aspirates samples from the sample containers 91 (92, 93) on the sample racks 80 numbered 5, it aspirates a third sampling amount of blood sample (pre-diluted blood sample); and when the sample aspirating needle of the blood analyzer 1 aspirates samples from the sample containers 94 on the sample racks 80 not numbered 1-5, it aspirates a second sampling amount of blood sample (common-volume blood sample).

Returning to FIG. 25, the sample rack information is stored in step S4, and then step S5 is performed. In step S5, the user selects a feeding mode.

In step S6, the controller 21 determines whether a first feeding mode is selected. If the first feeding mode is determined to be selected (step S6: Yes), the controller 21 determines whether a start button (not shown) has been pressed (step S7). If the controller 21 determines that the start button has not been pressed (step S7: No), S25 is performed. If it is determined that the start button has been pressed (step S7: Yes), S8 is performed.

In step S8, the sample conveying device 17 conveys sample containers 91 (92, 93, 94) on a sample rack 80 to the scanning position (not shown) one by one, and the container rotating code-scanning device (including the container pressing assembly 14, the container rotating assembly 15, and the code scanner 16) reads sample code information on labels of the sample containers 91 (92, 93, 94), scans the label of the sample rack 80 passing the scanning position, and reads code information of the label of the sample rack 80 (step S9).

The controller 21 controls the sample conveying device 17 to convey the sample containers 91 (92, 93, 94) on the sample rack 80 to a predetermined position (not shown) one by one (step S10).

The controller 21 controls the first agitating device 11 or the second agitating device 12 to agitate blood samples in the sample containers 91 (92, 93, 94) (S11). In step S11, the controller 21 determines, based on the code information read from the label of the sample rack 80, whether the current measurement mode is a first measurement mode, a second measurement mode, or a third measurement mode; if the controller 21 determines that the current measurement mode is the first measurement mode or the third measurement mode, it controls the clamping jaw 1201 of the second agitating device 12 to place the current sample container 91 (92, 93) for the first measurement mode or the third measurement mode into the sample container accommodating hole 1121 (1121a) of the sample container accommodating seat 112 of the first agitating device 11 for agitating the blood sample; and if the controller 21 determines that the current measurement mode is the second measurement mode, it controls the clamping jaw 1201 of the second agitating device 12 to pick the current sample container 94, and controls the stepper motor 1223 of the second agitating device 12 to drive the clamping jaw 1201 to rotate, thereby agitating the blood sample in the current sample container.

In this embodiment, in step S11, when the controller 21 determines, according to the code information of the label of the sample rack 80, that the sample containers on the current sample rack 80 is sample containers 91 (92, 93) containing small-volume whole blood samples (or pre-diluted small-volume blood samples), it controls the second agitating device 12 to carry each sample container 91 (92, 93) into the sample container accommodating hole 1121 (1121a) of the first agitating device 11 for agitating; and when the controller 21 determines, according to the code information of the label of the sample rack 80, that the sample containers on the current sample rack 80 is sample containers 94 containing common-volume blood samples, it controls the second agitating device 12 to pick each sample container 94 for agitating (for example, inverted agitating).

Each sample container 91 (92, 93, 94) containing the agitated blood sample is returned to the predetermination position and conveyed to the first sampling position (not shown) of the blood sample analyzer (S12), and then step S13 is performed.

In step S13, the controller 21 controls, according to the received measurement mode information, the sample aspirating needle 135 of the sample aspirator 13 to aspirate a predetermined amount of blood sample from the sample container 91 (92, 93, 94) on the sampling position. Specifically, in the first measurement mode, the sample aspirating needle 135 of the sample aspirator 13 aspirates a first sampling amount of blood sample from the first sample container 91 (92, 93); in the third measurement mode, the sample aspirating needle 135 of the sample aspirator 13 aspirates a third sampling amount of blood sample from the first sample container 91 (92, 93); and in the second measurement mode, the sample aspirating needle 135 of the sample aspirator 13 aspirates a second sampling amount of blood sample from the second sample container 94.

In step S14, the sample preparing device of the blood sample analyzer 1 prepares a test sample from the blood sample aspirated by the sample aspirator 13. In the first measurement mode, a first test sample is prepared from the aspirated blood sample of the first sampling amount; in the third measurement mode, a third test sample is prepared from the aspirated pre-diluted blood sample of the third sampling amount; and in the second measurement mode, a second test sample is prepared from the aspirated blood sample of the second sampling amount.

In step S15, the tester of the blood sample analyzer 1 tests the test sample prepared by the sample preparing device to obtain test results. The controller 21 determines whether there is an untreated next sample container 91 (92, 93, 94) on the sample rack (step S16), and if there is an untreated sample container 91 (92, 93, 94) (step S16: Yes), the process returns to step S8 for corresponding treatment. If all the sample containers 91 (92, 93, 94) have been treated (step S16: No), the first feeding mode ends (step S17), and the step S26 is performed.

If the second feeding mode is determined to be selected (step S6: No), the sample receiving cover 181 will be opened (step S18). Regarding step S18, when the controller 21 is in the second feeding mode, if the sample receiving cover 181 is originally closed, step S18 is executed, and if the sample receiving cover 181 is originally opened, next step S19 is directly performed.

In step S19, the user selects the measurement mode of the current blood sample through the setting interface (not shown) of the blood analyzer 1.

The controller 21 determines whether the start button (not shown) has been pressed (step S20). If the controller 21 determines that the start button has not been pressed (step S20: No), step S26 is performed. If it is determined that the start button has been pressed (step S20: Yes), step S21 is performed, the sample receiving cover 181 is closed, and step S22 is performed.

In step S22, the controller 21 controls, according to the measurement mode information selected by the user in step S19, the sample aspirating needle 135 of the sample aspirator 13 to aspirate a predetermined amount of blood sample from the sample container 91 (92, 93, 94) on the second sampling position. Specifically, in the first measurement mode, the sample aspirating needle 135 of the sample aspirator 13 aspirates a first sampling amount of blood sample from the first sample container 91 (92, 93); in the third measurement mode, the sample aspirating needle 135 of the sample aspirator 13 aspirates a third sampling amount of pre-diluted blood sample from the first sample container 91 (92, 93); and in the second measurement mode, the sample aspirating needle 135 of the sample aspirator 13 aspirates a second sampling amount of blood sample from the second sample container 94. Preferably, the first sampling amount is less than the second sampling amount, for example, the first sampling amount is 5-50 µL, more preferably 15-35 µL.

In step S23, the sample preparing device of the blood sample analyzer 1 prepares a test sample from the blood sample aspirated by the sample aspirator 13. In the first measurement mode, a first test sample is prepared from the aspirated blood sample of the first sampling amount; in the third measurement mode, a third test sample is prepared from the aspirated pre-diluted blood sample of the third sampling amount; and in the second measurement mode, a second test sample is prepared from the aspirated blood sample of the second sampling amount.

In step S24, the tester of the blood sample analyzer 1 tests the test sample prepared by the sample preparing device to obtain test results, the second feeding mode ends (step S25), and then step S26 is performed.

In step S26, if a shutdown instruction is not received (step S26: No), the process returns to step S2; and if a shutdown instruction is received (step S26: Yes), shutdown is performed (step S27), and the process ends.

The above embodiment can be used for blood analysis on main examination items involving red blood cells, white blood cells, and platelets in the blood routine, and in step S15 or S24, the tester tests the test sample prepared by the sample preparing device to obtain relevant indicators of the main examination items involving red blood cells, white blood cells, and platelets, for example, white blood cell count (WBC), red blood cell count (RBC), hemoglobin concentration (HGB), hematocrit (HCT), mean corpuscular volume (MCV), mean corpuscular hemoglobin (MCH), mean corpuscular hemoglobin concentration (MVHC), platelet count (PLT), lymphocyte ratio (LY %), monocyte ratio (MONO), neutrophil ratio (NEUT %), lymphocyte count (LY), monocyte count (MONO), neutrophil count (NEUT), red blood cell distribution width (RDW), platelet volume distribution width (PDW), mean platelet volume (MPV) and/or platelet-large cell ratio (P-LCR), etc.

Figure 28:
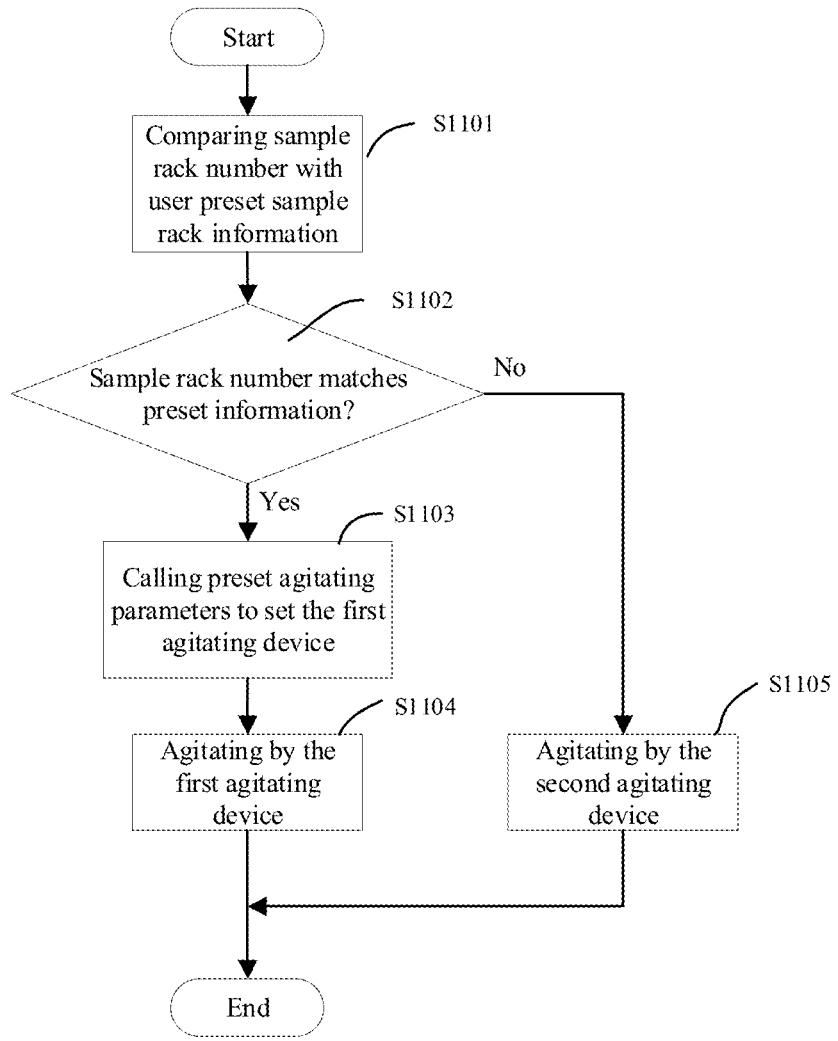
FIG. 28 is a flowchart of an agitating process in step S11 according to an embodiment of the present application.

FIG. 28 shows a schematic flow block diagram of the agitating process in step S11. As shown in FIG. 28, the controller 21 compares the code information read from the label of the sample rack 80 or sample container 91 (92, 93) with user preset sample rack information (step S1101), and determines whether the read code information matches the preset sample rack information (step S1102). If the read code information matches the preset sample rack information (step S1102: Yes), it is determined that the first or third measurement mode is executed for the samples on the current sample rack, preset agitating parameters are called to set the first agitating device 11 (step S1103), and then the controller 21 controls the clamping jaw 1201 of the second agitating device 12 to place the current sample container 91 (92, 93) for the first measurement mode or the third measurement mode into the sample container accommodating hole 1121 (1121a) of the sample container accommodating seat 112 of the first agitating device 11 for agitating the blood sample (step S1104). If the read code information does not match the preset sample rack information (step S1102: No), it is determined that the second measurement mode is executed for the sample on the current sample rack, and the controller 21 controls the clamping jaw 1201 of the second agitating device 12 to pick the current sample container 94, and controls the stepper motor 1223 of the second agitating device 12 to drive the clamping jaw 1201 to rotate, thereby agitating the blood sample in the current sample container (step S1105).

Figure 29:
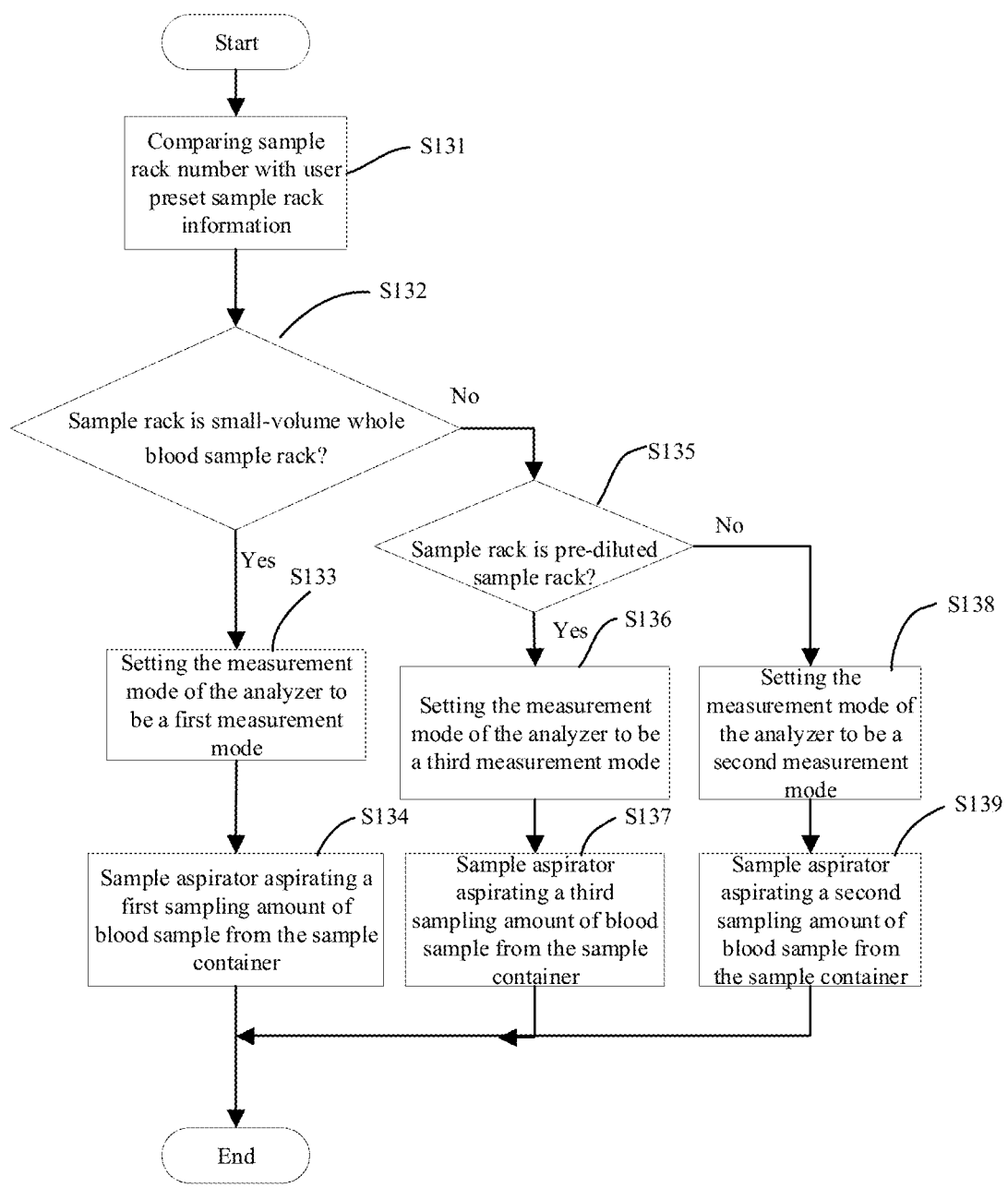
FIG. 29 is a flowchart of an aspirating operation in step S13 according to an embodiment of the present application.

FIG. 29 is an exemplary flowchart of the sample aspirating process of step S13 in the first feeding mode according to this embodiment. As shown in FIG. 29, the code information of the label of the sample rack 80 read by the container rotating code-scanning device is compared with the sample rack information preset by the user (step S131). Based on the comparison result, whether the current sample rack 80 is a small-volume whole blood sample rack is determined (step S132), if it is a small-volume whole blood sample rack (step S132: Yes), the measurement mode of the device is set as the first measurement mode (step S133), and then the sample aspirator 13 aspirates a first sampling amount of blood sample from the sample container 91 (92, 93) on the sample rack 80 (step S134).

If it is not a small-volume whole blood sample rack (step S132: No), whether it is a pre-diluted small-volume blood sample rack is determined (step S135). If it is a pre-diluted small-volume blood sample rack (step S1635: Yes), the measurement mode of the device is set as the third measurement mode (S136), and then the sample aspirator 13 aspirates a third sampling amount of blood sample from the sample container 91 (92, 93) on the sample rack 80 (step S137).

If it is not a pre-diluted small-volume blood sample rack (step S135: No), the measurement mode of the device is set as the second measurement mode (step S138), and then the sample aspirator 13 aspirates a second sampling amount of blood sample from the sample container 94 on the sample rack 80 (step S139).

Figure 30:
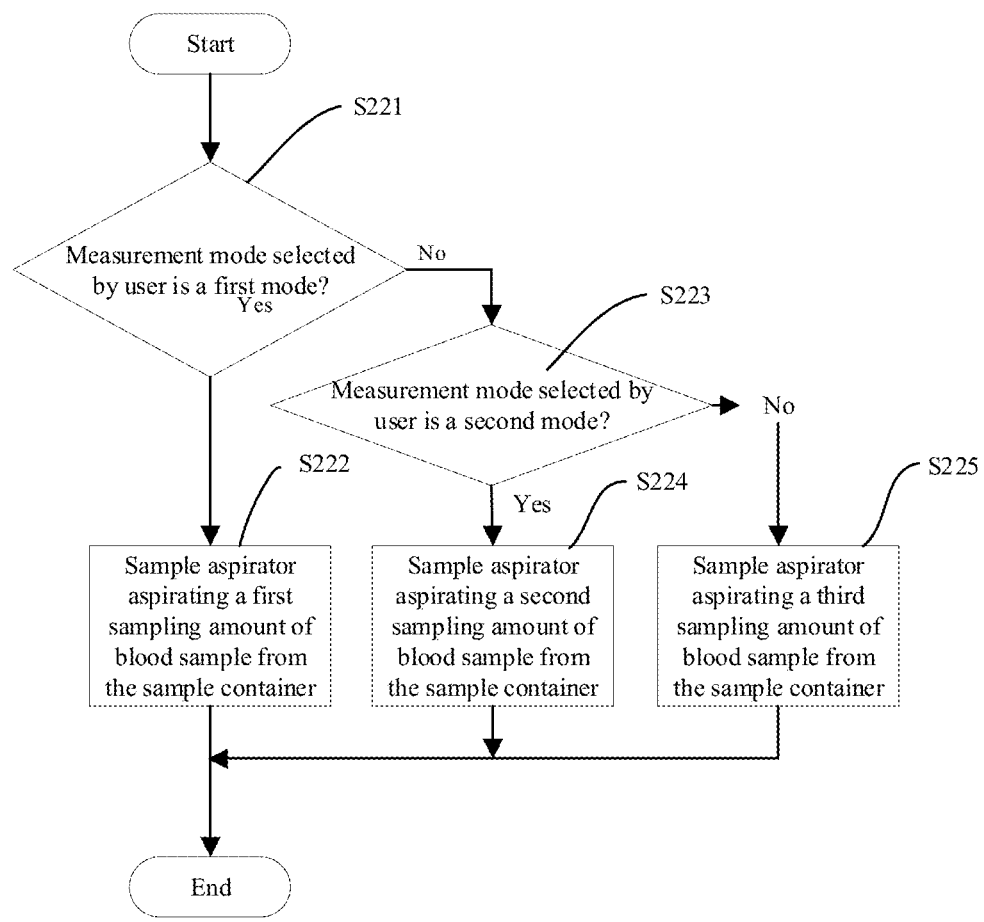
FIG. 30 is a flowchart of an aspirating operation in step S22 according to an embodiment of the present application.

FIG. 30 is an exemplary flowchart of the sample aspirating process of step S22 in the second feeding mode according to this embodiment. As shown in FIG. 30, whether the measurement mode selected by the user is the first measurement mode (step S221) is determined. If the first measurement mode is set (step S221: Yes), the sample aspirator 13 aspirates a first sampling amount of blood sample from the sample container 91 (92, 93) on the sample rack 80 (S222). If it is not the first measurement mode (step S221: No), whether it is the second measurement mode is determined (step S223). If it is the second measurement mode (step S223: Yes), the sample aspirator 13 aspirates a second sampling amount of blood sample from the sample container 94 on the sample rack 80 (step S224). If it is not the second measurement mode (step S223: No), the sample aspirator 13 aspirates a third sampling amount of blood sample from the sample container 91 (92, 93) on the sample rack 80 (S225).

Figure 31:
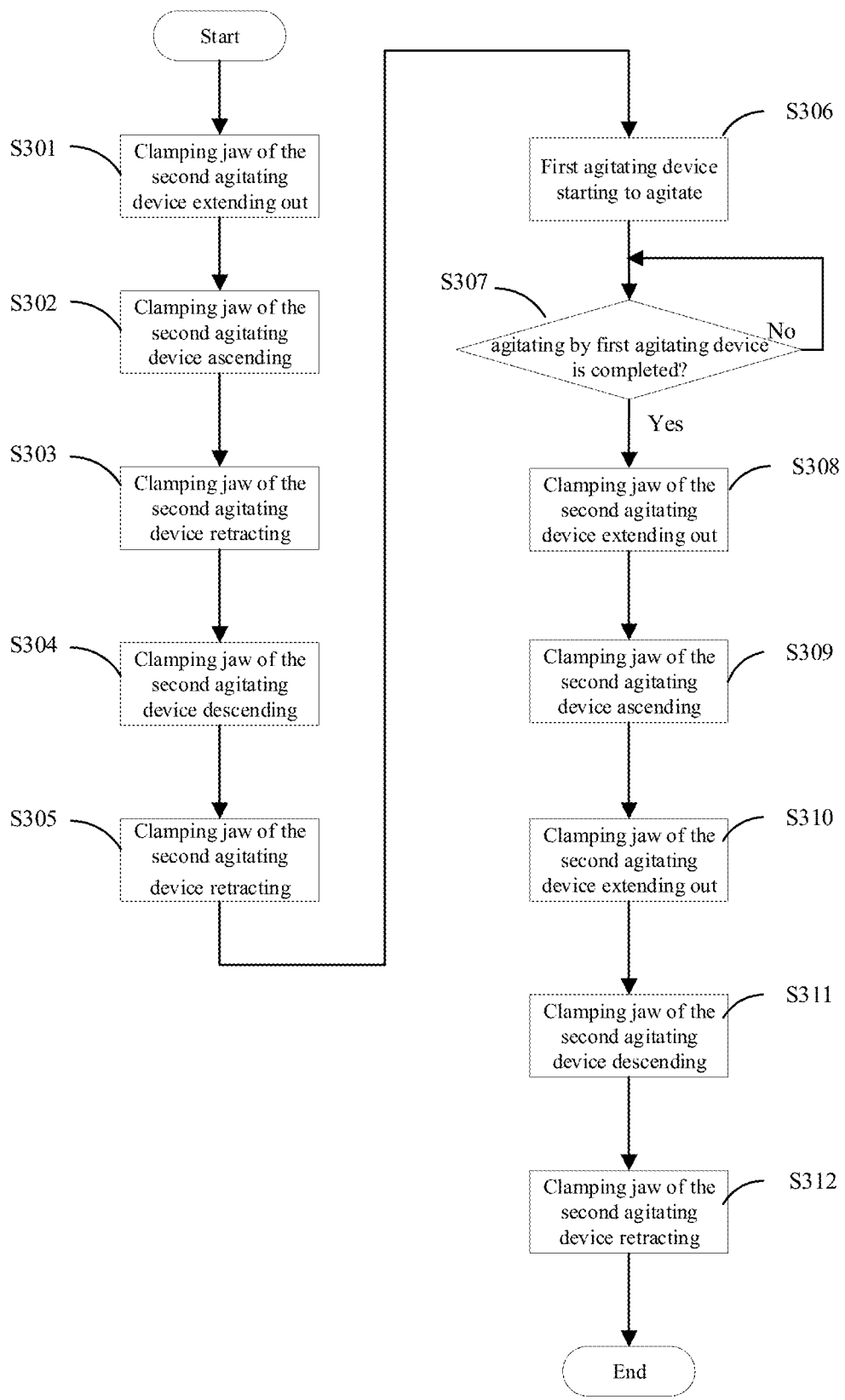
FIG. 31 is an exemplary operation flowchart of carrying a sample container to a first agitating device according to an embodiment of the present application.

FIG. 31 is an exemplary operation flowchart of carrying a sample container to the first agitating device 11 according this embodiment. As described above, the small-volume blood collection tube 91 is held on the sample rack 80 through the first adapter 81, and similarly, the small-volume blood collection tube 92 is held on the sample rack 80 through the second adapter 82. The second agitating device 12 carries the small-volume blood collection tubes 91 and 92 together with their adapters. Since the small-volume blood collection tube 93 is directly held on the sample rack 80 without an adapter, the small-volume blood collection tube 93 is directly carried. The operation exploded diagram of FIG. 32 takes the carrying of the small-volume blood collection tube 92 as an example, and the process of carrying other types of blood collection tubes is the same.

As shown in FIG. 31, in step S301, the clamping jaw 1201 of the second agitating device 12 extends out in Y1 direction to clamp the second adapter 82 (see FIG. 32(b)).

Figure 32:
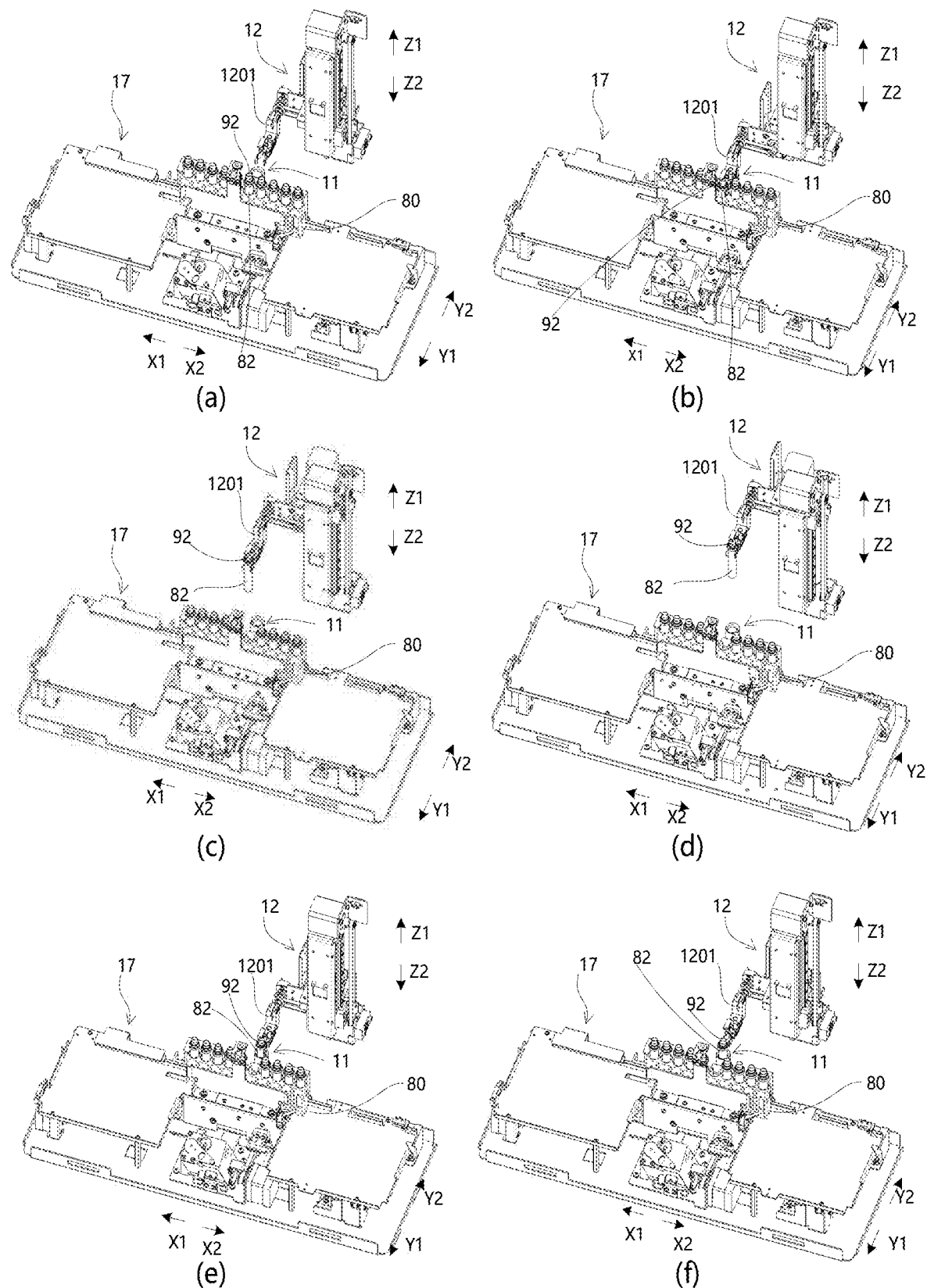
FIG. 32 is an operation exploded diagram of carrying a small-volume blood collection tube according to the present application.

In step S302, the clamping jaw 1201 of the second agitating device 12 drives the second adapter 82 to ascend in Z1 direction, and the second adapter 82 takes the small-volume tube 92 away from the sample rack 80 (see FIG. 32(*c*)). The step portion 822 provided on the second adapter 82 can prevent the second adapter 82 from falling in the ascending process of the clamping jaw 1201.

In step S303, the clamping jaw 1201 of the second agitating device 12 drives the second adapter 82 to move for a certain distance in Y2 direction, so that the second adapter 82 is right above the accommodating hole 1121 of the sample container accommodating seat 112 of the first agitating device 11 (see FIG. 32 (*d*)).

In step S304, the clamping jaw 1201 of the second agitating device 12 drives the second adapter 82 to move in Z2 direction, and puts the second adapter 82 into the accommodating hole 1121 of the sample container accommodating seat 112 of the first agitating device 11 (see FIG. 32 (*e*)).

In step S305, the clamping jaw 1201 of the second agitating device 12 retracts in Y2 direction, so that the clamping jaw 1201 is disengaged from the second adapter 82 (see FIG. 32 (*f*)); until step S305, the operation of carrying the second adapter 82 and the small-volume blood collection tube 92 to the first agitating device 11 is completed.

In step S306, the first agitating device 11 starts to agitate the sample in the small-volume blood collection tube 92. The stepper motor 262 of the first agitating device 11 drives the sample container accommodating seat 112 to make the second adapter 82 and the small-volume blood collection tube 92 to rotate. The detailed process will be described later.

In step S307, the controller 21 determines whether the first agitating device 11 has completed the agitating of the sample in the small-volume blood collection tube 92, and if completed, the process skips to step S308, or else the process remains in S307 till the end of the agitating by the first agitating device 11.

In step S308, the clamping jaw 1201 of the second agitating device 12 extends out in Y1 direction to clamp the second adapter 82 (see FIG. 32(*e*)).

In step S309, the clamping jaw 1201 of the second agitating device 12 drives the second adapter 82 to ascend in Z1 direction, and the second adapter 82 takes the small-volume tube 92 away from the sample container accommodating seat 112 of the first agitating device 11 (see FIG. 32 (*e*)).

In step S310, the clamping jaw 1201 of the second agitating device 12 drives the second adapter 82 to move for a certain distance in Y1 direction, so that the second adapter 82 is right above the receiving hole 801*a* of the sample rack 80 (see FIG. 32 (*c*)).

In step S311, the clamping jaw 1201 of the second agitating device 12 drives the second adapter 82 to descend in Z2 direction, and the second adapter 82 drives the small-volume tube 92 to return to the receiving hole 801*a* of the sample rack 80 (see FIG. 32(*b*)).

In step S312, the clamping jaw 1201 of the second agitating device 12 retracts in Y2 direction, so that the clamping jaw 1201 is disengaged from the second adapter 82 (see FIG. 32 (*a*)); until S312, the operation of carrying the second adapter 82 and the small-volume blood collection tube 92 back to the sample rack is completed, and the process ends; it can be seen that steps S308 to S312 are the reverse process of steps S301 to S305.

After steps S301 to S312, the sample in the small-volume blood collection tube 92 is agitated uniformly, and then the small-volume blood collection tube 92 is conveyed by the sample rack 80 to the sampling position of the blood analyzer 1 for aspirating.

In this embodiment, before the first agitating device 11 agitates the small-volume blood sample in the sample container 91 (92, 93), the blood analyzer 1 presets the rotation speed of the sample container accommodating seat, the number of rotation times of the sample container accommodating seat, and the number of agitating operation times for the blood sample. The first agitating device 11 drives the sample container 91 (92, 93) placed in its sample container accommodating hole 1121 according to the preset rotation speed, number of rotation times, and number of agitating operation times, to uniformly agitate the blood sample. Herein, the agitating process may include multiple times of agitating operations, or a combination of different types of agitating operations, for example, a combination of rotation and swing to complete the agitating process of the blood sample.

Figure 33:
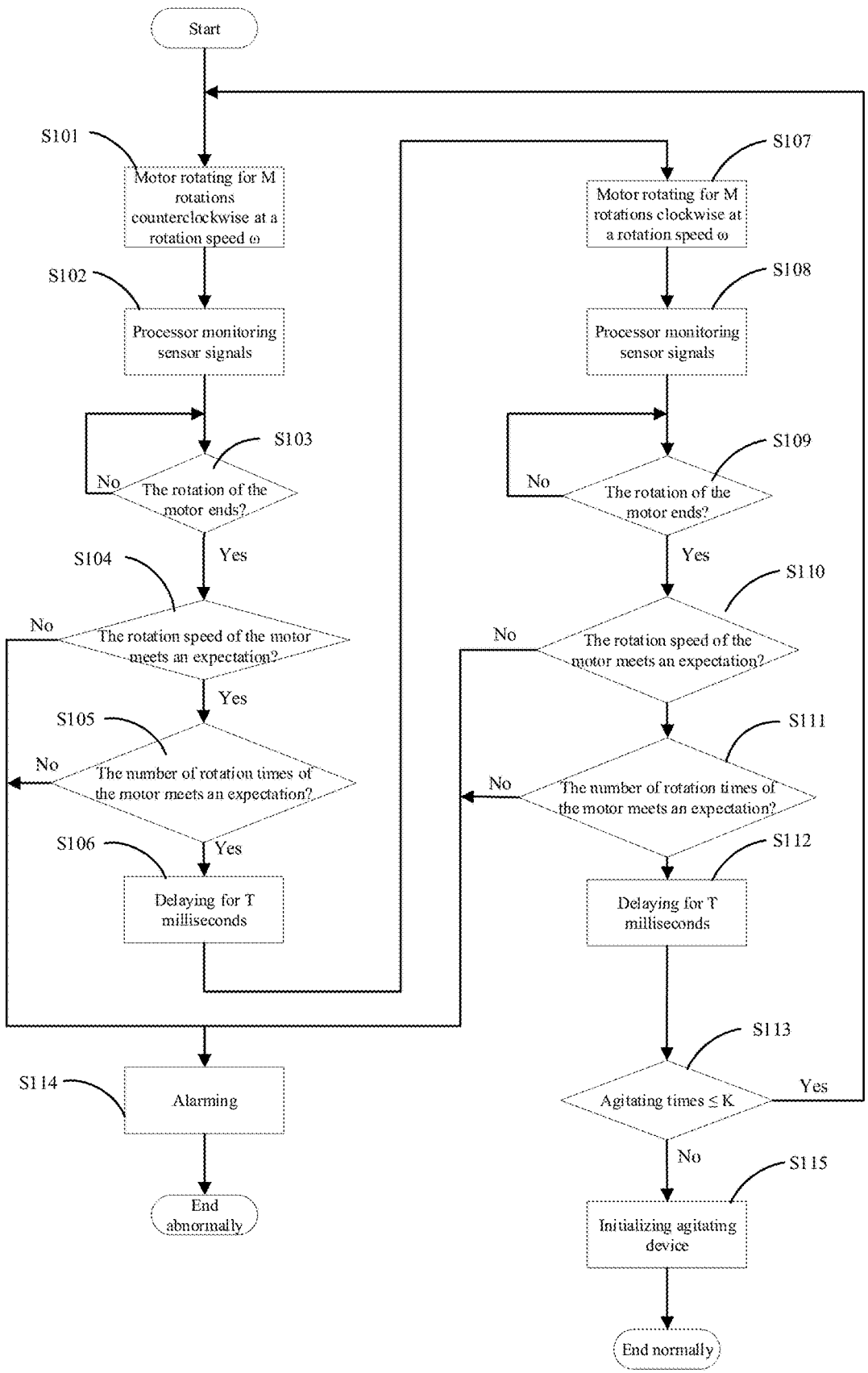
FIG. 33 is a flowchart of an agitating process of a first agitating device according to an embodiment of the present application.

FIG. 33 is a flowchart of the agitating process of the first agitating device 11 according to this embodiment. As shown in FIG. 33, in step S101, the controller 21 controls the motor 111 to rotate for M rotations counterclockwise at a rotation speed ω (the rotation speed ω and the number M of rotation times of the motor 111 can be preset on the operating interface according to the differences in the shape and size of the sample container, the source information of the sample and the sample volume read from the label code information of the sample rack 80 or the sample container 91 (92, 93)).

In step S102, after the motor 111 is started, the controller 21 monitors the cycle and number of jump times of signal output of the sensor 113, so as to calculate the actual rotation speed and actual number of rotation times of the sample container accommodating seat 112 respectively.

In step S103, the controller 21 determines whether the rotation of the motor 111 ends, and if the rotation does not end, the determination is repeated in this step, otherwise, the process skips to S104.

In step S104, the controller 21 compares the rotation speed of the motor 111 calculated in step S102 with the set rotation speed ω, to determine whether the actual rotation speed of the motor 111 meets an expectation. Since the rotation speed of the motor is one of the important factors that affect the agitating effect of the blood sample, it must be ensured that the rotation speed is within an allowable deviation range of the set speed. If the rotation speed meets the expectation, the process skips to step S105, otherwise skips to step S114 to trigger an alarm, and then ends abnormally.

In step S105, the controller 21 compares the number of rotation times of the motor 111 calculated in step S102 with the set number M of rotation times, to determine whether the actual number of rotation times of the motor 111 meets an expectation. Since the number of rotation times of the motor 111 is one of the factors that affect the agitating effect of the blood sample, it must be ensured that the number of rotation times of the motor 111 is M when the motor 111 stops. If the number of rotation times of the motor 111 meets the expectation, that is, one agitating operation is completed, the process skips to step S106. Otherwise, the motor 111 has lost steps, and the process directly skips to step S114 to trigger an alarm, and then ends abnormally.

In step S106, before the motor 111 starts to rotate reversely, T milliseconds' delay is performed to avoid step loss or lock of the motor due to sudden reversing rotation of the motor 111. After this step, the process skips to step S107.

In step S107, the controller 21 controls the motor 111 to rotate for M rotations clockwise at a rotation speed ω, wherein the rotation speed ω and the number M of rotation times are the same as the corresponding parameters in step S101, and only the rotation direction is opposite to that in step S101.

Step S108 is the same as step S102, the controller 21 calculates the rotation speed and number of rotation times of the motor 111 through the output signals of the sensor 113.

Step S109 is the same as step S103, it is determined whether the rotation of the motor 111 ends, and if the rotation does not end, the determination is repeated in this step.

Step S110 is the same as step S104, the controller 21 determines whether the actual rotation speed of the motor 111 meets an expectation, and if the actual rotation speed does not meet the expectation, the process directly skips to step S114 to trigger an alarm and then ends abnormally.

Step S111 is the same as step S105, the controller 21 determines whether the actual number of rotation times of the motor 111 meets an expectation, that is, whether second agitating operation is completed, and if the actual number of rotation times does not meet the expectation, the process directly skips to step S114 to trigger an alarm and then ends abnormally.

Step S112 is the same as step S106, T milliseconds' delay is performed before the motor 111 starts to rotate reversely.

In step S113, the controller 21 determines whether the number of agitating operation times of the first agitating device 11 has reached a preset number K of times (the number of agitating operation times K can be set on the operating interface according to the differences in the shape and size of the sample container, the source information of the sample and the sample volume read from the label code information of the sample rack 80 or the sample container 91 (92, 93)), and if the number of agitating operation times has reached the preset number of times, the process skips to step S115, otherwise, skips to step S101 for loop execution.

In step S115, the controller 21 controls the first agitating device 11 to perform initialization, so that the sample container accommodating seat 112 returns to a precise initial position, which is intended to eliminate small possible position deviation of the sample container accommodating seat 112 in the agitating process, to facilitate the operations of other devices (for example, the clamping jaw 1201) on the sample container in the sample container accommodating seat 112.

In this embodiment, when the actual rotation speed and actual number of rotation times of the sample container accommodating seat 112 both meet the preset rotation speed and the preset number of rotation times, it is determined that the first agitating device 11 completes one agitating operation.

Figure 34:
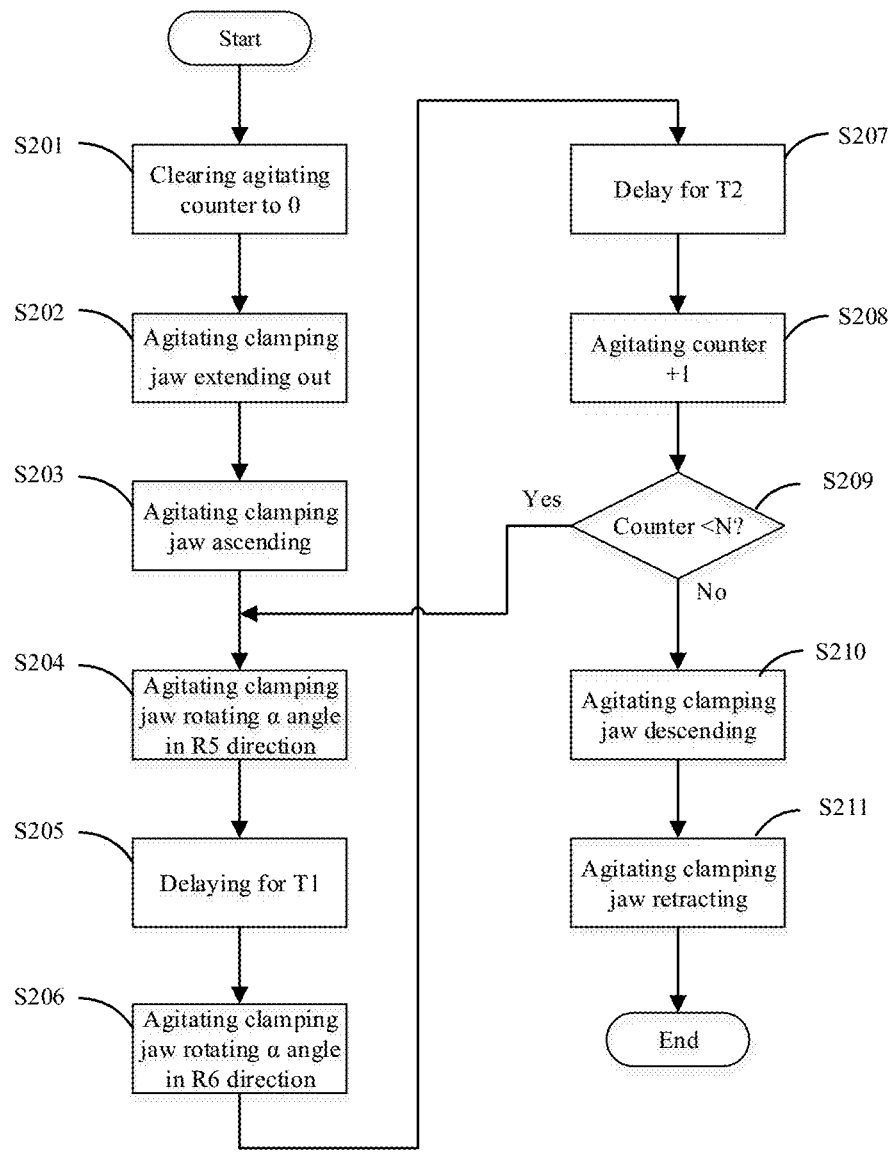
FIG. 34 is a flowchart of an agitating process of a second agitating device according to an embodiment of the present application.

FIG. 34 is a flowchart of the agitating process of the second agitating device 12. As shown in FIG. 34, in step S201, an agitating counter is cleared before agitating. In this step, the clamping jaw 1201 of the second agitating device 12 is opposite to the sample rack 80 and the venous blood collection tube (see FIG. 32 (a)).

In step S202, the stepper motor 1222 drives the clamping jaw 1201 to extend out in Y1 direction to a front position to clamp the venous blood collection tube (see FIG. 32(b)).

In step S203, the stepper motor 1221 drives the clamping jaw 1201 to drive the venous blood collection tube to ascend in Z1 direction to an upper position (see FIG. 32(c)), so that the venous blood collection tube is disengaged from the sample rack 80.

In step S204, the stepper motor 1223 drives the clamping jaw 1201 to drive the venous blood collection tube to rotate in R7 direction (see FIG. 32 (c)), so that the bottom of the venous blood collection tube is tilted upward and higher than the cap of the tube (see FIG. 32 (d)). At this time, the blood sample in the venous blood collection tube flows along the wall to the cap of the tube under gravity.

In step S205, the stepper motor 1223 controls the clamping jaw 1201 to stay at the position shown in FIG. 32(d) for T1 time, so that the blood sample in the venous blood collection tube has enough time to flow toward the cap of the tube.

In step S206, the stepper motor 1223 drives the clamping jaw 1201 to drive the venous blood collection tube to rotate in R8 direction (see FIG. 32 (d)), so that the venous blood collection tube returns to an upright direction (see FIG. 32 (c)). At this time, the blood sample in the venous blood collection tube flows along the wall to the bottom of the tube under gravity.

In step S207, the stepper motor 1223 controls the clamping jaw 1201 to stay at the position shown in FIG. 32 (c) for T2 time, so that the blood sample in the venous blood collection tube has enough time to flow toward the bottom of the tube. T2 may be or not equal to T1.

In step S208, the count of the agitating counter is incremented by 1 (every time steps S204 to S207 are executed, it is considered to complete an inverted agitating operation once), and then the process skips to step S209.

In step S209, the controller 21 determines whether the number of agitating operation times of the sample has reached N. If the number of agitating operation times has not reached N, the process skips to step S204 to perform an agitating cycle operation again. If the number of agitating operation times has reached N, the process skips to step S210. In addition, N is usually 8-12, preferably 10.

In step S210, the stepper motor 1221 drives the clamping jaw 1201 to drive the venous blood collection tube to descend in Z2 direction to a lower position (see FIG. 32(b)), and to place the venous blood collection tube back to the sample rack 80.

In step S211, the stepper motor 1222 drives the clamping jaw 1201 to disengage from the venous blood collection tube in Y2 direction (see FIG. 32(a)).

Embodiment 2

The difference between the structure of the blood analyzer in this embodiment and the blood analyzer 1 in Embodiment 1 lies in that the blood analyzer in this embodiment is not provided with the second agitating device 12, but is provided with a sample container carrying device separately, and the remaining parts are the same as the corresponding parts of the blood analyzer 1 in Embodiment 1, so the same structural parts use the same reference numerals and the descriptions thereof are omitted.

The above-mentioned sample container carrying device is the same as the second agitating device 12 of the blood analyzer 1, but is not provided with the structures for the clamping jaw 1201 of the second agitating device 12 to rotate in R7 and R8 directions (including the stepper motor 1223, the position sensor 1255, the sensor chip 1263, the ring-shaped synchronous toothed belt 1243 and corresponding synchronous wheels, the rotating shaft 1271 (after the rotating shaft 1271 is removed, the clamping jaw can be directly fixed on the third support frame 1213)) (refer to FIG. 7).

Figure 35:
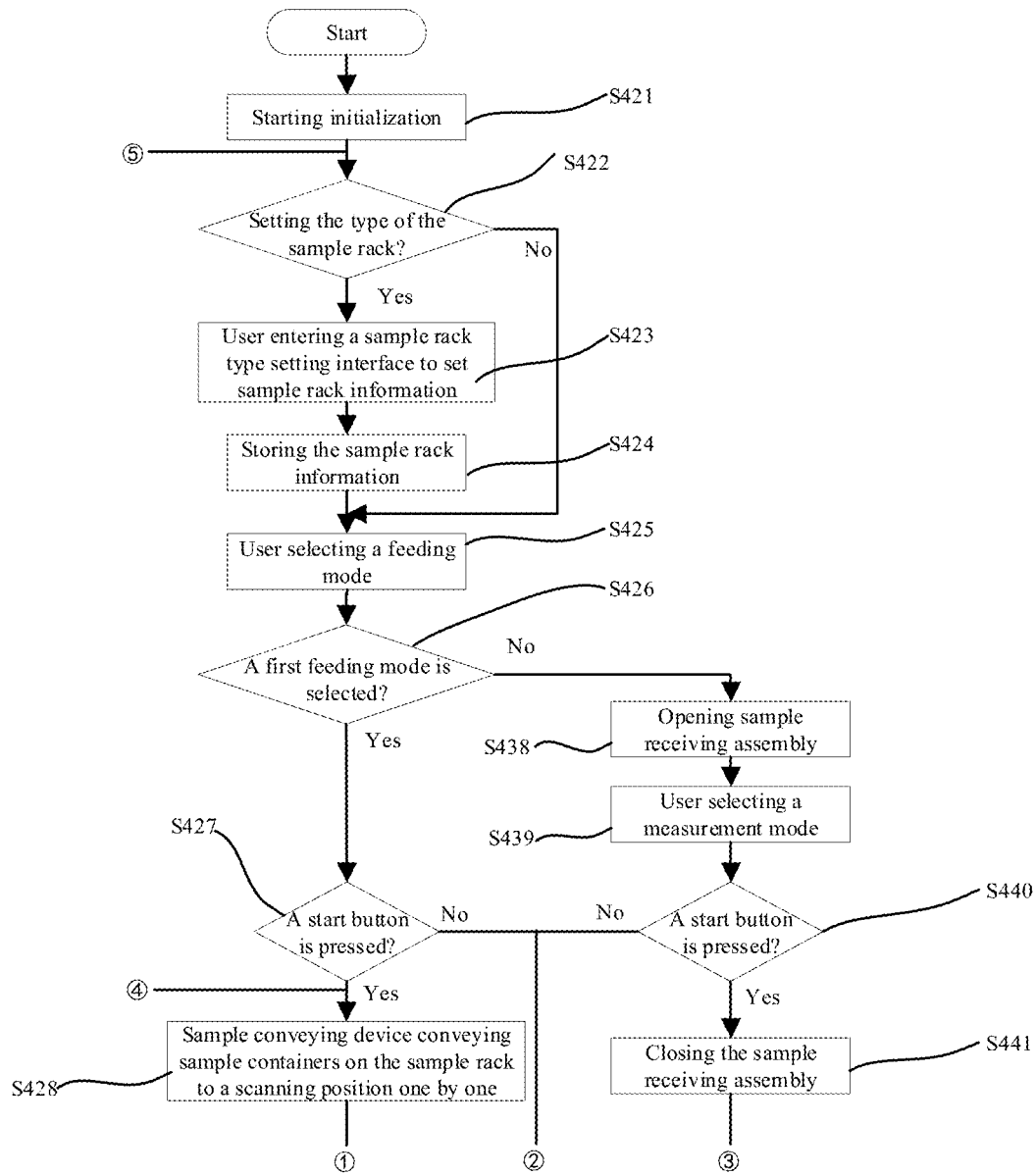
FIGS. 35 and 36 are main flowcharts of another example of analyzing and treating a blood sample by a blood sample analyzer according to the present application.
Figure 36:
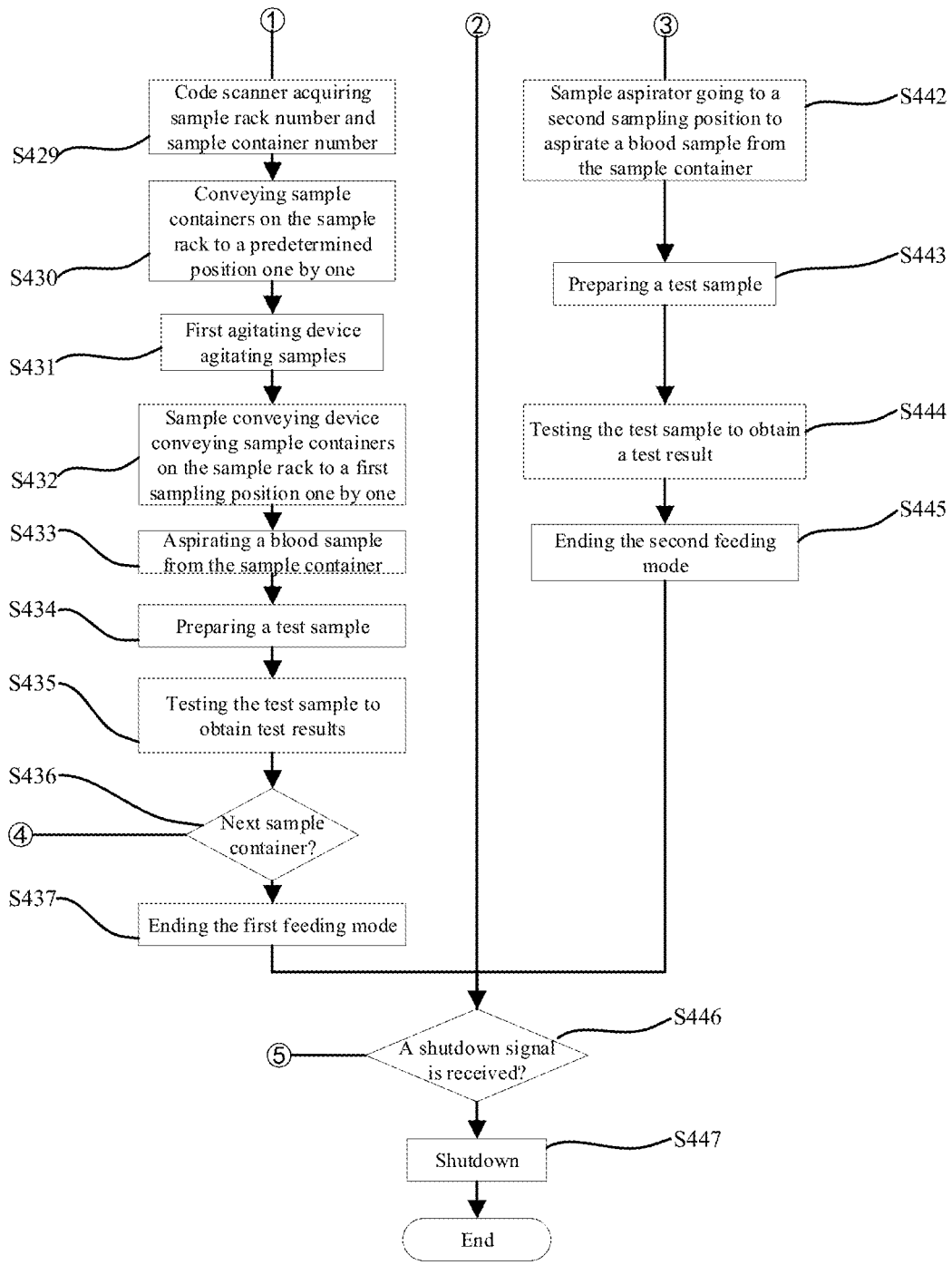

FIG. 35 and FIG. 36 show a main flow of an example of analyzing and treating a blood sample by the blood sample analyzer. Steps S421 to S430 and S432 to S447 are the same as steps S1 to S10 and S12 to S27 in Embodiment 1, so the descriptions thereof are omitted here.

In S431, the controller 21 controls the above-mentioned sample container carrying device to place the current sample container at the predetermined position into the sample container accommodating seat 112 of the first agitating device 11 to agitate the blood sample.

In this embodiment, the sample container carrying device only needs to move in a two-dimensional space of Y1, Y2 direction and Z1, Z2 direction. The process of carrying the sample container to the first agitating device 11 by the sample container carrying device can refer to the process of carrying the sample container to the first agitating device 11 in Embodiment 1 (refer to FIG. 31).

In this embodiment, the blood analyzer is provided with only the first agitating device 11. The first agitating device 11 is used to agitate both small-volume blood samples and venous blood samples.

Embodiment 3

The difference between the structure of the blood analyzer in this embodiment and the blood analyzer in Embodiment 2 lies in that the blood analyzer in this embodiment is only provided with the second feeding mode, but is not provided with the sample conveying device 17, that is, not provided with the first feeding mode, and the sampling position and the predetermined position can be set as the same position, so that the blood analyzer becomes smaller. The remaining parts are the same as the corresponding parts of the blood analyzer in Embodiment 2, so the same structural parts use the same reference numerals and the descriptions thereof are omitted.

Figure 37:
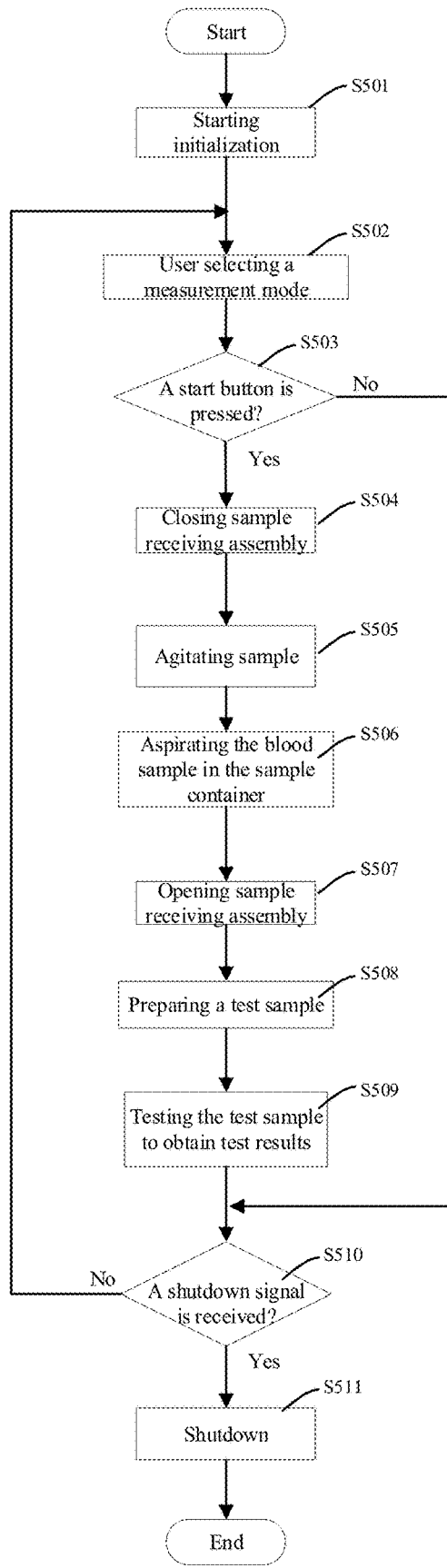
FIG. 37 is a main flowchart of another example of analyzing and treating a blood sample by a blood sample analyzer according to the present application.

FIG. 37 is a main flowchart of an example of analyzing a blood sample by the blood sample analyzer 1. As shown in FIG. 37, the power of the blood sample analyzer 1 is first turned on, and the controller 21 starts initialization (step S501). In this initialization step, initialization of programs, initialization of fluid path components of the blood sample analyzer 1, cleaning of pipes, and resetting of driving components are performed.

Next, in step S502, the measurement mode is selected on the setting interface displayed by the display component 31. The controller 21 determines whether the start button (not shown) has been pressed (step S503). If the controller 21 determines that the start button has not been pressed (step S503: No), step S510 is performed. If it is determined that the start button has been pressed (step S503: Yes), the sample receiving cover 181 is closed, and a sample container 91 (92, 93, 94) is placed at the predetermined position (step S504). Regarding step S504, when the sample receiving cover 181 is originally closed, next step S505 is directly performed, and if the sample receiving cover 181 is originally opened, this step S504 is performed.

The controller 21 controls the first agitating device 11 or the second agitating device 12 to agitate the blood sample in the sample container 91 (92, 93, 94) (step S505). In step S505, the controller 21 determines whether the current measurement mode is a first measurement mode, a second measurement mode, or a third measurement mode; if the controller 21 determines that the current measurement mode is the first measurement mode or the third measurement mode, it controls the clamping jaw 1201 of the second agitating device 12 to carry the current sample container 91 (92, 93) for the first measurement mode or the third measurement mode from the predetermined position into the sample container accommodating hole 1121 (1121a) of the sample container accommodating seat 112 of the first agitating device 11 for agitating the blood sample, and to return the sample container 91 (92, 93) after agitating to the predetermined position; and if the controller 21 determines that the current measurement mode is the second measurement mode, it controls the clamping jaw 1201 of the second agitating device 12 to pick up the current sample container 94 from the predetermined position, and controls the stepper motor 1223 of the second agitating device 12 to drive the clamping jaw 1201 to rotate for agitating the blood sample in the current sample container, and to return the sample container 94 after agitating to the predetermined position.

In this embodiment, preferably, the first agitating device 11 is combined with the sample receiving assembly 18, and the second agitating device 12 is no longer provided. The first agitating device 11 is arranged at the position of the sample container receiving hole 182 of the sample receiving assembly 18 to replace the sample container receiving hole 182 of the sample receiving assembly 18, so that the predetermined position and the agitating position are the same position, and the first agitating device 11 can not only agitate the sample, but also can serve as the sample container receiving hole 182 of the sample receiving assembly 18 (refer to FIG. 1). Thus, in step S505, the controller 21 controls the first agitating device 11 to drive the sample container 91 (92, 93, 94) to agitate the blood sample, that is, the sample analyzer may not be provided with the second agitating device 12. By using the first agitating device to agitate small-volume blood samples, pre-diluted samples and venous whole blood samples, the blood analyzer is further miniaturized.

In step S506, the controller 21 controls, according to the measurement mode information selected by the user, the sample aspirating needle 135 of the sample aspirator 13 to aspirate a predetermined amount of blood sample from the sample container 91 (92, 93, 94) on the sampling position. Specifically, in the first measurement mode, the sample aspirating needle 135 of the sample aspirator 13 aspirates a first sampling amount of blood sample from the first sample container 91 (92, 93); in the third measurement mode, the sample aspirating needle 135 of the sample aspirator 13 aspirates a third sampling amount of blood sample from the first sample container 91 (92, 93); and in the second measurement mode, the sample aspirating needle 135 of the sample aspirator 13 aspirates a second sampling amount of blood sample from the second sample container 94. Preferably, the first sampling amount in the first measurement mode is less than the second sampling amount in the second mode, for example, the first sampling amount is preferably 5-50 μL, more preferably 15-35 μL.

After the blood sample is aspirated, the sample receiving cover 181 is opened to take out the aspirated sample container 91 (92, 93, 94) (step S507). In the present application, the step of opening the sample receiving cover 181 to take out the aspirated sample container 91 (92, 93, 94) may also be performed any time after the blood sample is aspirated, and is not limited to immediately taking out after the blood sample is aspirated.

In step S508, the sample preparing device of the blood sample analyzer 1 prepares a test sample from the blood sample aspirated by the sample aspirator 13. In the first measurement mode, a first test sample is prepared from the aspirated blood sample of the first sampling amount; in the third measurement mode, a third test sample is prepared from the aspirated pre-diluted blood sample of the third sampling amount; and in the second measurement mode, a second test sample is prepared from the aspirated blood sample of the second sampling amount. Preferably, the first sampling amount is less than the second sampling amount, for example, the first sampling amount is 5-50 μL, more preferably 15-35 μL.

In step S509, the tester of the blood sample analyzer 1 tests the test sample prepared by the sample preparing device to obtain test results, and then step S510 is performed.

In step S510, if a shutdown instruction is not received (step S510: No), the process returns to step S502; and if a shutdown instruction is received (step S510: Yes), shutdown is performed (step S511), and then the process ends.

In this embodiment, the sample in the sample container placed into the first agitating device 11 may be a whole blood sample or a pre-diluted sample. The whole blood sample may be a peripheral whole blood sample or a venous whole blood sample. The blood analyzer of this embodiment, which is not provided with a sample rack conveying device, has a smaller size and is more suitable for occasions where small-volume whole blood or pre-diluted samples need to be tested frequently, the user can put samples into the sample receiving assembly for agitating, and manual agitating is not required any more.

Embodiment 4

In this embodiment, the first agitating device 11 and the second agitating device 12 of the blood analyzer 1 in Embodiment 1 are also provided, and the function of the first agitating device 11 and the function of the sample receiving assembly 18 are combined, that is: the first agitating device 11 of the blood analyzer 1 in Embodiment 1 is also provided, and another first agitating device 11 is further arranged at the position of the sample container receiving hole 182 of the sample receiving assembly 18 to replace the sample container receiving hole 182 of the sample receiving assembly 18, so that the another first agitating device 11 can not only agitate the sample, but also can serve as the sample container receiving hole 182 of the sample receiving assembly 18 (refer to FIG. 1).

Figure 38:
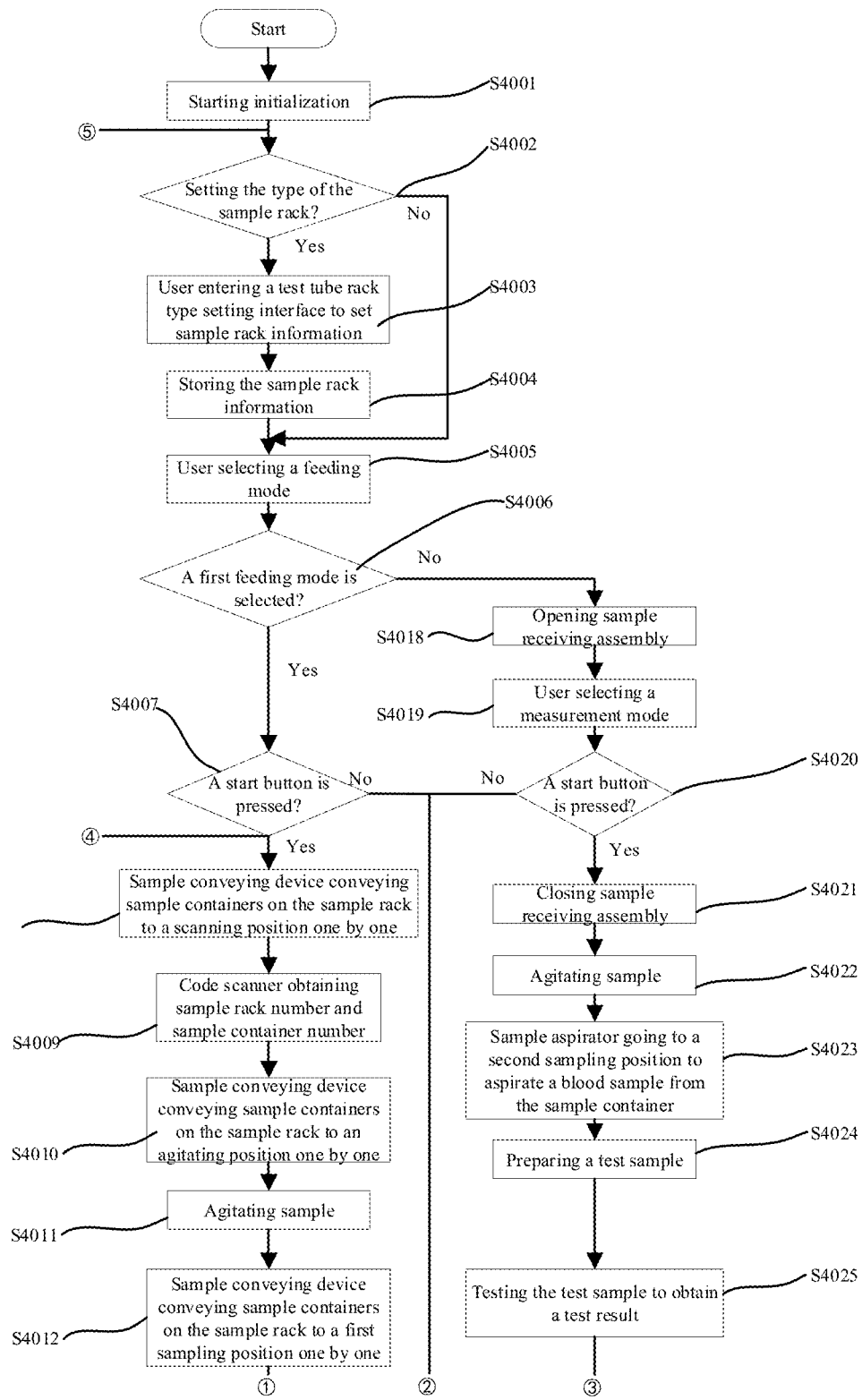
FIGS. 38 and 39 are main flowcharts of another example of treating a blood sample by a blood sample analyzer according to an embodiment.
Figure 39:
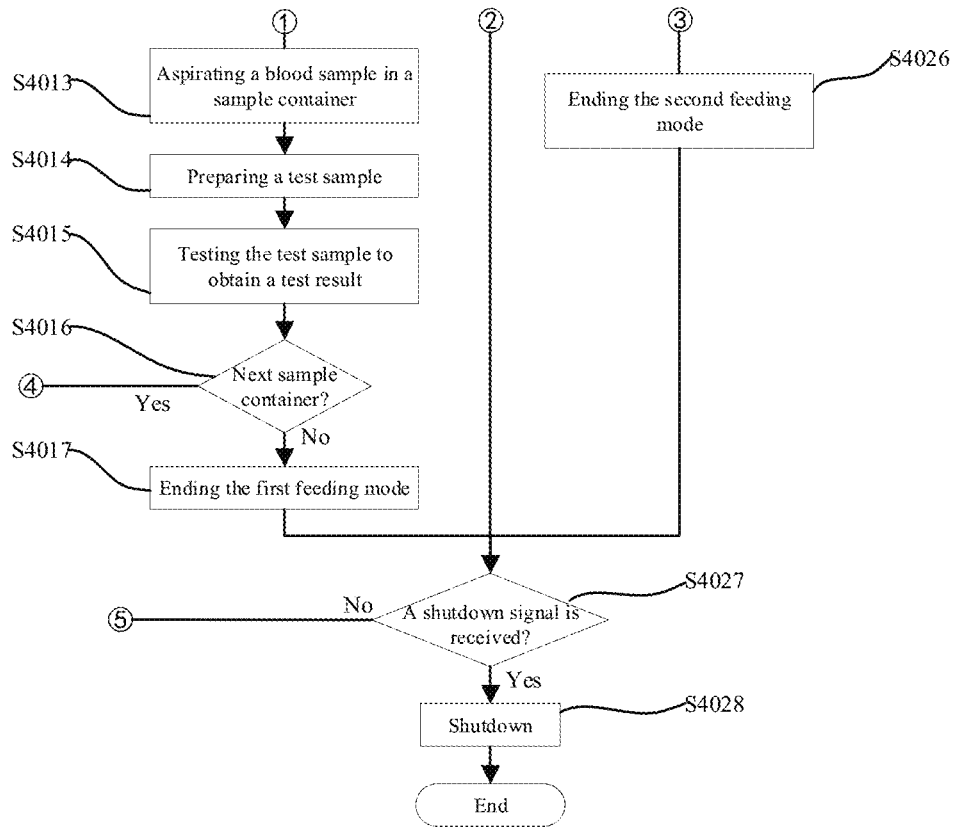

FIGS. 38 and 39 are main flowcharts of an example of analyzing a blood sample by the blood sample analyzer 1 in this embodiment.

Step S4001 to S4021 are the same as step S1 to S21 in Embodiment 1, so the descriptions thereof are omitted here.

The controller 21 determines whether the start button (not shown) has been pressed (step S4020). If the controller 21 determines that the start button has not been pressed (step S4020: No), S4027 is performed. If it is determined that the start button has been pressed (step S4020: Yes), step S4021 is performed, the sample receiving cover 181 is closed, a sample container 91 (92, 93, 94) is placed at the predetermined position, and then step S4022 is performed.

In step S4022, the controller 21 controls the another first agitating device 11 combined with the sample receiving assembly 18 to agitate the blood sample in the sample container 91 (92, 93, 94).

The controller 21 controls, according to the measurement mode information selected by the user in step S4019, the sample aspirating needle 135 of the sample aspirator 13 to aspirate a predetermined amount of blood sample from the sample container 91 (92, 93, 94) on the second sampling position (step S4023). Specifically, in the first measurement mode, the sample aspirating needle 135 of the sample aspirator 13 aspirates a first sampling amount of blood sample from the first sample container 91 (92, 93); in the third measurement mode, the sample aspirating needle 135 of the sample aspirator 13 aspirates a third sampling amount of pre-diluted blood sample from the first sample container 91 (92, 93); and in the second measurement mode, the sample aspirating needle 135 of the sample aspirator 13 aspirates a second sampling amount of blood sample from the second sample container 94.

In step S4024, the sample preparing device of the blood sample analyzer 1 prepares a test sample from the blood sample aspirated by the sample aspirator 13. In the first measurement mode, a first test sample is prepared from the aspirated blood sample of the first sampling amount; in the third measurement mode, a third test sample is prepared from the aspirated pre-diluted blood sample of the third sampling amount; and in the second measurement mode, a second test sample is prepared from the aspirated blood sample of the second sampling amount.

In step S4025, the tester of the blood sample analyzer 1 tests the test sample prepared by the sample preparing device to obtain test results, the second feeding mode ends (step S4026), and then step S4027 is performed.

In step S4027, if a shutdown instruction is not received (step S4027: No), the process returns to step S4002; and if a shutdown instruction is received (step S4027: Yes), shutdown is performed (step S4028), and then the process ends.

Embodiment 5

Except that the first agitating device 71 in the blood analyzer of this embodiment is different from the first agitating device 11 in the blood analyzer 1 of Embodiment 1 or the blood analyzer of Embodiment 2 or Embodiment 3, all the other parts are the same, so the same structural parts use the same reference numerals and the descriptions thereof are omitted.

Figure 40:
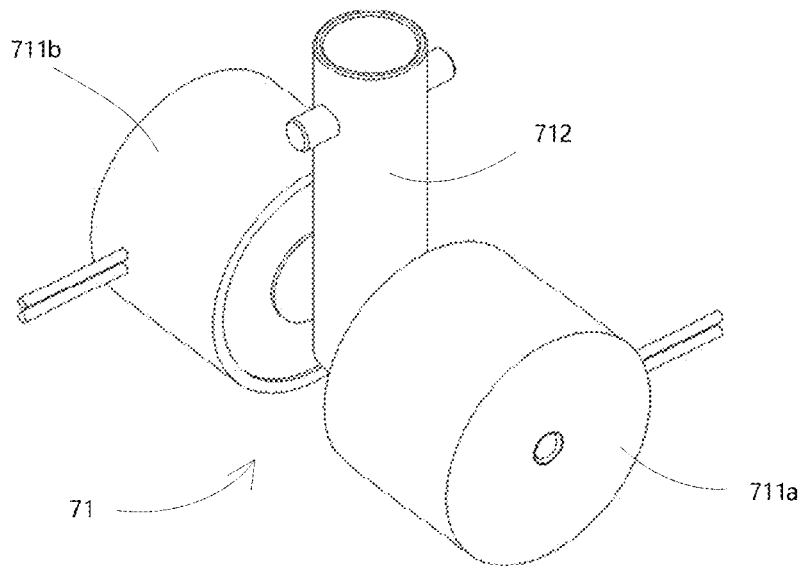
FIG. 40 is a perspective view of another first agitating device according to an embodiment of the present application.
Figure 41:
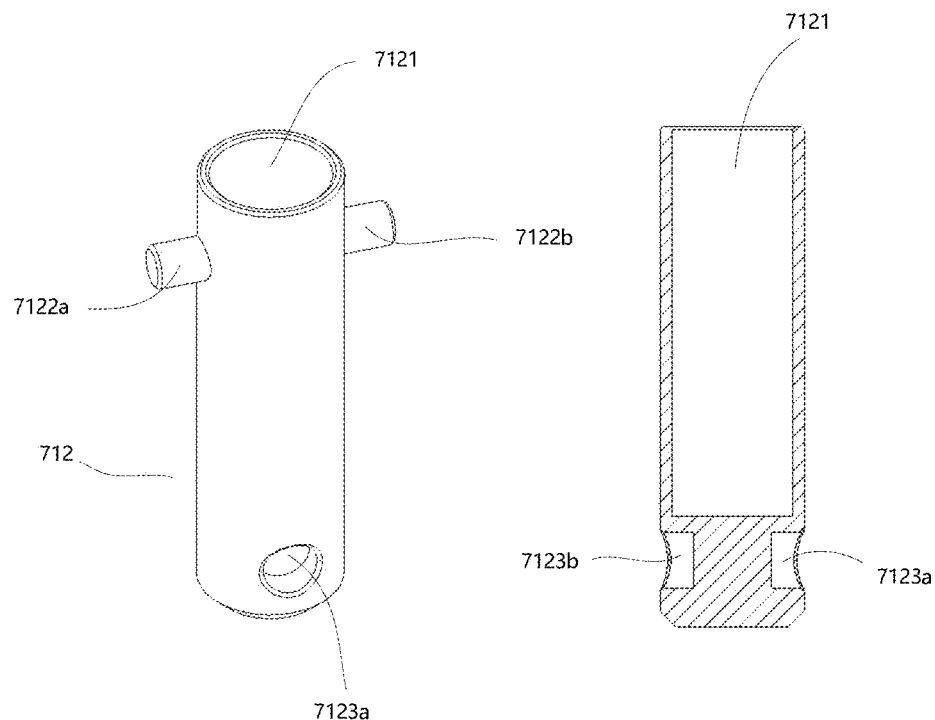
FIG. 41 is a cross-sectional perspective view of a sample container accommodating seat of the another first agitating device shown in FIG. 40.
Figure 42:
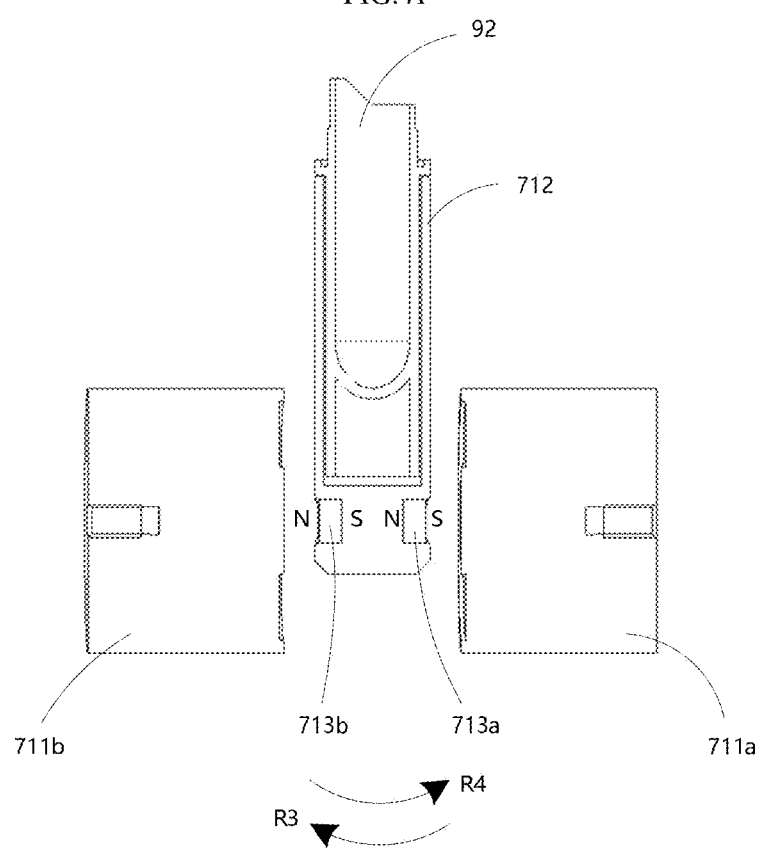
FIG. 42 is a cross-sectional view for illustrating the working principle of the another first agitating device shown in FIG. 40.

FIG. 40 is a perspective view of the first agitating device in this embodiment; FIG. 41 is a perspective cross-sectional view of the sample container accommodating seat of the first agitating device shown in FIG. 40; and FIG. 42 is a cross-sectional view for illustrating the working principle of the first agitating device shown in FIG. 40. As shown in FIGS. 40 to 42, the agitating device 71 includes two electromagnets 711a and 711b in form of suction pad, a sample container accommodating seat 712, and two permanent magnets 713a and 713b.

The sample container accommodating seat 712 is provided with a hole 7121 for holding a small-volume blood collection tube, two cylindrical cantilevers 7122a and 7122b are arranged on both sides of the accommodating seat, and the lower part of the accommodating seat is further provided with two round holes 7123a and 7123b for fixing the permanent magnets (refer to FIG. 41). The sample container accommodating seat 712 is rotatably fixed on a support frame not shown by the cantilevers 7122a and 7122b, the sample container accommodating seat 712 rotates about the cantilevers 7122a and 7122b, and the support frame is provided with a limiting portion for limiting the swing angle of the sample container accommodating seat 712.

The two permanent magnets 713a and 713b are respectively fixed in the two round holes 7123a and 7123b of the sample container accommodating seat 712 by crimping or bonding. In order to prevent the two permanent magnets 713a and 713b from repelling each other to affect installation, the magnetic poles of the permanent magnets 713a and 713b are preferably provided in the same magnetization direction (refer to FIG. 40).

The electromagnets 711a and 711b in form of suction pad are respectively arranged on both sides of the permanent magnets 713a and 713b (refer to FIG. 42). When the electromagnets 711a and 711b are supplied with forward or reverse current, they generate different magnetic poles with different polarities at the sides close to the permanent magnets 713a and 713b to produce magnetic force effects on the permanent magnets 713a and 713b. Taking FIG. 40 as an example, when the electromagnets 711a and 711b simultaneously generate S poles at the sides close to the permanent magnets 713a and 713b, the electromagnet 711a repels the permanent magnet 713a, the electromagnet 711b attracts the permanent magnet 713b, and under the action of magnetic force, the sample container accommodating seat 712 is swung about the cantilevers 7122a and 7122b towards the electromagnet 711b in R3 direction until it hits the limiting portion; and when the electromagnets 711a and 711b simultaneously generate N poles at the sides close to the permanent magnets 713a and 713b, the electromagnet 711a attracts the permanent magnet 713a, the electromagnet 711b repels the permanent magnet 713b, and under the action of magnetic force, the sample container accommodating seat 712 is swung about the cantilevers 7122a and 7122b toward the electromagnet 711a in R4 direction until it hits the limiting portion. In this embodiment, the swing range of the sample container accommodating seat 712 may also be controlled by controlling the magnitude of the magnetic force.

When the electromagnets 711a and 711b are supplied with synchronous alternating current (it must make sure that the electromagnets 711a and 711b generate same magnetic poles at the sides close to the permanent magnets 713a and 713b), the sample container accommodating seat 712 is swung back and forth in R3 and R4 directions. The commutation frequency of the alternating current determines the swing frequency of the sample container accommodating seat 712. The maximum swing frequency of the sample container accommodating seat 712 is limited by the total rotational inertia of the sample container accommodating seat 712 and the small-volume blood collection tube. In order to make the sample container accommodating seat 712 swing at a higher frequency, the sample container accommodating seat 712 should be made of a material with smaller mass density (such as plastic).

In this embodiment, considering that blood collection volumes are different for different users, in order to avoid uneven agitating when the blood collection volumes are small and avoid sample spilling out of the small-volume blood collection tube when the blood collection volumes are large, the frequency of the alternating current flowing through the electromagnets 711a and 711b can be set on a human-computer interaction interface according to different blood collection volumes.

In this embodiment, the main process of an example of analyzing and treating a blood sample by the blood sample analyzer is the same as the process of Embodiment 1 or Embodiment 2. Accordingly, only the agitating operation is described here, and the descriptions of other operations are omitted.

In this embodiment, the sample container accommodating seat 712 drives the small-volume blood collection tube to swing together to achieve the agitating of the small-volume sample in the small-volume blood collection tube. Since the small-volume blood collection tube is limited during swing, the bottom of the small-volume blood collection tube is kept lower than the opening of the blood collection tube.

In this embodiment, one permanent magnet 713a or 713b may be arranged on one side of the lower part of the sample container accommodating seat 712, and the electromagnet 711a or 711b in form of suction pad is arranged on one side of the permanent magnet 713a or 713b. When the electromagnet 711a or 711b is supplied with forward or reverse current, it generates a magnetic pole having different or same polarity from or as the permanent magnet 713a or 713b at the side close to the permanent magnet 713a or 713b, to produce a magnetic force effect of attracting or repelling on the permanent magnet 713a or 713b, so that the sample container accommodating seat 712 is swung within a predetermined range.

In this embodiment, permanent magnets may be used instead of the electromagnets 711a and 711b. By rotating the magnetic poles of the permanent magnets, the permanent magnet 713a or 713b is attracted or repelled by the magnetic force, so that the sample container accommodating seat 712 is swung within a predetermined range.

Preferably, the small-volume blood collection tube may be a small-volume blood collection tube shown in FIG. 16, the inner cavity bottom of which is hemi-ellipsoidal or hemispherical; the sample volume of the small-volume sample in the small-volume blood collection tube is less than or equal to 150 μL; the small-volume sample may be a whole blood sample or a pre-diluted sample; and the small-volume sample may be small-volume peripheral blood or small-volume venous blood. More preferably, by generating magnetic force that attracts or repels the permanent magnet 713a or 713b, the sample container accommodating seat 712 is swung back and forth substantially horizontally within a predetermined range.

Figure 43:
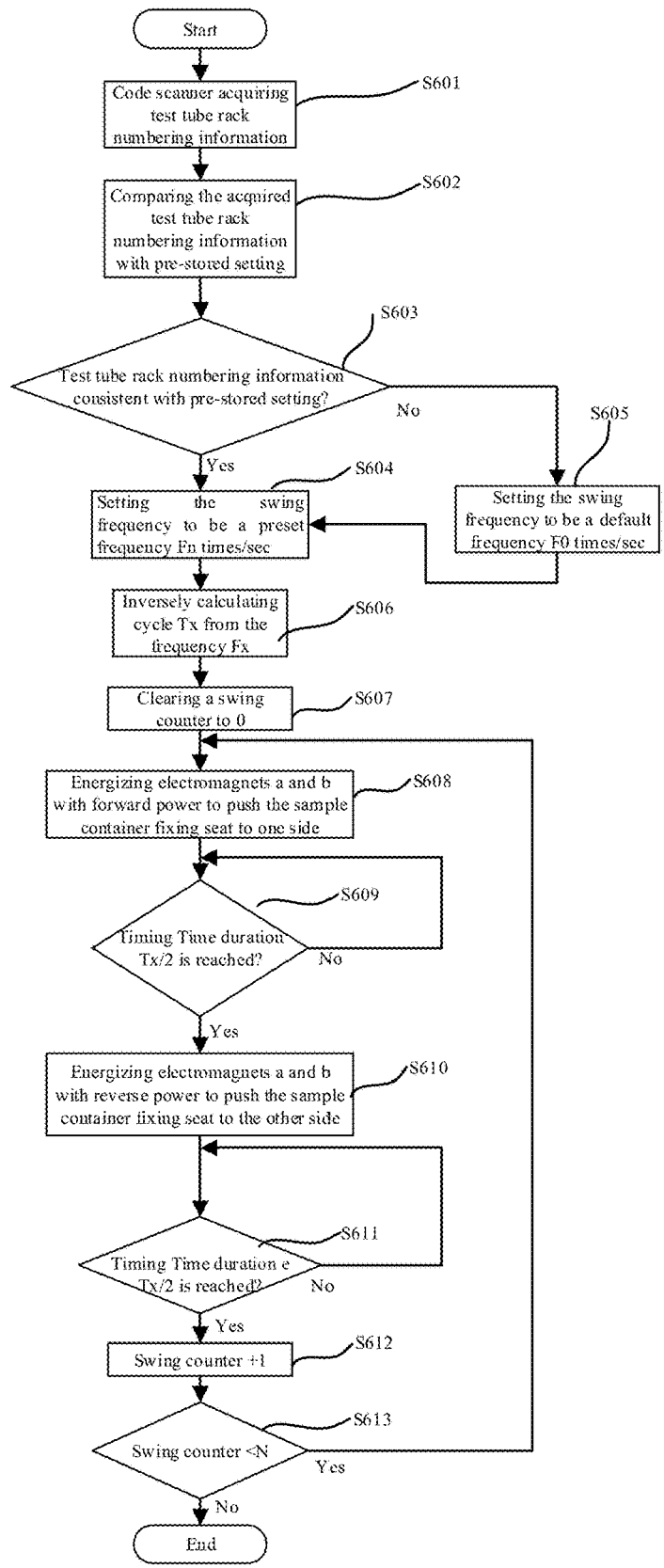
FIG. 43 is a flowchart of an agitating process of another first agitating device according to the present application.

FIG. 43 is a flowchart of the agitating process of the first agitating device 71 in this embodiment. As shown in FIG. 43, the container rotating code-scanning device acquires numbering information of the sample rack 80 or the sample container 91 (92, 93) (step S601), and the controller 21 compares the acquired numbering information with pre-stored setting (step S602), to determine whether the acquired numbering information is consistent with the pre-stored setting information (step S603). If the acquired numbering information is consistent with the pre-stored setting information (step S603: Yes), the swing frequency of the sample container accommodating seat 712 is set as a preset frequency Fn times/sec (step S604), and then step S606 is performed. If the acquired numbering information is not consistent with the pre-stored setting information (step S603: No), the swing frequency of the sample container accommodating seat 712 is set as a default frequency F0 times/sec (step S605), and then step S606 is performed.

In step S606, the swing cycle Tx is inversely calculated from the swing frequency Fx (Fn or F0), and then the swing counter is cleared (step S607). The electromagnets 711a and 711b are supplied with forward power to push the sample container accommodating seat 712 to one side (step S608). The controller 21 determines whether the time duration for pushing the sample container accommodating seat 712 to one side has reached a timing time duration Tx/2 (step S609). If the time for pushing the sample container accommodating seat 712 to one side has not reached the timing time duration Tx/2 (step S609: No), it is waited until the time duration for pushing the sample container accommodating seat 712 to one side reaches the timing time duration Tx/2. If the time duration for pushing the sample container accommodating seat 712 to one side has reached the timing time duration Tx/2 (step S609: Yes), the electromagnets 711a and 711b are supplied with reverse power to push the sample container accommodating seat 712 to the other opposite side (step S610). The controller 21 determines whether the time duration for pushing the sample container accommodating seat 712 to the other side has reached the timing time duration Tx/2 (step S611). If the time duration for pushing the sample container accommodating seat 712 to the other side has not reached the timing time duration Tx/2 (step S609: No), it is waited until the time duration for pushing the sample container accommodating seat 712 to the other side reaches the timing time duration Tx/2. If the time duration for pushing the sample container accommodating seat 712 to the other side has reached the timing time duration Tx/2 (step S611: Yes), the count of the swing counter is incremented by 1 (step S612).

The controller 21 determines whether the count number of the swing counter has reached a predetermined value N, that is, whether the count number is less than N (step S613). If the count number of the swing counter has not reached the predetermined value N (step S613: No), it indicates that the sample has not been stirred uniformly, the process returns to step S608 to continue stirring, until the count number of the swing counter reaches the predetermined value N, which indicates that the sample has been stirred uniformly (step S613: Yes), and the current agitating process ends.

Those skilled in the art can appreciate that whether the current agitating process is completed can also be determined by determining whether the swing time duration has reached a preset value.

In the foregoing embodiment, the preset swing frequency Fx (Fn or F0) refers to an instruction provided by the controller 21 to the first agitating device 71. The preset swing frequency Fx (Fn or F0) can be set by the user or calculated by the required swing cycle Tx and count number.

Those skilled in the art can appreciate that, the first sample container can also be magnetically driven to generate substantially horizontal vibration for agitating the blood sample therein, or the motor drives a connecting rod to drive the first sample container to generate reciprocating motion for agitating. The reciprocating motion here may be substantially horizontal vibration or may be swing about a certain fulcrum.

In the foregoing embodiment, multiple times of agitating operations may be performed to complete the agitating process. Different swing frequencies are set in two successive agitating operations to further improve the agitating effect.

Embodiment 6

Except that the first agitating device 71 in the blood analyzer of this embodiment is different from the first agitating device 11 in the blood analyzer 1 of Embodiment 1 or the blood analyzer of Embodiment 2 or Embodiment 3, all the other parts are the same, so the same structural parts use the same reference numerals and the descriptions thereof are omitted.

Figure 44:
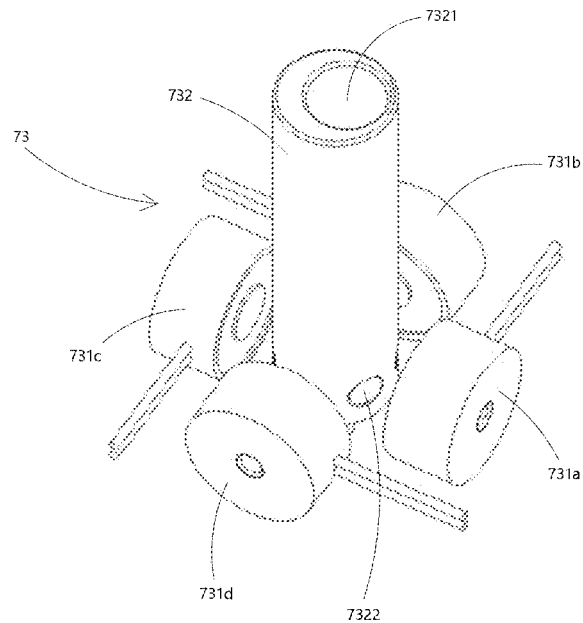
FIG. 44 is a perspective view of another first agitating device according to an embodiment of the present application.
Figure 45:
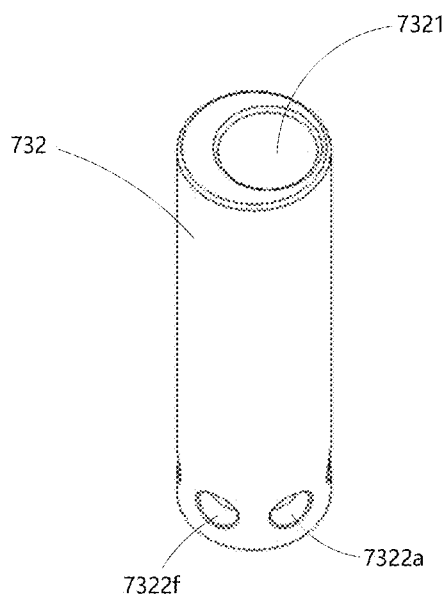
FIG. 45 is a perspective of a sample container accommodating seat of another first agitating device according to an embodiment of the present application.
Figure 46:
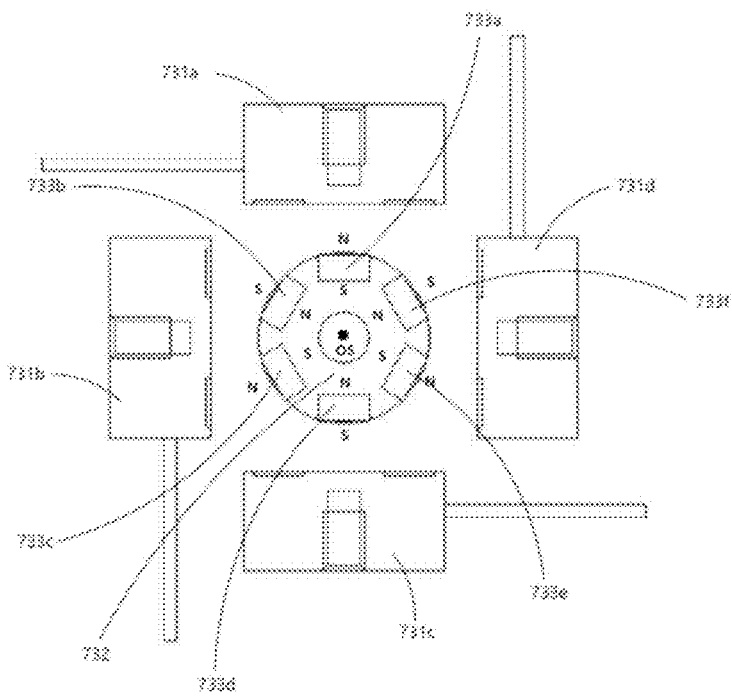
FIG. 46 is a horizontal cross-sectional view of another first agitating device according to an embodiment of the present application.

FIG. 44 is a perspective view of the first agitating device (magnetically driven vortex agitating device) in this embodiment; FIG. 45 is a perspective view of the sample container accommodating seat of the magnetically driven vortex agitating device; FIG. 46 is a horizontal cross-sectional view of the magnetically driven vortex agitating device; and FIGS. 47-51 are operation exploded diagrams for illustrating the working principle of the magnetically driven vortex agitating device.

As shown in FIG. 44, the magnetically driven vortex agitating device 73 includes: electromagnets 731a-731d in form of suction pad, a sample container accommodating seat 732, and permanent magnets 733a-733f.

As shown in FIGS. 44-46, the sample container accommodating seat 732 is provided with a sample container accommodating hole 7321 for holding a small-volume blood collection tube, and the lower part of the sample container accommodating seat is further provided with round holes 7322a-7322f for fixing the permanent magnets 733a-733f. The sample container accommodating hole 7321 may be constructed concentrically or eccentrically relative to the sample container accommodating seat 732, and preferably, the sample container accommodating hole 7321 may be constructed eccentrically relative to the sample container accommodating seat 732. In addition, a rotating shaft and a bearing (not shown) are mounted at the bottom of the sample container accommodating seat 732. Under the drive of external force, the sample container accommodating seat 732 can rotate about the center O5 of the rotating shaft.

The six permanent magnets 733a-733f are respectively fixed in the six round holes 7322a-7322f of the sample container accommodating seat 732 by crimping or bonding. The magnetic poles of the six permanent magnets 733a-733f are distributed as shown in FIG. 46. The magnetic poles of the adjacent permanent magnets facing the center O5 of the rotating shaft of the sample container accommodating seat 732 are opposite.

It is assumed that the initial state is: the electromagnets 731a and 731c are energized, the electromagnets 731b and 731d are deenergized, the electromagnet 731a generates an S pole facing the center O5 of the rotating shaft of the sample container accommodating seat 732, and the electromagnet 731c generates an N pole facing the center O5 of the rotating shaft of the sample container accommodating seat 732. Under the action of electromagnetic force, the sample container accommodating seat 732 is locked at the position shown in FIG. 47.

Figure 47:
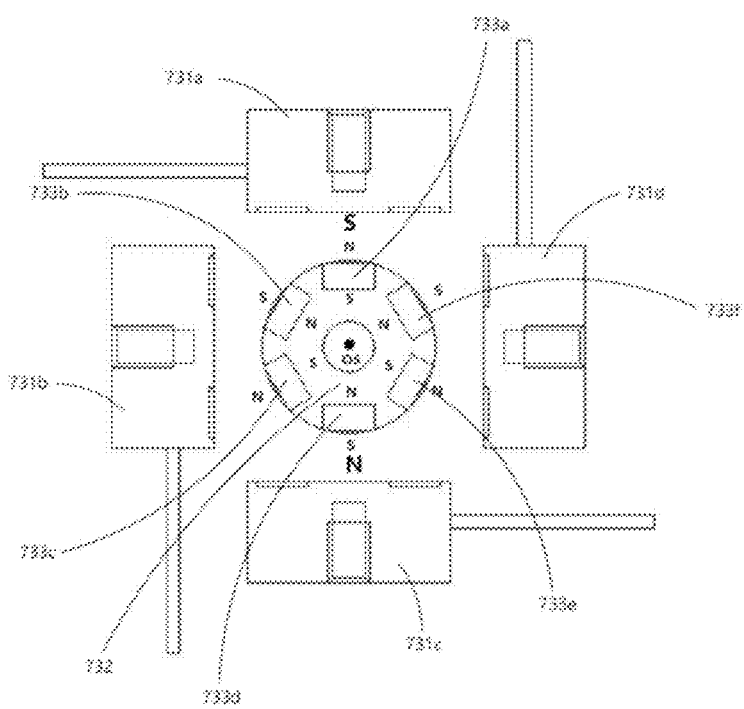
FIGS. 47 to 51 are operation exploded diagrams for illustrating the working principle of another first agitating device according to an embodiment of the present application.
Figure 48:
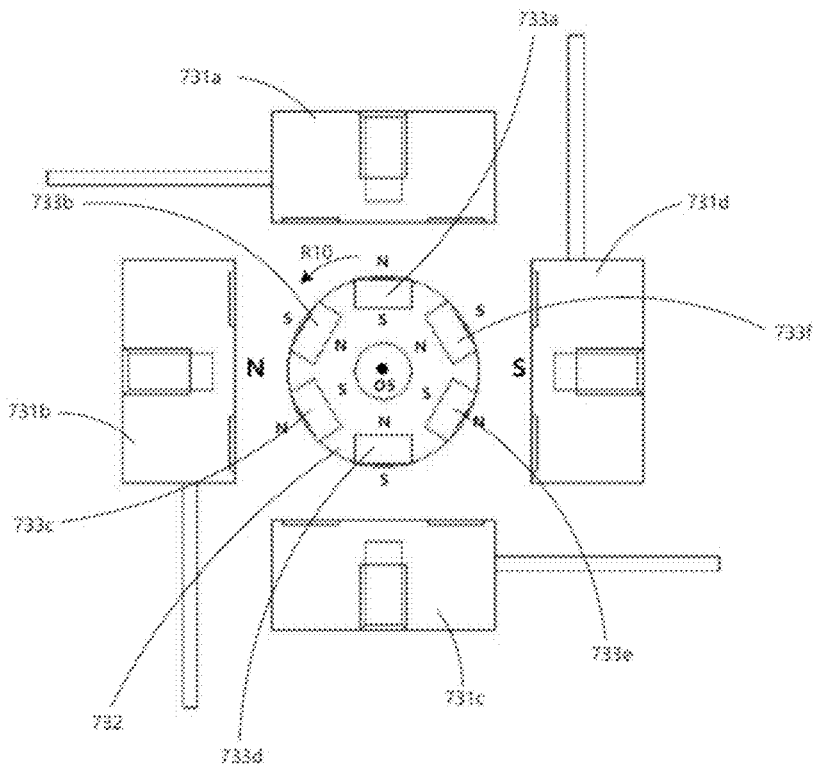
Figure 49:
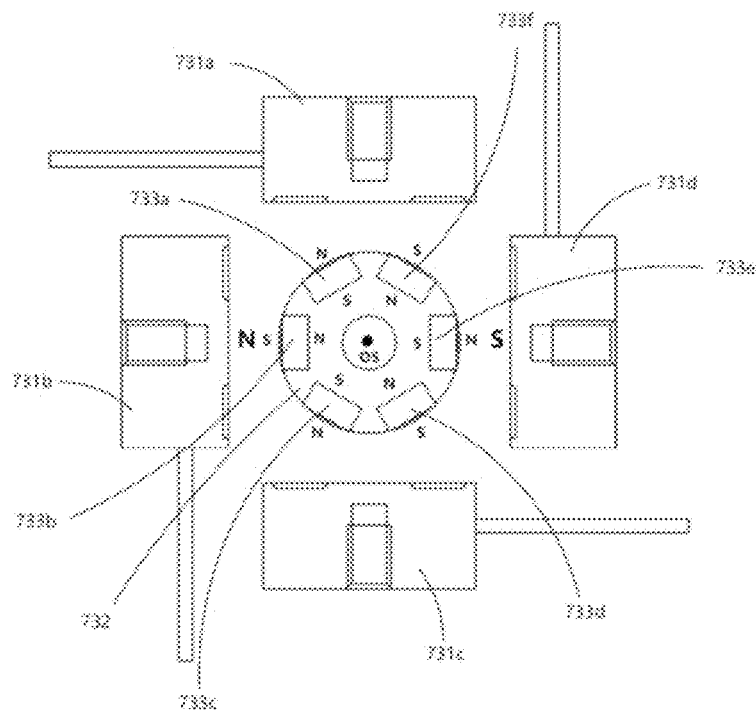

At the position shown in FIG. 47, if the electromagnets 731a and 731c are deenergized, the electromagnets 731b and 731d are energized, the electromagnet 731b generates an N pole facing the center O5 of the rotating shaft of the sample container accommodating seat 732, and the electromagnet 731d generates an S pole facing the center O5 of the rotating shaft of the sample container accommodating seat 732, the electromagnet 731b attracts the permanent magnet 733b, and the electromagnet 731d attracts the permanent magnet 733e. Under the action of electromagnetic force, the sample container accommodating seat 732 rotates counterclockwise in R10 direction (as shown in FIG. 48) and is finally locked at the position shown in FIG. 49.

Figure 50:
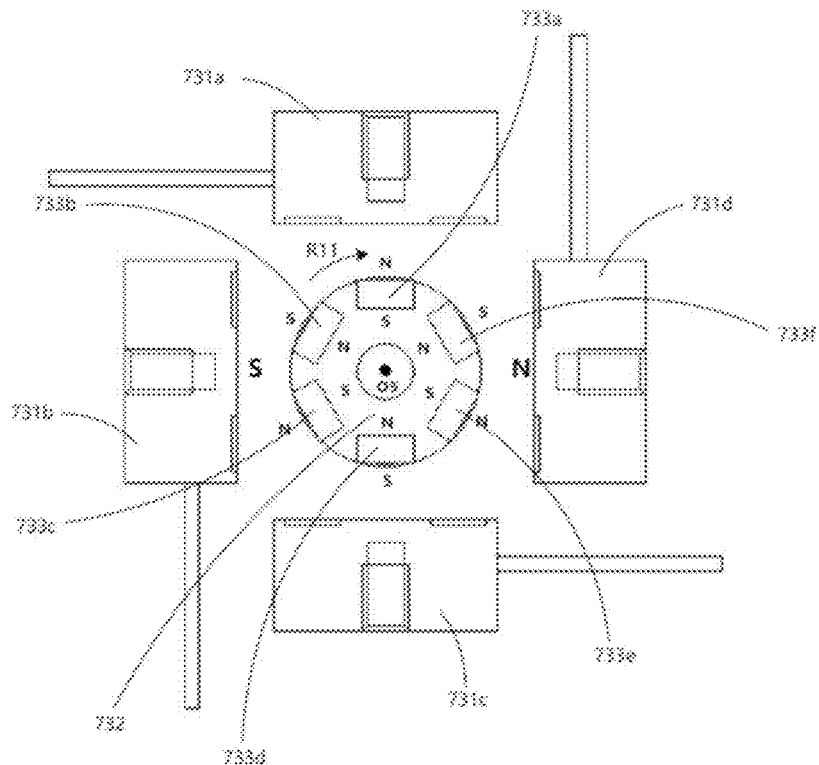

At the position shown in FIG. 47, if the electromagnets 731a and 731c are deenergized, the electromagnets 731b and 731d are energized, the electromagnet 731b generates an S pole facing the center O5 of the rotating shaft of the sample container accommodating seat 732, and the electromagnet 731d generates an N pole facing the center O5 of the rotating shaft of the sample container accommodating seat 732, then under the action of electromagnetic force, the sample container accommodating seat 732 rotates clockwise in R11 direction (as shown in FIG. 50).

Figure 51:
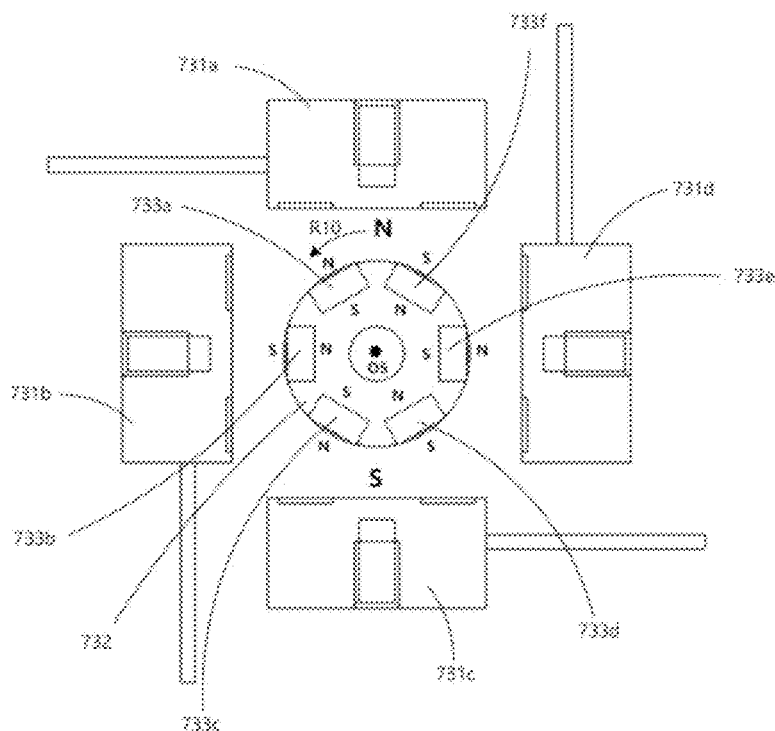

Herein, the sample container accommodating seat 732 rotating counterclockwise in R10 direction is taken as an example for continued description. At the position shown in FIG. 49, if the electromagnets 731a and 731c are energized, the electromagnets 731b and 731d are deenergized, the electromagnet 731a generates an N pole facing the center O5 of the rotating shaft of the sample container accommodating seat 732, and the electromagnet 731c generates an S pole facing the center O5 of the rotating shaft of the sample container accommodating seat 732, the electromagnet 731b attracts the permanent magnet 733c, and the electromagnet 731d attracts the permanent magnet 733f Under the action of electromagnetic force, the sample container accommodating seat 732 continues to rotate counterclockwise in R10 direction (as shown in FIG. 51).

It can be seen that as long as the energization sequence and magnetic poles of the electromagnets 731a-731d are reasonably controlled according to a specific order and rule, the sample container accommodating seat 732 can be controlled to rotate clockwise or counterclockwise by magnetic force, and the sample container accommodating seat 732 is thus driven to drive the sample container placed in the sample container accommodating hole 7321 to rotate, so as to uniformly agitate the sample in the sample container.

The rotation speed of the sample container accommodating seat 732 is related to the magnetic pole switching frequency of the electromagnets 731a-731d. The rotation speed of the sample container accommodating seat 732 can be controlled by controlling the energization switching frequency of the electromagnets 731a-731d.

By controlling the magnetic pole switching sequence of the electromagnets 731a-731d, the sample container accommodating seat 732 can be controlled to rotate counterclockwise or clockwise, or counterclockwise and clockwise alternately, and preferably rotate counterclockwise and clockwise alternately.

The numbers of the electromagnets and the permanent magnets may not be 4 and 6, but more, depending on the space layout. Energization method of the electromagnets may not be energizing electromagnets in pairs, but may be energizing electromagnets one by one in sequence.

In this embodiment, the difference between the magnetically driven vortex agitating device 73 and the first agitating device (motor driven vortex agitating device 71) lies in driving device. Therefore, the agitating control program for the magnetically driven vortex agitating device 73 is similar to that of the first agitating device 71 and will not be repeated here.

Embodiment 7

Except that the first agitating device 72 in the blood analyzer of this embodiment is different from the first agitating device 11 in the blood analyzer 1 of Embodiment 1 or the blood analyzer of Embodiment 2 or Embodiment 3, all the other parts are the same, so the same structural parts use the same reference numerals and the descriptions thereof are omitted.

Figure 52:
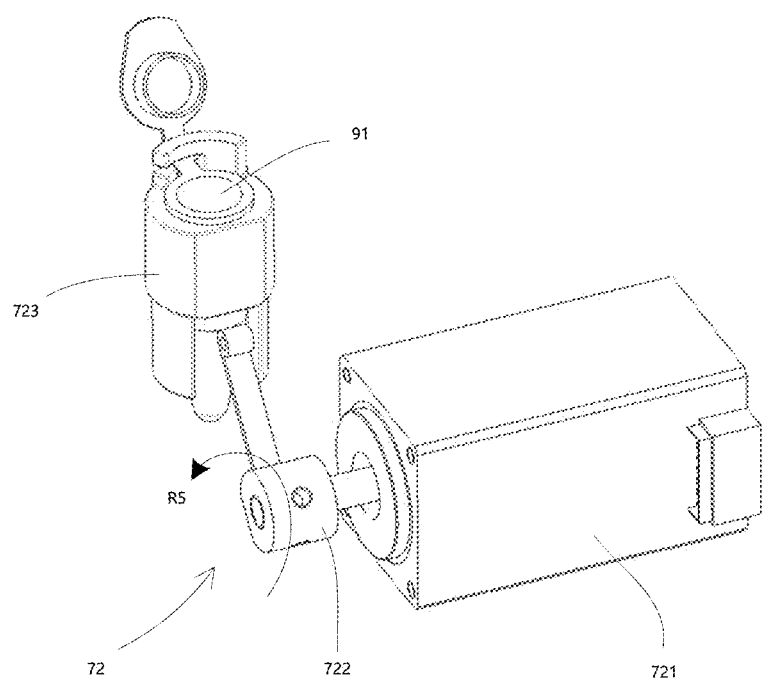
FIG. 52 is an oblique view of another first agitating device according to the present application.
Figure 53:
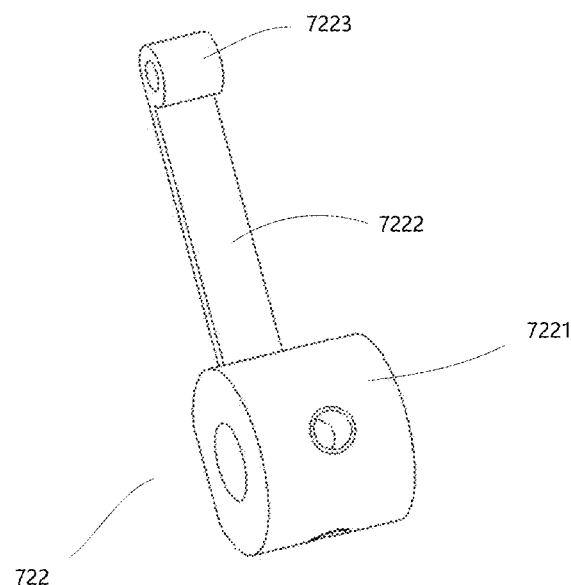
FIG. 53 is a perspective view of a knock device of the first agitating device shown in FIG. 52.
Figure 54:
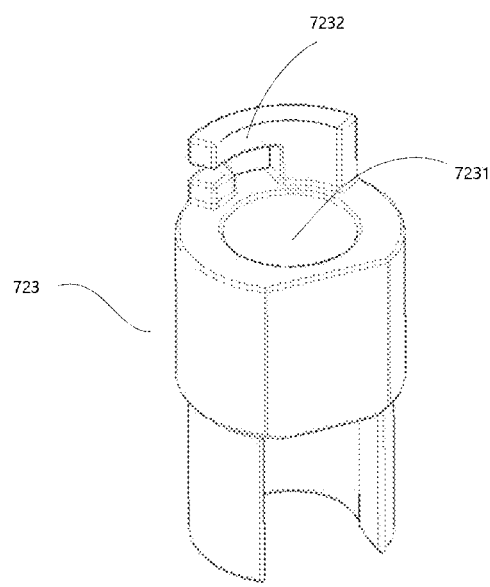
FIG. 54 is a perspective view of a sample container accommodating seat of the first agitating device shown in FIG. 52.

FIG. 52 is a perspective view of the first agitating device in this embodiment; FIG. 53 is a perspective view of a knock device of the first agitating device shown in FIG. 52; and FIG. 54 is a perspective view of a sample container accommodating seat of the first agitating device shown in FIG. 52. As shown in FIGS. 52-54, the agitating device 72 includes: a motor 721, a knock device 722, and a sample container accommodating seat 723, wherein the sample container accommodating seat 723 is arranged on a support component (not shown) of the blood analyzer 1 in a swingable manner. The sample container accommodating seat 723 is provided with a hole 7231 for holding a small-volume blood collection tube and a blocking portion 7232 for preventing the cap of the small-volume blood collection tube from turning towards the tube body (body portion). The knock device 722 includes a fixing portion 7221, a connecting portion 7222, and a knock portion 7223 (refer to FIG. 54). The knock device 722 is fixed on a rotating shaft of the motor 721 by means of screw connection, bonding, riveting, etc. through the fixing portion 7221. The motor 721 may be a stepper motor or a servo motor or a DC motor. The connecting portion 7222 is made of a flexible material (such as a spring piece). The knock device 722 rotates in R5 direction under the drive of the motor 721. Every time the motor 721 makes a rotation, the knock portion 7223 of the knock device 722 knocks the bottom of the small-volume blood collection tube once, so that the sample container 91 (92, 93, 94) is swung with the sample container accommodating seat 723 about a support point of the sample container accommodating seat 723, wherein the swing range of the sample container 91 (92, 93, 94) is configured in such a manner that the bottom of the sample container 91 (92, 93, 94) is kept lower than its opening. The controller 21 controls the motor 721 to rotate at different rotation speeds, that is, controls the knock speed of the knock device 722 knocking the bottom of the small-volume blood collection tube.

The above embodiment realizes the agitating of the sample in the blood collection tube by knocking the bottom of the small-volume blood collection tube, which simulates a manual operation of flicking the small-volume blood collection tube by hand. Preferably, the small-volume blood collection tube may be a small-volume blood collection tube shown in FIG. 15, the inner cavity bottom of which is an inverted cone; the sample volume of the small-volume sample in the small-volume blood collection tube is less than or equal to 150 µL; the small-volume sample may be a whole blood sample or a pre-diluted sample; and the small-volume sample may be small-volume peripheral blood or small-volume venous blood.

In this embodiment, considering that blood collection volumes are different for different users, in order to avoid uneven agitating when the blood collection volumes are small and avoid sample spilling out of the small-volume blood collection tube when the blood collection volumes are large, the rotation speed of the motor 721 can be set on the operation interface according to different blood collection volumes.

The agitating device 72 in this embodiment realizes the agitating of the sample in the blood collection tube by knocking the bottom of the small-volume blood collection tube, which simulates a manual operation of flicking the small-volume blood collection tube by hand.

In this embodiment, the hole 7231 for holding the small-volume blood collection tube may be integrally formed, or may be two opposite half holes. When using, the two half holes are close to each other to form the hole for holding the small-volume blood collection tube.

In this embodiment, the main process of an example of analyzing and treating a blood sample by the blood sample analyzer is the same as the process of Embodiment 1 or Embodiment 2. Accordingly, only the agitating operation is described here, and the descriptions of other operations are omitted.

Figures 55, 56:
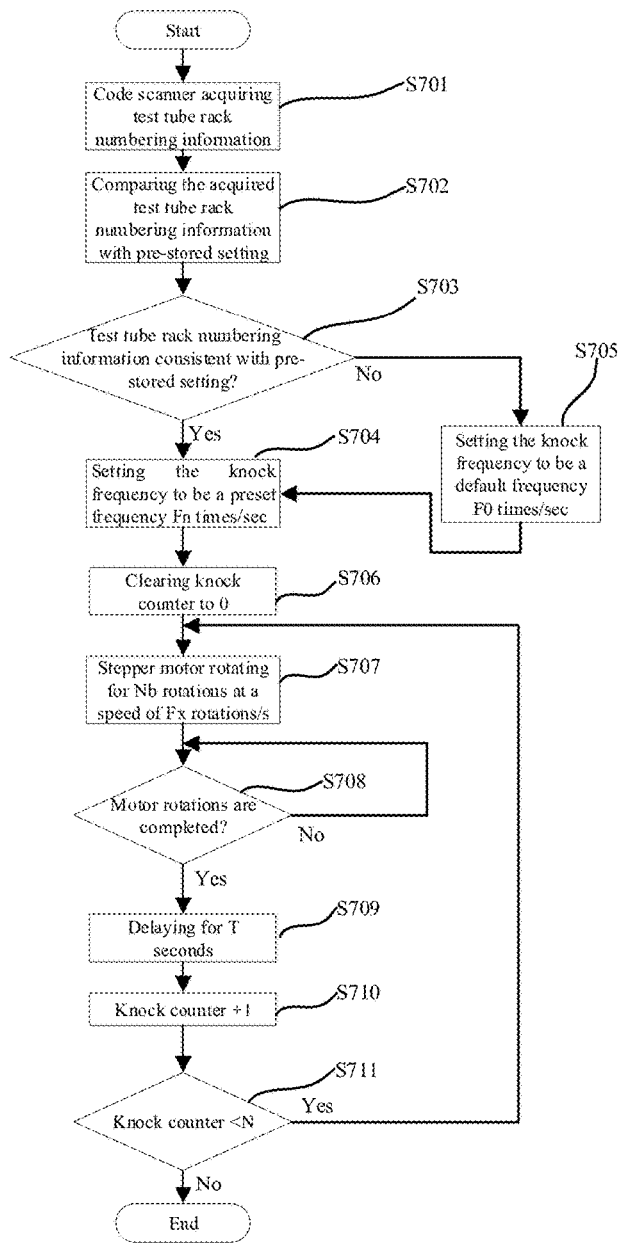
FIG. 55 is a flowchart of an agitating process of another first agitating device 72 according to the present application.
FIG. 56 is a data analysis diagram of small-volume whole blood samples according to the present application, each small-volume whole blood sample has a volume of 100 μL.

FIG. 55 is a flowchart of the agitating process of the first agitating device 72 in this embodiment. The agitating process in this embodiment is substantially similar to the agitating process in embodiment 4 except for magnetic swing and knock swing. As shown in FIG. 55, the container rotating code-scanning device acquires numbering information of the sample rack 80 (step S701), and the controller 21 compares the acquired numbering information of the sample rack 80 with pre-stored setting (step S702), to determine whether the acquired numbering information of the sample rack 80 is consistent with the pre-stored setting information (step S703). If the acquired numbering information of the sample rack 80 is consistent with the pre-stored setting information (step S703: Yes), the knock frequency of the sample container accommodating seat 723 is set to be a preset frequency Fn times/sec (step S704), and then step S706 is performed. Each time the sample container accommodating seat 723 is knocked, the sample container accommodating seat 723 is swung once (that is, a round trip). If the acquired numbering information of the sample rack 80 is not consistent with the pre-stored setting information (step S703: No), the knock frequency of the sample container accommodating seat 723 is set to be a default frequency F0 times/sec (step S705), and then step S706 is performed.

In step S706, a knock counter is cleared. The stepper motor 721 rotates Nb rotations at a speed of Fx rotations/s (step S707). The controller 21 determines whether the Nb rotations of the motor 721 have been completed (step S708). If the rotations of the motor 721 have not been completed yet (step S708: No), it is waited until the rotations of the motor 721 is completed. If the rotations of the motor 721 have been completed (step S708: Yes), T seconds' delay is performed (step S709). The count number of the knock counter is incremented by 1 (step S710).

The controller 21 determines whether the count number of the knock counter has reached a predetermined value N, that is, whether the count number is less than N (step S711). If the count number of the knock counter has not reached the predetermined value N yet (step S711: No), it indicates that the sample has not been stirred uniformly, the process returns to step S707 to continue stirring, until the count number of the knock counter reaches the predetermined value N, which indicates that the sample has been stirred uniformly (step S711: Yes), and then the current agitating process ends.

In each of the foregoing embodiments, preferably, the blood analyzer may also be equipped with a CRP measurement module for measuring a C-reactive protein parameter.

In each of the foregoing embodiments, the first agitating device agitates the sample in the first sample container placed in its accommodating hole in a non-inverted agitating method.

In the foregoing embodiments, preferably, the blood analyzer also has the function of automatically injecting a diluent in batch. The user places a plurality of sample containers on the sample rack 80, and then presses a button for automatic diluent injection on the operation interface of the display component 31 of FIG. 1. The blood analyzer conveys the sample containers to the sampling position of the blood analyzer one by one by the sample conveying device 17, and the sample aspirating needle 135 injects a predetermined amount of diluent into the sample containers. The blood analyzer can automatically detect which receiving holes on the sample rack 80 are placed with sample containers, and inject a predetermined amount of diluent into these sample containers. The sample rack 80 loaded with the sample containers injected with the diluent is conveyed to the post-analysis sample rack storage section 1712 by the sample conveying device 17.

In the present application, the swing agitating method used in embodiment 4 or 5 above may be realized by a translational swing agitating method or the like in addition to the above-mentioned agitating method of swinging about axis. In the present application, other methods of keeping the bottom of the sample container lower than the opening of the sample container in the process of agitating the blood sample in the sample container by the agitating device 11 (71, 72) can also be considered.

The present application can be used to measure hemoglobin concentration (HGB). The hemoglobin concentration (HGB) is an important parameter for blood sample measurement, and it refers to the amount of hemoglobin contained in a unit volume of blood. Hemoglobin, also known as blood pigment, is only found in red blood cells and is the main component of red blood cells. Blood is composed of blood cells and blood plasma. Since the specific gravity of the blood cells is greater than that of the blood plasma, blood will be stratified after being stood for a period of time, wherein the blood cells are settled and the plasma are located above the blood cells.

When a blood sample is not agitated thoroughly, red blood cell concentration at the lower part of the blood sample is higher than that at the upper part. When the sampling needle aspirates the sample close to the bottom of the blood collection tube (in order to reduce the requirement of the blood analyzer on the blood collection amount, the sampling needle usually aspirates the sample close to the bottom of the blood collection tube), the hemoglobin concentration (HGB) measured by the blood analyzer is significantly higher than the actual value, and the fluctuation range of the hemoglobin concentrations (HGB) measured multiple times is relatively large. Therefore, the stability of hemoglobin concentration (HGB) measurement is often used to evaluate the effect of blood sample agitating.

In the present application, the sample preparing device prepares a test sample for a hemoglobin concentration (HGB) test item from a blood sample of a subject, and the tester obtains a relevant indicator of the hemoglobin concentration (HGB).

In the various above embodiments, not only the problem of blood sample loss and peripheral blood agitating caused by the fact that the blood adheres to the cap or wall of the blood collection tube is avoided, but also the blood sample can be agitated thoroughly. When the blood sample is agitated thoroughly, its hemoglobin concentration (HGB) is very stable, and the fluctuation range of repeated measurements generally does not exceed ±2 g/L.

FIG. 56 is an analysis data diagram of 6 small-volume whole blood samples, each small-volume whole blood sample has a volume of 100 μL. The blood samples were agitated by the agitating device 11, and were respectively tested for 6 times in the first measurement mode of Embodiment 1. According to the data in FIG. 56, the fluctuation range of hemoglobin concentrations (HGB) is only 1 g/L, which is very stable.

FIG. 57 is a data analysis diagram of four venous blood samples according to the present application. As shown in FIG. 57, the agitating device 11 can also be used to agitate a sample having a volume more than 250 μL (for example, venous blood) in addition to a small-volume sample having a volume less than 250 μL. FIG. 57 is a comparison of measurement data of four venous blood samples using the inverted agitating method and using the eccentric agitating device shown in FIG. 6 respectively. It can be seen from the data in FIG. 57 that the HGB differences measured by the two agitating methods are not more than 2 g/L.

In the above embodiments, the sample container accommodating seat 112 is fixed on the rotating shaft of the motor 111 by screws or other suitable ways. The present application is not limited to this. The sample container accommodating seat 112 may also be constructed as a part of the rotating shaft of the motor 111, that is, the rotating shaft of the motor 111 and the sample container accommodating seat 112 are integrally formed without additional connection, which can solve the problem of loosening of the sample container accommodating seat 112 during use, and the device is further miniaturized without using screws for installation.

Figure 59:
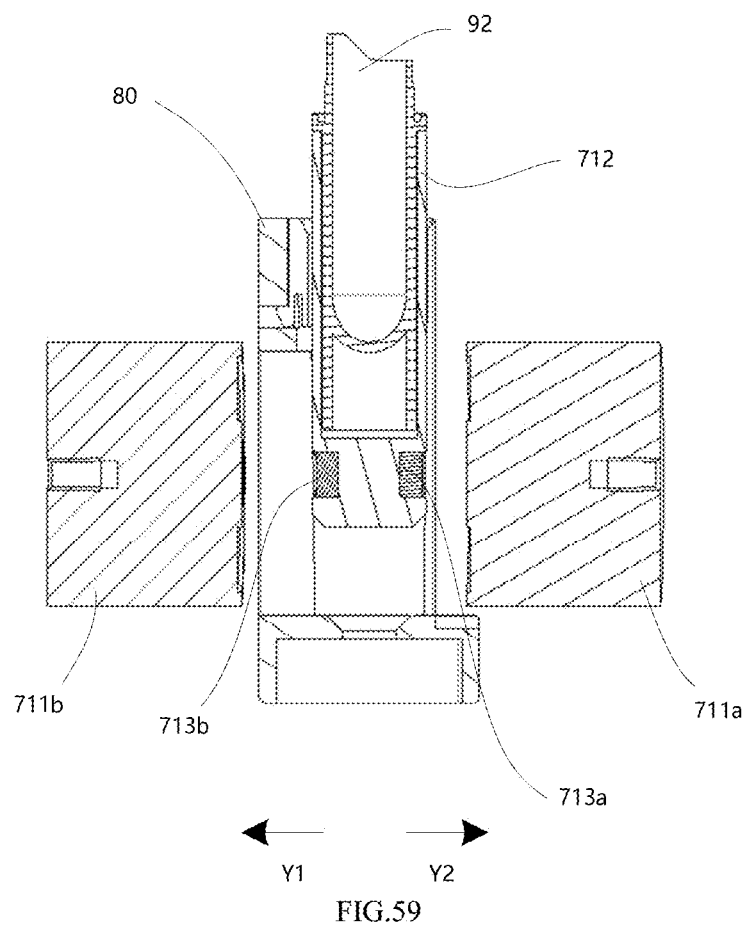
Figure 60:
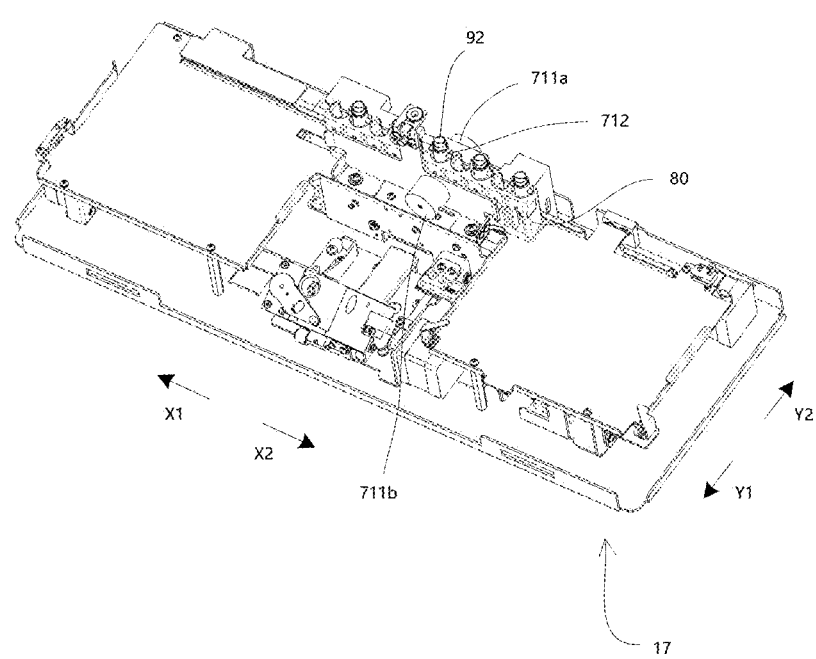

In Embodiment 5 above, the agitating device 71 is arranged independently of the sample rack 80. However, the present application is not limited to this, and the agitating device 71 may be combined with the sample rack 80. For example, FIGS. 58-60 are schematic diagrams of a combination of the agitating device 71 and the sample rack 80. As shown in FIGS. 58-60, the sample container accommodating seat 712 can be placed on the sample rack 80, and then the electromagnets 711a and 711b may be arranged at the sample agitating position and arranged on the front and rear sides of the sample rack 80, so that the samples in the sample containers that pass through the sample agitating position one by one can be directly agitated in a swing manner on the sample rack 80. Alternatively, the sample container accommodating seat 712 may be placed on the sample rack 80, and then one of the electromagnets 711a and 711b may be arranged at the sample agitating position and arranged on the front or rear side of the sample rack 80, so that the samples in the sample containers that pass through the sample agitating position one by one can also be directly agitated in a swing manner on the sample rack 80. In this way, the blood analyzer can be further miniaturized.

Figure 61:
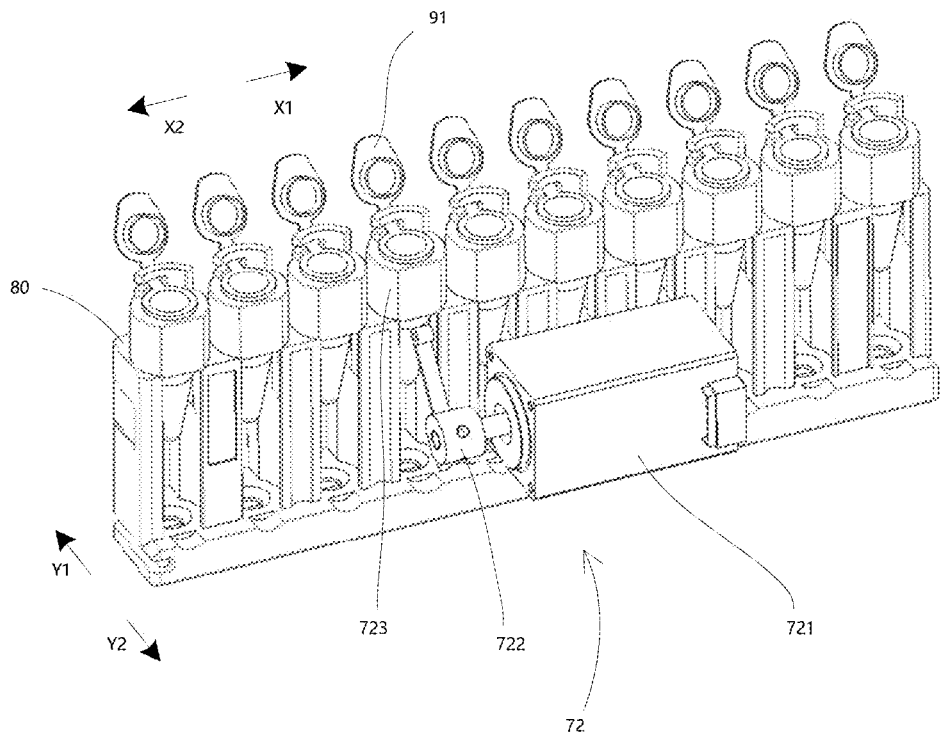
FIGS. 61 and 62 are schematic diagrams of a combination of a first agitating device 72 and a sample rack according to the present application.
Figure 62:
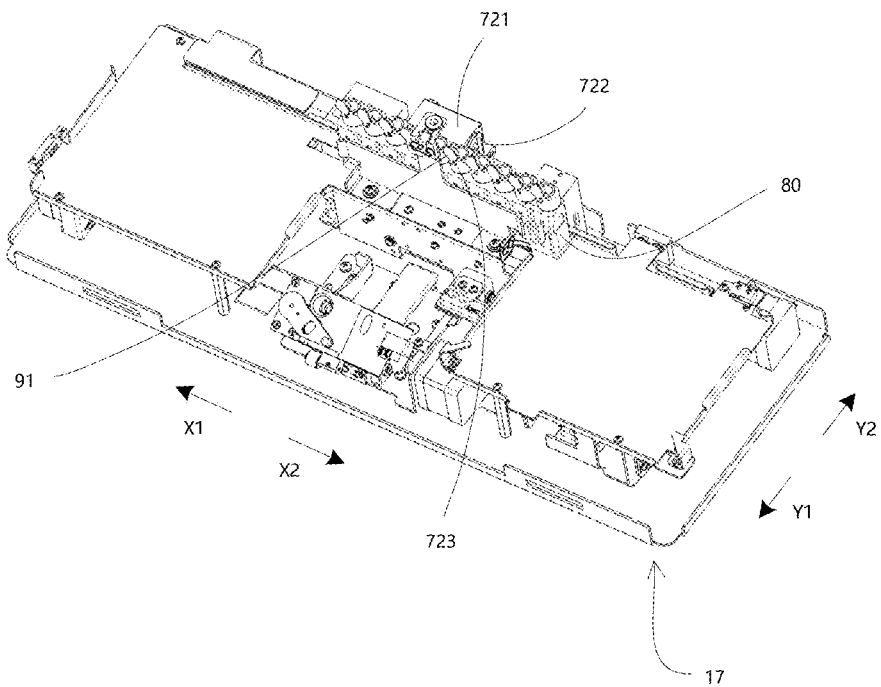

In Embodiment 7 above, the agitating device 72 is arranged independently from the sample rack 80. However, the present application is not limited to this, and the agitating device 72 can be combined with the sample rack 80. For example, FIGS. 61 and 62 are schematic diagrams of a combination of the agitating device 72 and the sample rack 80. As shown in FIGS. 61 and 62, the sample container accommodating seat can be fixed on the sample rack 80, and then the motor 721 and the knock device 722 of the first agitating device 72 may be arranged at the sample agitating position and on the opening side of the sample rack 80, so that the first agitating device 72 can directly knock and agitate the samples in the sample containers that pass through the sample agitating position one by one on the sample rack 80. In this way, the blood analyzer can be further miniaturized.

Figure 63:
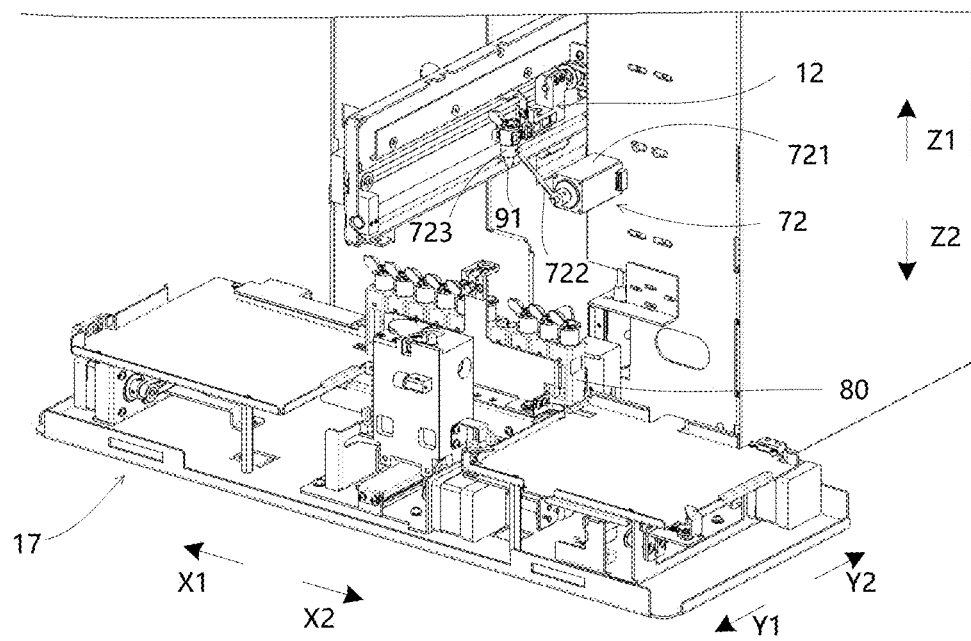
FIGS. 63 and 64 are schematic diagrams of a combination of a first agitating device 72 and a second agitating device according to the present application.
Figure 64:
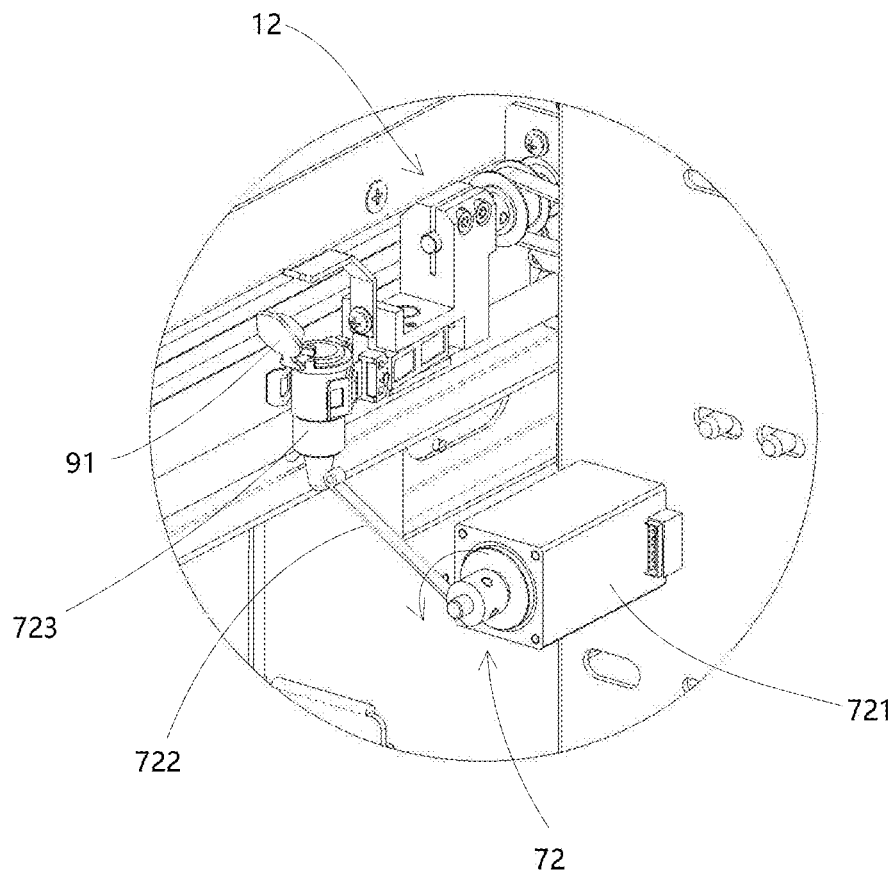

In Embodiment 7 above, the first agitating device 72 is arranged independently from the second agitating device 12. However, the present application is not limited to this, and the first agitating device 72 may be combined with the second agitating device 12. For example, FIGS. 63 and 64 are schematic diagrams of a combination of the first agitating device 72 and the second agitating device 12. As shown in FIGS. 63 and 64, the clamping jaw of the second agitating device 12 may be directly used as the sample container accommodating seat 723 of the agitating device 72, that is to say, the sample container accommodating hole of the first agitating device can be formed by the clamping jaw of the second agitating device 12, that is: the clamping jaw of the second agitating device 12 picks the sample container, drives the sample container to ascend to disengage from the sample rack 80, and then to stay at a position corresponding to the knock device 722 of the agitating device 72, and the motor 721 of the agitating device 72 drives the knock device 722 to continuously knock the bottom of the sample container, so as to agitate the sample in the sample container. Alternatively, the clamping jaw of the second agitating device 12 may pick the sample container accommodating seat 723 of the agitating device 72, drives the sample container to ascend to disengage from the sample rack 80, and then to stay at a position corresponding to the knock device 722 of the agitating device 72, and the motor 721 of the agitating device 72 drives the knock device 722 to continuously knock the bottom of the sample container, so as to agitate the sample in the sample container. The motor 721 of the agitating device 72 can be installed on one of the support frames (1211, 1212, 1213) of the second agitating device 12. In this way, the blood analyzer can be further miniaturized.

In Embodiment 1 above, the second agitating device 12 may pick the sample container on the sample rack 80 and drive the sample container containing common-volume blood for inverted agitating. However, the present application is not limited to this. The second agitating device 12 may also pick the sample rack 80 and drive all the sample containers containing common-volume blood on the sample rack 80 for inverted agitating.

In Embodiment 5 above, the agitating device 71 drives, based on the two electromagnets 711a and 711b in form of suction pad and the two permanent magnets 713a and 713b, the sample container accommodating seat 712 to vibrate within a predetermined range. However, the present application is not limited to this. The agitating device 71 may also include a motor, a connecting rod driven by the motor, and a sample container accommodating seat 712 driven by the connecting rod. The motor of the agitating device 71 drives the sample container accommodating seat 712 through the connecting rod to vibrate within a predetermined range, so as to achieve the purpose of agitating the sample.

In Embodiment 1 above, in the agitating process of the first agitating device 11, after the current agitating operation is completed, reverse rotation is required to complete a next agitating operation, and T milliseconds' delay is performed before the motor 111 starts to rotate reversely. However, the present application is not limited to this. In the agitating process of the first agitating device 11, after the current agitating operation is completed, reverse rotation is not required, but the rotation in the same direction is continued to complete a next agitating operation, but T milliseconds' delay is performed before the motor 111 starts the next agitating operation.

In the present application, the agitating position refers to a position where the first agitating device 11 or the second agitating device 12 agitates the blood sample in the sample container. For example, when the first agitating device 11 agitates the blood sample in the sample container on the predetermined position, the agitating position and the predetermined position are the same position.

FIG. 65 shows HGB data of 6 first sample containers 91 containing different small-volume whole blood samples respectively having a volume of 30 μL, 50 μL, 100 μL, 150 μL, 200 μL and 250 μL, wherein the blood samples in the 6 first sample containers were respectively tested for 6 times in the first measurement mode of Embodiment 1. According to the data, the fluctuation range of hemoglobin concentrations (HGB) does not exceed ±2 g/L, which meets the measurement requirements.

It could be appreciated by those skilled in the art that the steps, measures or schemes of the various operations, methods or processes discussed in the present application may be alternated, changed, combined or deleted. Further, other steps, measures or schemes having those in the various operations, methods or processes discussed in the present application may also be alternated, changed, rearranged, decomposed, combined or deleted. Further, steps, measures or schemes of the prior art having those of the various operations, methods or processes disclosed in the present application can also be alternated, changed, rearranged, decomposed, combined or deleted.

Described above are merely some embodiments of the present application. It should be appreciated that many improvements and modifications may also be made for those of ordinary skill in the art without departing from the principle of the present application, and these improvements and modifications shall fall into the protection scope of the present application.

What is claimed is:

1. A blood sample analyzer, comprising:
    a sample conveying device for conveying a sample rack loaded with a first sample container and/or a second sample container;
    a carrying device, wherein when the sample conveying device conveys the sample rack to a predetermined position, the carrying device is configured to carry the first sample container on the sample rack from the predetermined position to an accommodating hole of a first agitating device;
    the first agitating device having the accommodating hole for placing the first sample container, the first agitating device being capable of driving the first sample container containing a small-volume blood sample and placed in the accommodating hole to agitate the small-volume blood sample;
    a second agitating device capable of picking up the sample rack or the second sample container on the sample rack, and driving the second sample container containing a common-volume blood sample to agitate the common-volume blood sample; and
    a controller configured to communicate with the sample conveying device, the first agitating device and the second agitating device, and control the sample conveying device, the first agitating device and the second agitating device;
    wherein when the first agitating device drives the first sample container placed in the accommodating hole to agitate the small-volume blood sample, a bottom of the first sample container is kept lower than an opening of the first sample container,
    wherein the first agitating device further comprises:
    an accommodating seat, a top part of which is provided with the accommodating hole; and
    a driving device for driving the accommodating seat to rotate, thereby driving the first sample container in the accommodating hole to rotate, so as to agitate the small-volume blood sample,
    wherein the accommodating hole is arranged eccentrically relative to the accommodating seat, so that the first sample container in the accommodating hole is capable of being rotated eccentrically.

2. The blood sample analyzer according to claim 1, wherein:
    the carrying device is a part of the second agitating device; and
    the second agitating device is capable of carrying, via the carrying device, the first sample container on the sample rack, which is conveyed by the sample conveying device to an agitating position, to the accommodating hole of the first agitating device, wherein the agitating position and the predetermined position are same.

3. The blood sample analyzer according to claim 1, wherein the driving device is a first motor.

4. The blood sample analyzer according to claim 1, wherein the driving device is a first magnetic driving device, and
    a lower part of the accommodating seat is provided with a plurality of first magnets, and the first magnetic driving device comprises a plurality of second electromagnets; wherein an interaction between the plurality of second electromagnets and the plurality of first magnets causes the accommodating seat to rotate.

5. The blood sample analyzer according to claim 1, wherein the first agitating device further comprises:
    an accommodating seat provided with the accommodating hole for placing the first sample container, wherein a lower part of the accommodating seat is provided with a first magnet; and
    a vibration driving device which is a second magnetic driving device comprising a second magnet for driving the accommodating seat to vibrate within a predetermined range, thereby driving the first sample container in the accommodating hole to vibrate to agitate the small-volume blood sample under a condition that the bottom of the first sample container is kept lower than the opening of the first sample container,
    wherein an interaction between the second magnet and the first magnet causes the accommodating seat to vibrate within the predetermined range.

6. The blood sample analyzer according to claim 5, wherein:
    the first magnet comprises a first permanent magnet and a second permanent magnet, and magnetic poles of the first permanent magnet and the second permanent magnet are provided in same magnetization direction; and
    the second magnet comprises a first electromagnet and a second electromagnet;
    wherein the lower part of the accommodating seat is located between the first electromagnet and the second electromagnet.

7. The blood sample analyzer according to claim 1, further comprising:
    a sample receiving assembly, comprising a receiving cover and a receiving hole, wherein the sample receiving assembly is configured to receive the first sample container or the second sample container, such that the sample conveying device conveys the first sample container or the second sample container placed in the receiving hole.

8. The blood sample analyzer according to claim 7, wherein:
    the controller is further configured to determine, according to an input of a user, whether a current feeding mode is a first feeding mode or a second feeding mode;
    when the current feeding mode is determined to be the first feeding mode, the controller controls the sample conveying device to convey the sample rack loaded with the first and/or second sample container; and
    when the current feeding mode is determined to be the second feeding mode, the controller controls the sample receiving assembly to convey the first or second sample container individually.

9. The blood sample analyzer according to claim 1, further comprising:
    a measurement mode setting device for setting a first measurement mode and a second measurement mode;
    wherein the controller executes the following operations according to a setting of the measurement mode setting device:

(1) determining whether the first measurement mode or the second measurement mode is set;

(2) when the first measurement mode is determined to be set, controlling the first agitating device to agitate the small-volume blood sample in the first sample container; and (3) when the second measurement mode is determined to be set, controlling the second agitating device to pick up the second sample container on the sample rack for agitating.

10. The blood sample analyzer according to claim 9, wherein the small-volume blood sample in the first sample container is pre-diluted, and wherein, the measurement mode setting device is further configured for setting a third measurement mode; and when the third measurement mode is determined to be set, the controller controls the first agitating device to perform agitation on the first sample container containing the pre-diluted small-volume blood sample.

11. The blood sample analyzer according to claim 1, wherein the controller is capable of controlling agitating parameters of the first agitating device based on shape and size of the first sample container, volume and source of the small-volume blood sample.

12. A blood sample analysis method, comprising:
providing a blood sample analyzer including a first agitating device, a second agitating device, an aspirator, a tester and a controller;

the method further comprises:

measurement mode determination step: determining whether a current measurement mode is a first measurement mode or a second measurement mode by the controller;

first test sample preparation step: when the current measurement mode is determined to be the first measurement mode, agitating a blood sample in a sample container by the first agitating device, and aspirating, by the aspirator, a first sampling amount of the agitated blood sample to prepare a first test sample;

second test sample preparation step: when the current measurement mode is determined to be the second measurement mode, agitating the blood sample in the sample container by the second agitating device, and aspirating, by the aspirator, a second sampling amount of the agitated blood sample to prepare a second test sample; and test step: testing the first test sample or the second test sample by the tester;

wherein, while the blood sample is agitated, a sampling needle does not touch the blood sample in the sample container, wherein the first agitating device comprises:

an accommodating hole for placing the sample container;

an accommodating seat, a top part of which is provided with the accommodating hole; and a driving device for driving the accommodating seat to rotate, thereby driving the sample container in the accommodating hole to rotate, wherein the accommodating hole is arranged eccentrically relative to the accommodating seat, so that the sample container in the accommodating hole is capable of being rotated eccentrically.

13. The blood sample analysis method according to claim 12, the method further comprises a third test sample preparation step, wherein, in the measurement mode determination step, the controller determines whether the current measurement mode is a third measurement mode;

in the third test sample preparation step: when the current measurement mode is determined to be the third measurement mode, the first agitating device agitates a pre-diluted blood sample in the sample container, and the aspirator aspirates a third sampling amount of the agitated pre-diluted blood sample to prepare a third test sample; and in the test step, the tester tests the third test sample.

14. The blood sample analysis method according to claim 13, wherein the blood sample analyzer further includes a sample conveying device and a sample receiving assembly, wherein, the method further comprises:

feeding mode determination step: determining, according to an input of a user, whether a current feeding mode is a first feeding mode or a second feeding mode by the controller; and sample rack conveying step: when the current feeding mode is determined to be the first feeding mode, controlling, by the controller, the sample conveying device to convey a sample rack loaded with the sample container to a predetermined position, and to convey the sample container to a first sampling position after agitating; and sample receiving assembly closing step: when the current feeding mode is determined to be the second feeding mode, closing the sample receiving assembly and conveying the sample container to a second sampling position.

15. The blood sample analysis method according to claim 13, wherein:

in the first test sample preparation step, the second agitating device conveys the sample container on a sample rack to the accommodating hole of the first agitating device for agitating; and in the second test sample preparation step, the second agitating device picks up the sample container on the sample rack for inverted agitating.

16. The blood sample analysis method according to claim 13, wherein the blood sample in the sample container that is agitated by the first agitating device is a whole blood sample, and a volume of the blood sample in the first sample container is 30-250 µL.

17. The blood sample analysis method according to claim 13, wherein the blood sample in the sample container that is agitated by the first agitating device is a whole blood sample, and a volume of the blood sample in the first sample container is 50-200 µL.

18. The blood sample analysis method according to claim 13, wherein the blood sample in the sample container that is agitated by the first agitating device is a whole blood sample, and a volume of the blood sample in the first sample container is 50-100 µL.

* * * * *